(12) United States Patent
Lo

(10) Patent No.: US 6,925,258 B2
(45) Date of Patent: *Aug. 2, 2005

(54) SYSTEM AND METHOD FOR INCREASING BANDWIDTH EFFICIENCY AND THROUGHPUT OF A DATA TRANSMISSION NETWORK

(76) Inventor: Victor Yeeman Lo, 1212 Masline St., Covina, CA (US) 91722

( * ) Notice: Subject to any disclaimer, the term of this patent is extended or adjusted under 35 U.S.C. 154(b) by 0 days.

This patent is subject to a terminal disclaimer.

(21) Appl. No.: 10/325,370

(22) Filed: Dec. 20, 2002

(65) Prior Publication Data

US 2003/0123877 A1 Jul. 3, 2003

Related U.S. Application Data

(63) Continuation-in-part of application No. 10/029,599, filed on Dec. 20, 2001.
(60) Provisional application No. 60/400,578, filed on Aug. 1, 2002.

(51) Int. Cl.[7] ............................................. H04J 14/02
(52) U.S. Cl. ....................... 398/47; 398/79; 375/265; 375/267
(58) Field of Search ..................... 398/47, 53, 141, 398/24, 183, 152, 90, 91, 26, 79; 375/219, 316, 340, 341, 262, 267, 299, 347; 455/101, 132; 370/276, 465, 478; 385/24, 11; 359/494

(56) References Cited

U.S. PATENT DOCUMENTS

| | | | | |
|---|---|---|---|---|
| 5,136,666 A | * | 8/1992 | Anderson et al. | 385/24 |
| 5,528,582 A | * | 6/1996 | Bodeep et al. | 370/276 |
| 2001/0035997 A1 | * | 11/2001 | Agazzi | 359/173 |
| 2002/0080436 A1 | * | 6/2002 | Hait | 359/109 |
| 2003/0002099 A1 | * | 1/2003 | Sayyah et al. | 359/124 |

* cited by examiner

Primary Examiner—Jason Chan
Assistant Examiner—David C. Payne
(74) Attorney, Agent, or Firm—Joseph E. Mueth

(57) ABSTRACT

A system and method for increasing bandwidth efficiency and data transmission performance of radio frequency wireless, optical wireless and fiber-optic digital communication links without requiring an increase in signal power. The system utilizes bandwidth efficient space-time coding to correct transmission errors and bandwidth efficient space-time modulation to dramatically increase data throughput without requiring additional signal bandwidth or power. Radio frequency wireless, optical wireless WDM and fiber-optic applications are achieved by utilizing space-time encoders, radio frequency sources, bandwidth efficient space-time modulators and power amplifiers combined with transmission devices such as one or more antennas, multi-feed antennas, multimode antennas or for transmission by a suitable cable. At the receiver, the method is reversed.

28 Claims, 45 Drawing Sheets

SYSTEM AND METHOD FOR INCREASING BANDWIDTH EFFICIENCY AND THROUGHPUT OF A DATA TRANSMISSION NETWORK

This Application is a Continuation-In-Part of application Ser. No. 10/029,599 filed Dec. 20, 2001 and also claims priority of Provisional Application Ser. No. 60/400,578 filed Aug. 1, 2002.

BACKGROUND OF THE INVENTION

1. Field of the Invention

This invention relates to a system and method for increasing the bandwidth efficiency and data transmission performance of radio frequency wireless, optical wireless and fiber-optics digital communication link without requiring an increase in the signal power.

2. Background Information

With the growth of internet, broadband connectivity has been considered the future of the global telecommunication industry. The increasing demands in running near real time applications in the web have exhausted most of licensed and unlicensed spectral bands previously allocated for commercial wireless, metro and long-hauled DWDM fiber-optics systems. The most cost effective solution of this problem is to dramatically improve the efficiency of transmitting information over the present spectrum allocation without requiring major changes in the existing telecommunication infrastructure.

The communication efficiency associated with transmitting information is known to be dependent upon the signal design, error correction code as well as the characteristics of the transmission medium. While the theories of high-speed digital communications in the time domain are known, there has been little progress to utilize additional dimensions in the spatial domain as information carriers. There was some advancement in recent years to exploit the spatial capacity by inserting additional antennas as in an antenna array. Each antenna would carry multiple temporal frequency channels.

One example is in the U.S. Pat. No. 614,471 of Raleigh et al that discloses an algorithm to process temporal frequency channels from multiple antennas in achieving orthogonal signal properties. This access technique is commonly known as orthogonal frequency division multiplexing (OFDM). Another example is in U.S. Pat. No. 6,285,720B1 of Martone that reveals the advantages in using an antenna array to sample a wavefield distorted by a wireless propagation channel. Details of array processing is disclosed in U.S. Pat. No. 6,317,411B1 of Whinnett et al, while Huang et al presents their ideas in using code division multiple access (CDMA) in wireless antenna array processing, in U.S. Pat. No. 6,301,293B1. These types of space-time system design gain some advantages in realizing temporal frequency diversity and some spatial path diversity through different antennas. However, they fail to exploit multiple spatial modes and they fall short of actually implementing spatial modulation in the transverse electric field as disclose in this present invention.

It is one object of the present invention to provide a system and method for increasing the spectral efficiency of a wireless and optical communication channel.

It is another object of the present invention to minimize the transmission errors by performing multiple iterative decoding on the received data.

Yet another object of the present invention is to increase code rate by transmitting redundant data through the spatial channels.

Still another object of the present invention is to mitigate errors induced by fading and scintillation using the interleaver that scrambles the combined spatial and temporal sequence.

Still another object of the present invention is to increase the coding gain by transmitting data sequence through the orthogonal polarization channels in a single mode system.

Still another object of the present invention is to increase the coding gain by transmitting data sequence through the orthogonal spatial channels in a multi-mode system.

Still another object of the present invention is to expand transmission capacity via spatial dimensions.

Still another object of the present invention is to increase throughput of a wireless radio frequency transmission system by using multiple and multifeed antennas.

Still another object of the present invention is to increase throughput of a wireless optical transmission system by using multiple and multimode antennas.

Still another object of the present invention is to increase throughput of a fiber optical transmission system by using multiple and multimode fibers.

Still another object of the present invention is to increase throughput of a wireless optical and fiber optical transmission system by using multiple wavelengths.

Still another object of the present invention is to increase spectral efficiency by varying the polarization states of the transmitting fields.

Still another object of the present invention is digital modulation of polarization states of transmitting fields by polarization phase shift keying.

Still another object of the present invention is digital modulation of polarization states of transmitting fields by polarization frequency shift keying.

Still another object of the present invention is digital modulation of polarization states of transmitting fields by polarization amplitude shift keying.

Still another object of the present invention is high level digital modulation of M polarization states of transmitting fields by M-ary polarization phase and amplitude modulation.

Still another object of the present invention is high level digital modulation of M polarization states of transmitting fields that constitute a spherical constellation.

Still another object of the present invention is analog modulation of polarization states of transmitting fields by polarization phase modulation.

Still another object of the present invention is analog modulation of polarization states of transmitting fields by polarization frequency modulation.

Still another object of the present invention is analog modulation of polarization states of transmitting fields by polarization amplitude modulation.

BRIEF DESCRIPTION OF THE INVENTION

The purpose of the present invention is to apply space-time modulation to increase spectral efficiency for data carrying capacity and to apply space-time coding to improve signal power sensitivity while achieving near error-free transmission performance at the physical layer.

The basis of the present invention disclosed herein is a direct application of the space-time modulation theory to wireless communications, free-space optical communications and fiber-optics communications. The fundamental theory related to the present invention is described by Victor Lo in "On A Statistical Space-Time Modulation Theory," Proc. IEEE P.R. Conference on Communications, Computers and Signal Processing, pp. 584–589, Victoria, B.C., Canada, June 1989.

Space-time modulation provides capacity expansion by utilizing a three-dimensional spatial field. Spatial modulation can be expressed in the form of changes in vector directions of spatial carriers, Ex, Ey as well as the specific spatial location where the electric field illuminated. The relationship of the x y components and its propagation direction z forms the basic functions for data transmission. When the spatial dimension is not being used as in the case of a linearly polarized signal, all data loading is limited in time along the propagation axis pointing at only one receiver location. Assuming a space-time separable channel, the temporal information carrier on the propagation axis becomes independent of the transverse plane where the relative phase position (state of polarization) can be modulated. Multiple spatial modes can also be generated from a single antenna aperture to transmit independently and concurrently to multitude of receiver locations. By utilizing both spatial and temporal modulation, total system throughput can be substantially increased.

Using the Poincare sphere to represent states of polarization in the Stokes' space, an asymmetric field strength between x and y will project a circular trajectory on the Poincare sphere with the biggest radius when $a_x$ is equal to $a_y$. The relative phase difference between x and y will determine the classification of linear, elliptical and circular polarization. The scaling of the field strength will decide the degree of polarization within each classification. In the context of the Poincare space, phase shift keying will appear as equally spaced points on a circle of the Poincare sphere. The exact plane of the circle is set by amplitude $a_x$ and $a_y$. Similarly, frequency shift keying manifests as a rotating circle on the Poincare sphere. The speed of rotation is twice the phase deviation between Ex and Ey. As long as there is enough frequency separation between each symbol, there should not be any difficulty in detecting the frequency modulated symbols. Hardware implementation of a polarization modulator has been described by Sergio Benedetto in "Multilevel Polarization Modulation Using A Specifically Designed LiNbO," IEEE Photonic Tech. Lett, August 1994, pp. 949–951. Details of a polarization receiver suitable for this invention are discussed in "Multilevel Polarization Shift Keying: Optimum Receiver Structure and Performance Evaluation," IEEE Trans. On Comm., March 1994, and demodulation tracking loop in "Polarization Recovery In Optical Polarization Shift-Keying Systems" IEEE Trans. On Comm., vol. 45, no. 10, October 1997.

In general, space-time modulated signal vectors occupy a complex multidimensional signal space. Signal design is simplified for space-time separable signal sets where temporal and spatial signal constellations can be considered separately. Temporal signal constellations can be presented in the inphase and quadrature plane. Their modulation and demodulation follows the classical inphase and quadrature processing of phase and amplitude. More detailed description can be found in "Performance of combined amplitude and phase modulated communications systems" by John Hancock and Robert Lucky in IRE Trans Comms, vol. CS-8, pp. 232–237, December 1960. For spatial modulation, by considering constellation points on the three-dimensional spherical surface of the Poincare sphere, the geometric shape of the constellation becomes a polygon. Each signal vector is generated by an explicit ratio of amplitude and phase between the two transverse plane electric field components.

If signal constellation is included outside the Poincare's sphere, the coverage of the polarized signal set is effectively extended to include all partially polarized and non-polarized signal. Such signal set can be created by concentric spherical surfaces with equal angular distance among signal points for the same degree of polarization. The signal constellation can be further expanded to include semi-geometrical structure like a layered cubic construction with equally spaced signal vectors centered at the un-polarized point. Furthermore, there can also be a layered cylindrical surface with its axis aligned with $S_1$. Thus, the signal vector is comprised of points on concentric cylinders with each cylinder specified by fixed amplitude ratio.

For a multi-mode antenna system, each mode can be independently space-time modulated, and thus carry separate polarization modulated and temporal modulated messages. For a multimode wireless and optical system, the capacity is limited by the total number of independent modes supportable by the channel. Also, the complexity of the receiver will increase quickly because each mode will have to be independently detected and demodulated. For wireless multimode applications, design of a Meander-Line polarizer for each mode is described by Te-Kao Wu in "Meander-Line Polarizer For Arbitrary Rotation of Linear Polarization," IEEE Microwave and Guided Wave Letters, vol. 4, no. 6, June 1994; while for an optical multimode system, details of a multimode design is described by Gagliardi and Karp, "Optical Communications," Wiley Interscience, New York, 1976.

In addition to space-time modulation, the bandwidth efficiency can be improved by applying advanced waveforms, approaching the theoretical limit set forth by the Nyquist Theorem. Further enhancement is achieved by lowering the probability in making symbol errors during transmission (bit error rate) via forward error correction code. The classic turbo coding scheme utilizes multiple temporal independent channels for data transmission to achieve the amount of redundancy required for reliable data transport. Coding for single mode polarization modulated system: Since there are independent orthogonal polarization channels in the transverse plane for each spatial mode, it is ideal for the transmission of redundant data. Due to the inherent spatial diversity in the orthogonal spatial channels, a space-time coded system can be implemented by sending permuted data sequence via multiple paths. With the additional spatial channels, transmitting redundant data will incur no penalty in temporal code rate. The spatial code rate will be increased at least by a factor of two depending on the number of spatial channels available to carry redundant data. Data sequence can be punctured to further increase the code rate. To optimize the coding gain, a multi-dimensional space-time interleaver is used to spread the burst errors evenly over a data frame. The space-time interleaver is also effective in mitigating error sequence induced by space-time dispersive channels.

A different component code can be assigned to each channel. Design of component code can be feed-forward convolutional code, product code, block code or combinations of them. The decoding scheme consist of metrics computation along each possible decoding path in the forward as well as in the backward direction. The decoding path corresponding to the maximum likelihood metric will be chosen. Possible decoding algorithm includes soft-input and soft-output (SISO) or the soft-output Viterbi (SOVA). Design for the encoder and decoder for a parallel code structure is described by Claude Berrou et al, "Near Shannon Limit Error-Correcting Coding and Decoding:

*Turbo–Codes"*, Proc. ICC'93, Geneve, May 1993, pp. 1064–1070. For a serial code structure, it is shown by Daruish Divsalar et al in "On The Design of Turbo Codes," TDA Progress Report 42–123, November 1995, pp. 99–121. To further enhance the bandwidth efficiency, adjacent transmission symbols can be constrained during encoding process to follow a minimum phase transition profile. This technique is commonly known as trellis coding method. Detailed description of this method can be found in *"Channel Coding With Multilevel Phase Signals"* by Ungerboeck in IEEE Trans. Info. Theory, vol.IT-28, 1982, pp. 55–67 incorporated herein by reference.

For a multi-mode link, the additional dimensions provide even more options in the design of space-time codes. Now, each spatial mode becomes an independent spatial channel available to either carry a new stream of coded data or a redundant stream of interleaved coded data from another channel. These multiple temporal and spatial channels enable repeated looks of the same set of data. The added spatial and temporal diversity results in a dramatic increase of the link margin. This is an effective way to equalize the degradations due to fading and scintillation.

One application of these space-time modulation and coding techniques disclosed herein is for commercial fixed and mobile wireless services, where scarce spectral resources and increased radio frequency interference is driving the modem design towards more efficient modulation and coding methods. A single-feed antenna transmitting via a single spatial mode can be easily expanded to a multi-channel architecture using a multi-feed antenna with each feed transmitting an independent spatial mode or channel. Further substantial improvement is possible by deploying multiple antennas with each antenna carrying multiple feeds.

Another application is free space optical communications with direct modulation. The space-time coder encodes the input data into a temporal and a spatial data stream. The temporal data is applied directly to the laser, while the spatial data modulates the states of polarization of the optical signal from the laser via the optical space-time modulator. The optical signal is amplified and transmitted through the optical antenna. With proper antenna pointing, the receiver optical antenna field of view and the transmit antenna beamwidth achieves a near line-of-sight geometry. At the receiver, the optical antenna collects the signal. This is followed by spatial demodulation of the states of polarization and temporal demodulation via direct optical detection. The demodulated data stream is next amplified, the space-time data sequence demultiplexed, inversely permutated and finally decoded to recover the transmitted data.

Other application in free space optical communications include indirect modulation with homodyne or heterodyne demodulation, where the temporal data modulates the optical output of the laser at the space-time modulator rather than a direct modulation at the input to the laser. At the receiver, a local laser is used for homodyne or heterodyne demodulation to remove the optical carrier before photodetection of the temporal data as in the case of direct detection.

Yet another application of the invention is to extend the single mode free space optical communications link to multimode communication system by connecting multiple modulators in parallel to a single multiplexed space-time coder, which substantially increased spatial diversity via interleaving data symbols among multiple spatial modes. The output of this array of modulators are amplified and then merge into a two dimensional grid on the image plane. The combined optical signal is transmitted through the optical antenna. At the receiver, the combined optical signal is reverted back to individual spatial signals, which are then space-time demodulated and collectively space-time decoded.

There is yet another variation of the present invention as applied to free space optical communications. Multiple optical antennas can be used in addition to multimode per antenna. Single antenna processing is now expanded to parallel processing of multiple antennas as multiplexed from the space-time coder and demultiplexed to the space-time decoder. This design expands both capacity (channels) and throughput (data rates) by orders of magnitude above prior art.

Another key area of application is in guided optical communications where waveguides like fiber can be used for routing data of Metro and Long haul optical networks. The system setup is similar to free space optical link except that optical antennas for both the transmitter and receiver are no longer needed.

Still another application is to increase the number of wavelength channels by adding wavelength division multiplexing (WDM) to the multimode, multi-antennas free-space optical communication links.

Still another application is to increase the number of wavelength channels by using wavelength division multiplexing (WDM) in the multimode, multi-fiber guided optical communication links.

For multimode application, couplers become the enabler for launching and for receiving both single-mode as well as the combined multimode optical signal through the fiber optical cable.

The free space multiple antennas optical link now becomes a multiple optical fiber link, where each individual fiber can simultaneously carrying multiple spatial modes. The front-end encoding, modulation, and the back-end demodulation, decoding signal processing for the fiber optical link are similar to the free space optical link.

The above and other objects, advantages, and novel features of the invention will be more fully understood from the following detailed description and the accompanying drawings, in which:

DETAILED DESCRIPTION OF THE INVENTION

In accordance with the invention disclosed herein, channel capacity and data throughput of wireless, free-space optical, and fiber-optical communication links can be dramatically increased depending on the order of space-time modulation, transmission waveform, space-time error correction code, the number of spatial and temporal modes, as well as the size of the transmit and receive antenna array. For a typical wireless system generating a temporally coded and temporally modulated signal followed by a single-feed antenna transmitting to a single-feed antenna receiving system, the wireless link capacity, throughput and bit error rate performance is limited by the efficiency of the temporal modulation and effectiveness of the error correction code used. The present invention significantly increases the system throughput and performance of prior art by encoding data with a space-time error correction code, followed by space-time modulation using a bandwidth efficient waveform before transmission via a plurality of spatial modes per antenna and a plurality of antennas.

Figure 1A:
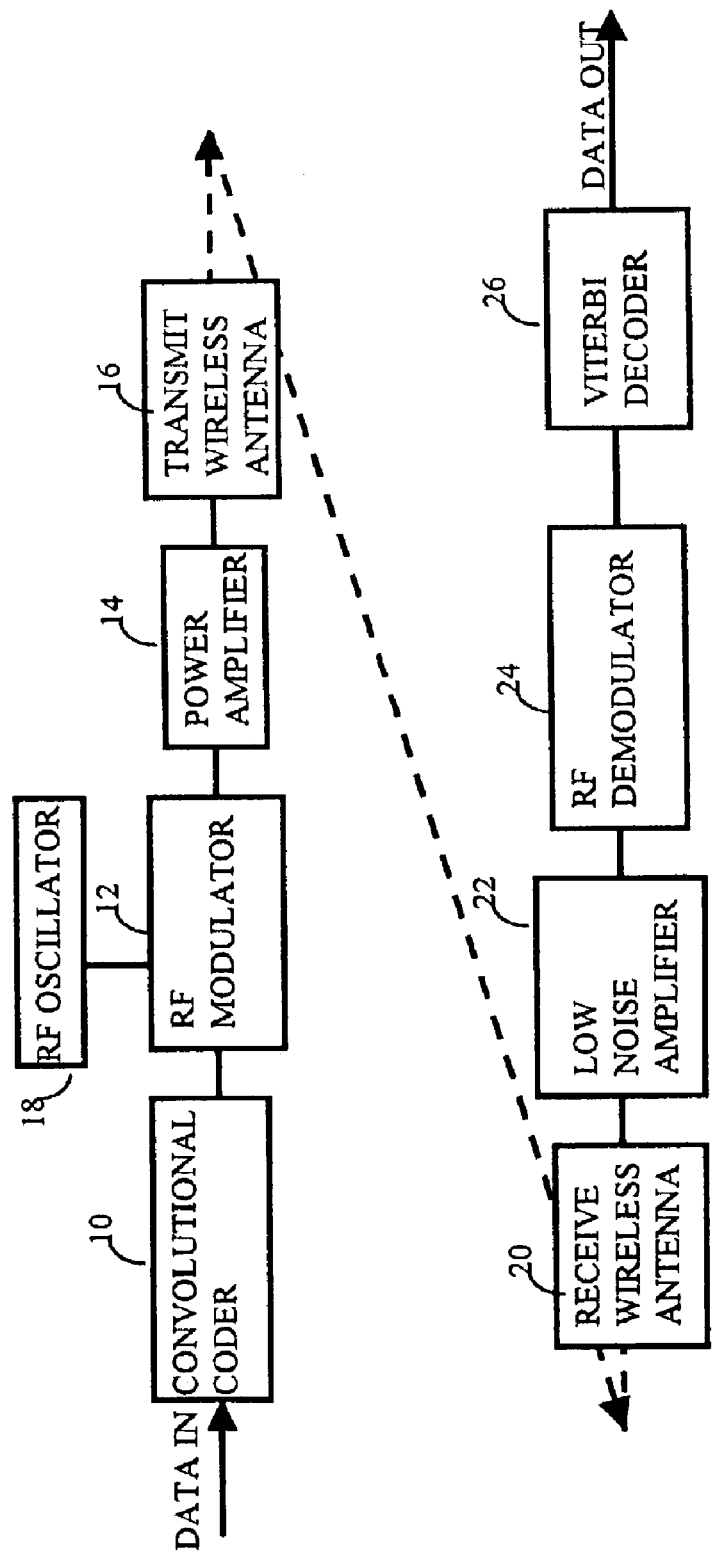
FIG. 1A is a schematic block diagram of a prior art radio frequency wireless system applying typically phase modulation on a convolutional coded data stream with a single antenna.

The prior art implementation of a wireless communication system is illustrated in FIG. 1A. It consists of a RF carrier generated from a radio frequency source 18, modulated by convolutional encoded data from 10 at the RF modulator 12. The signal is amplified and transmitted through a wireless antenna. At the receiving antenna 20, the transmitted signal is amplified 22 and demodulated 24 before Viterbi decoding 26.

Figure 1B:
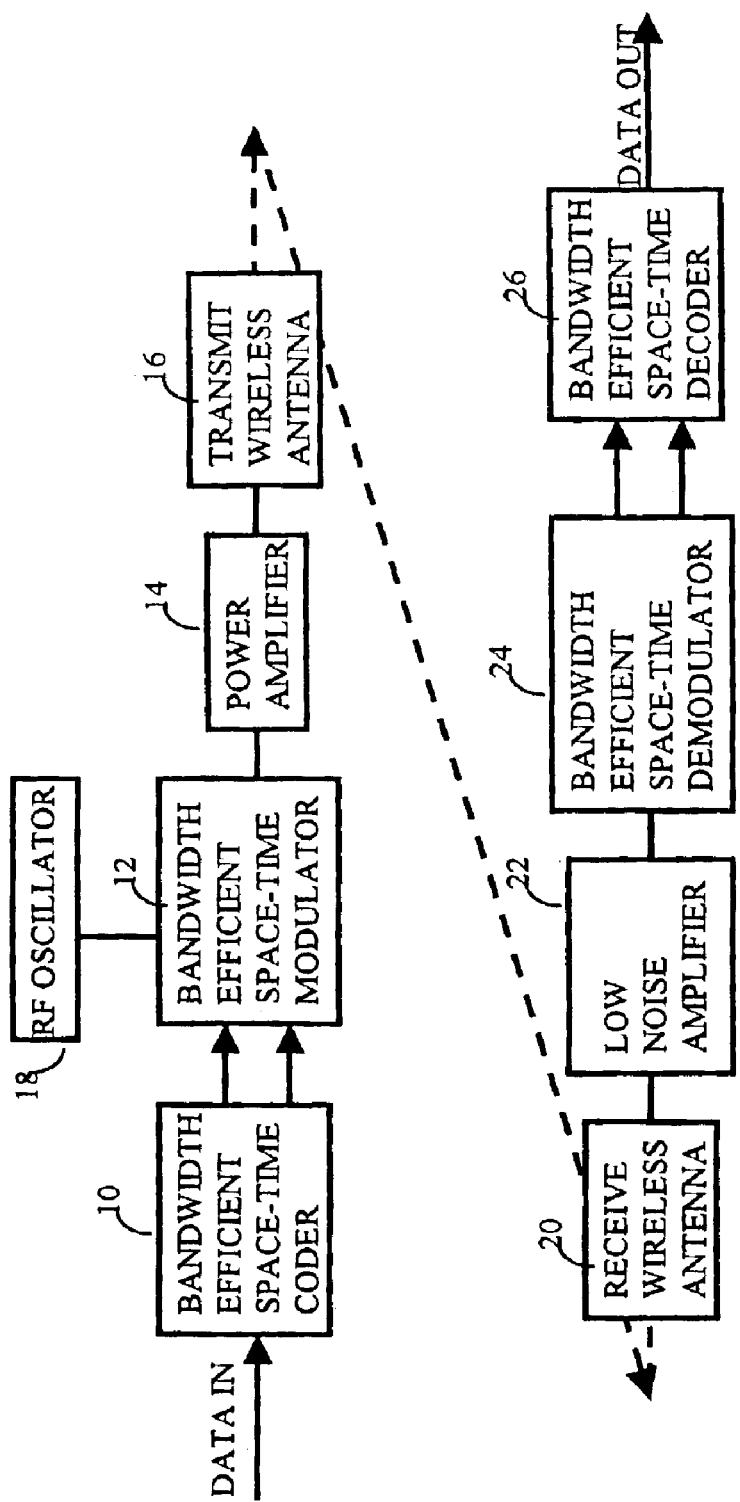
FIG. 1B is a schematic block diagram of one embodiment of a single-feed antenna wireless system operating at radio frequency for increasing channel capacity and throughput of wireless communication networks using both bandwidth efficient space-time coder and modulator according to the invention.

One embodiment of the invention for a wireless communications link with a single feed antenna is illustrated in FIG. 1B. It consists of an RF carrier source from RF oscillator 18, space-time modulated by a spatial and temporal data stream from space-time bandwidth efficient coder 10 at bandwidth efficient space-time modulator 12. The signal is amplified by power amplifier 14 before emission from wireless antenna 16. At the receiver, the RF signal is collected at wireless antenna 20, amplified by low noise amplifier 22 to boost the level, followed by demodulation by space-time demodulator 24. Finally, the demodulated spatial and temporal data streams are decoded by space-time decoder 26.

Figure 5A:
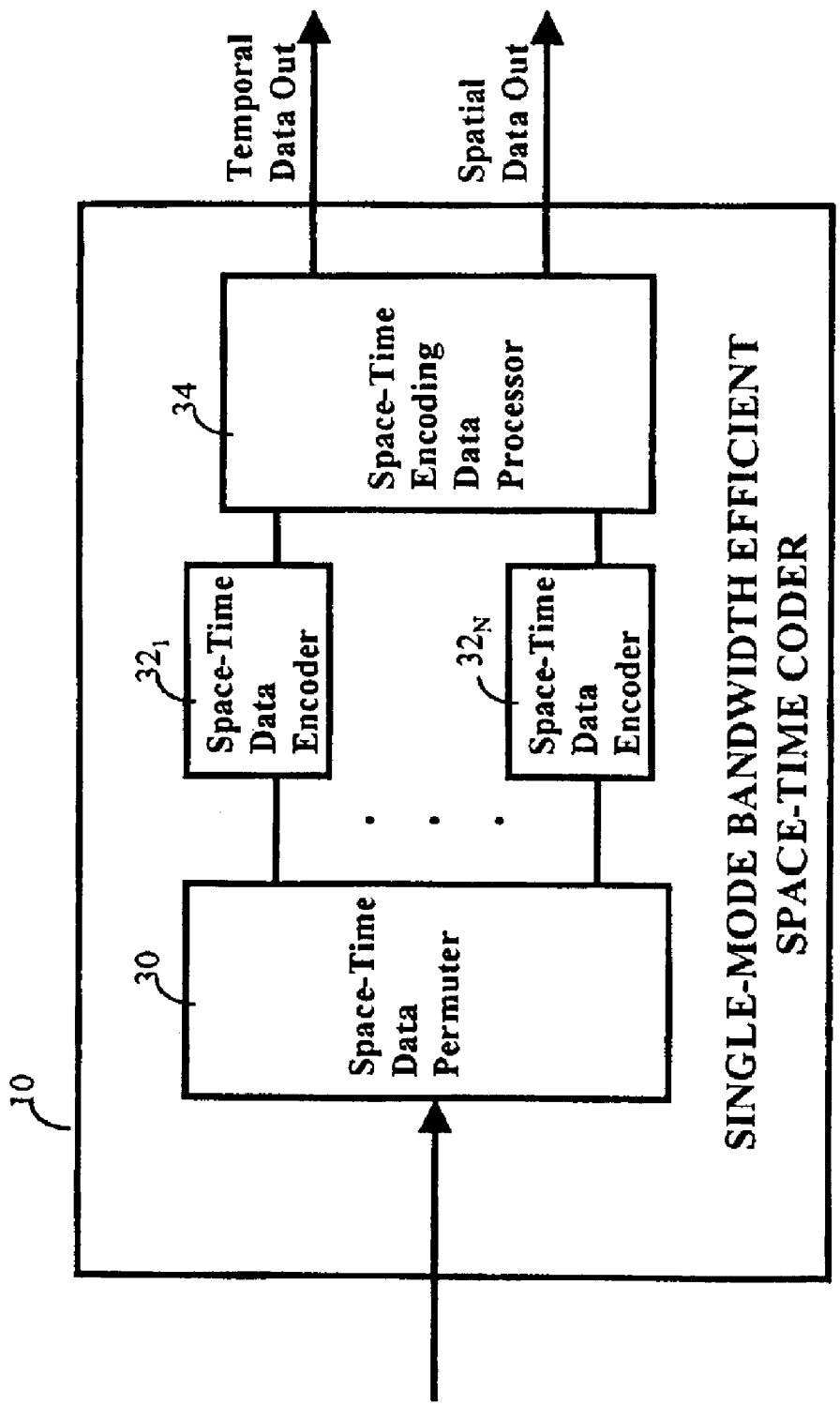
FIG. 5A is a schematic block diagram illustrating the detail processing of single mode bandwidth efficient space-time encoder.

Bandwidth efficient space-time coder 10 performs the encoding function of the raw data into a coded sequence. As illustrated in FIG. 5A, the encoding tasks can be partitioned into space-time data permutation 30, multiple component trellis encoding of space-time data by a plurality of space-time data encodes $32_1$ to $32_N$, followed by a space-time encoding data processor 34 that multiplexes the various component codes into a spatial and a temporal data streams for space-time modulation.

Figure 6A:
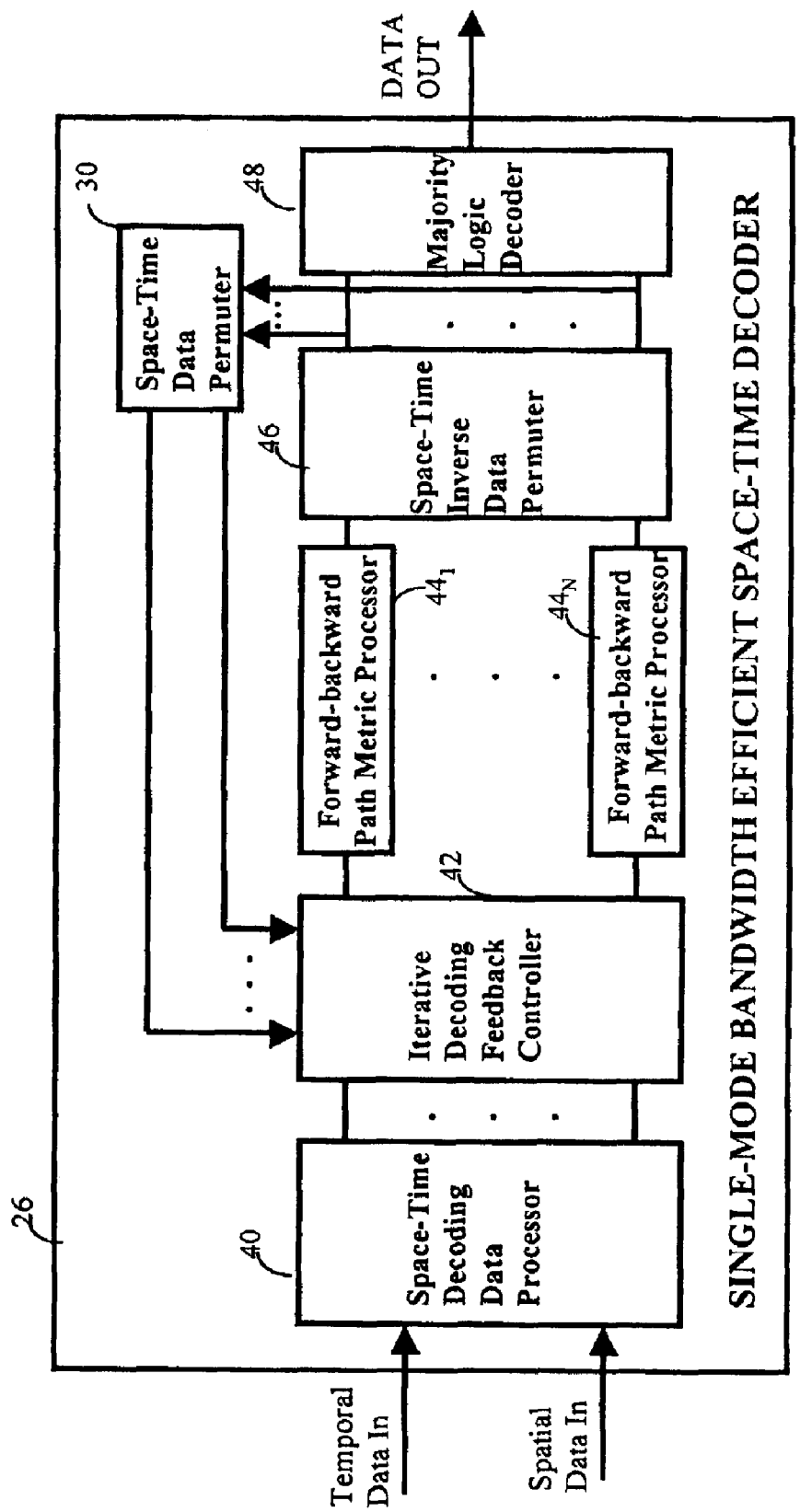
FIG. 6A is a schematic block diagram illustrating the detail processing of single mode bandwidth efficient space-time decoder.

At the receiver, space-time decoder 26 decodes the demodulated space-time symbols to recover the original transmitted data. The decoding operation is shown in FIG. 6A. Space-time decoding data processor 40 de-multiplexes the space-time symbols from the demodulator into various coded components. Under the iterative decoding feedback controller, various coded components are then individually trellis decoded by a plurality of forward-backward path metric processors $44_1$ to $44_N$ according to the maximum a posteriori probability (MAP) rule. An inverse mapping of data position is then carried out at space-time inverse data permuter 46 and majority logic decoder 48 to recover the raw data. For achieving superb coding gain, a feedback type of iterative decoding process via space-time data permuter 30 is used.

Figure 4A:
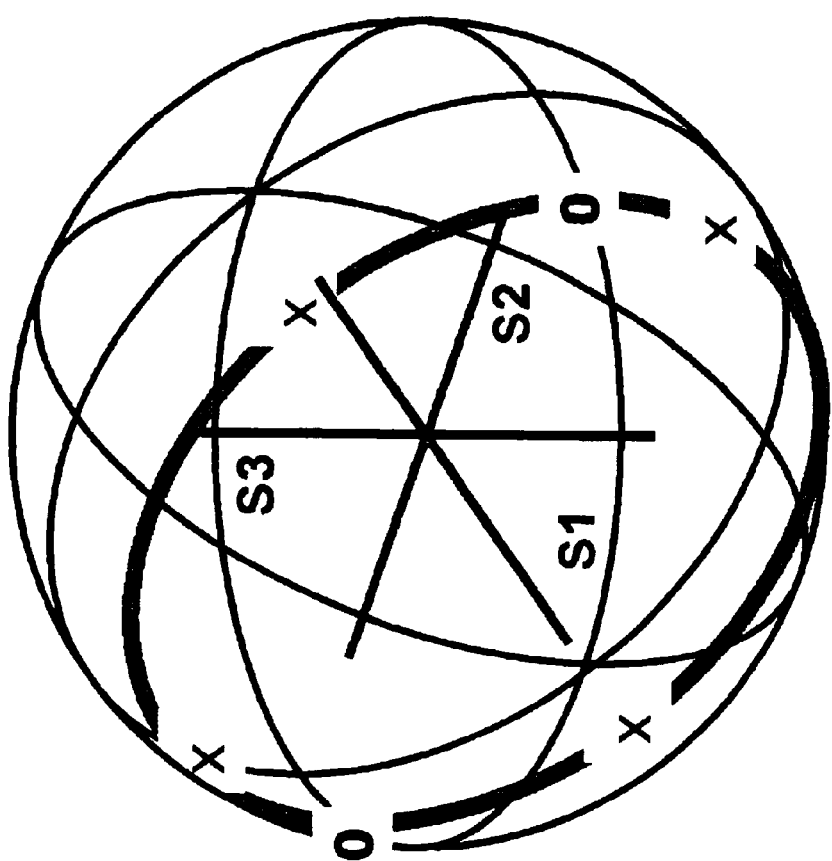
FIG. 4A is a schematic diagram illustrating the digital symbols generated by polarization phase shift keying.
Figure 4B:
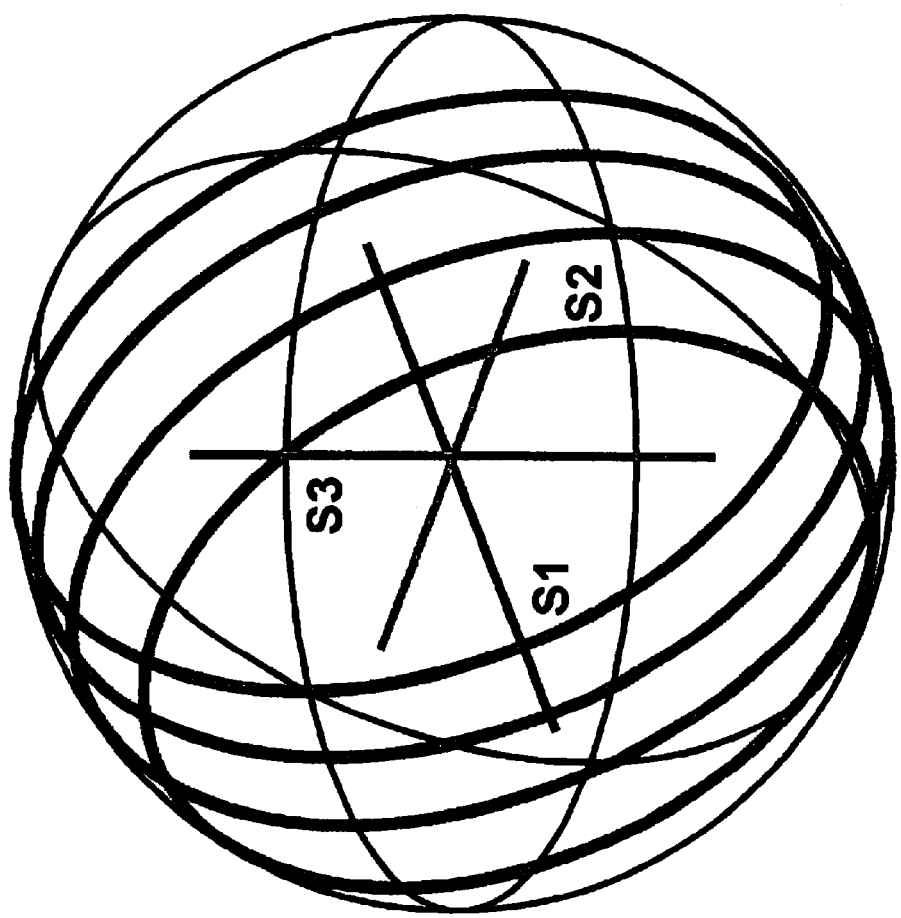
FIG. 4B is a schematic diagram illustrating the digital symbols generated by polarization frequency shift keying.
Figure 4C:
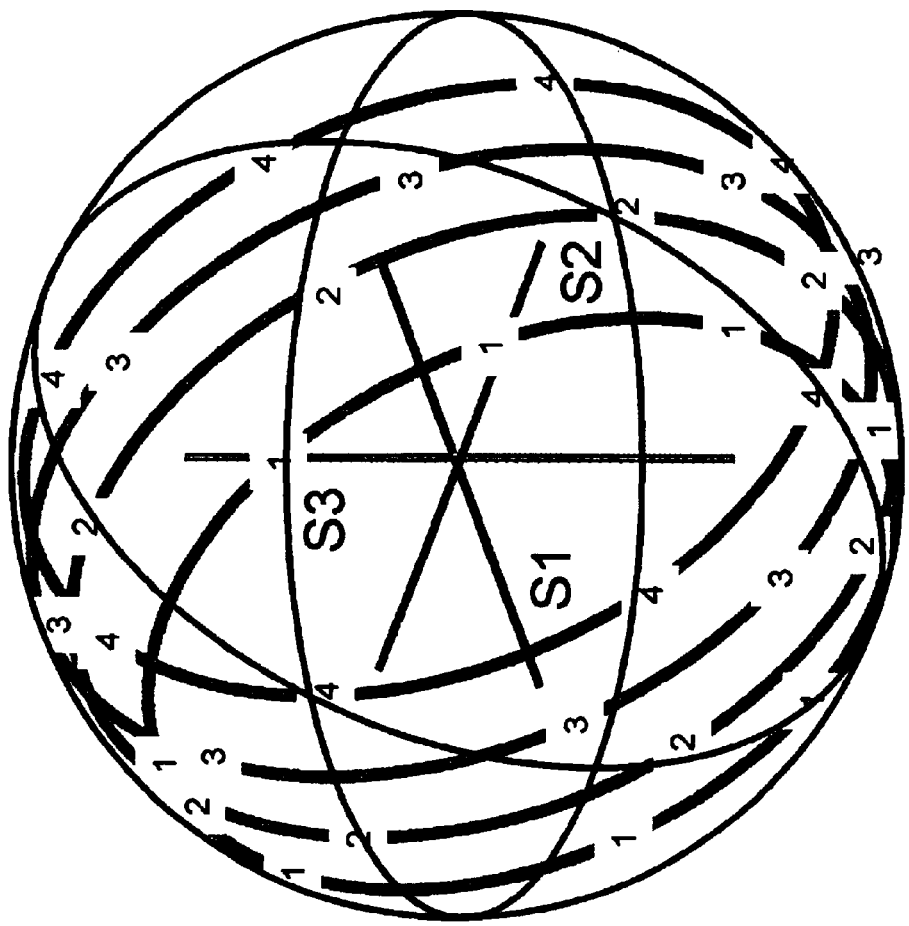
FIG. 4C is a schematic diagram illustrating the digital symbols generated by polarization phase and amplitude shift keying.
Figure 4D:
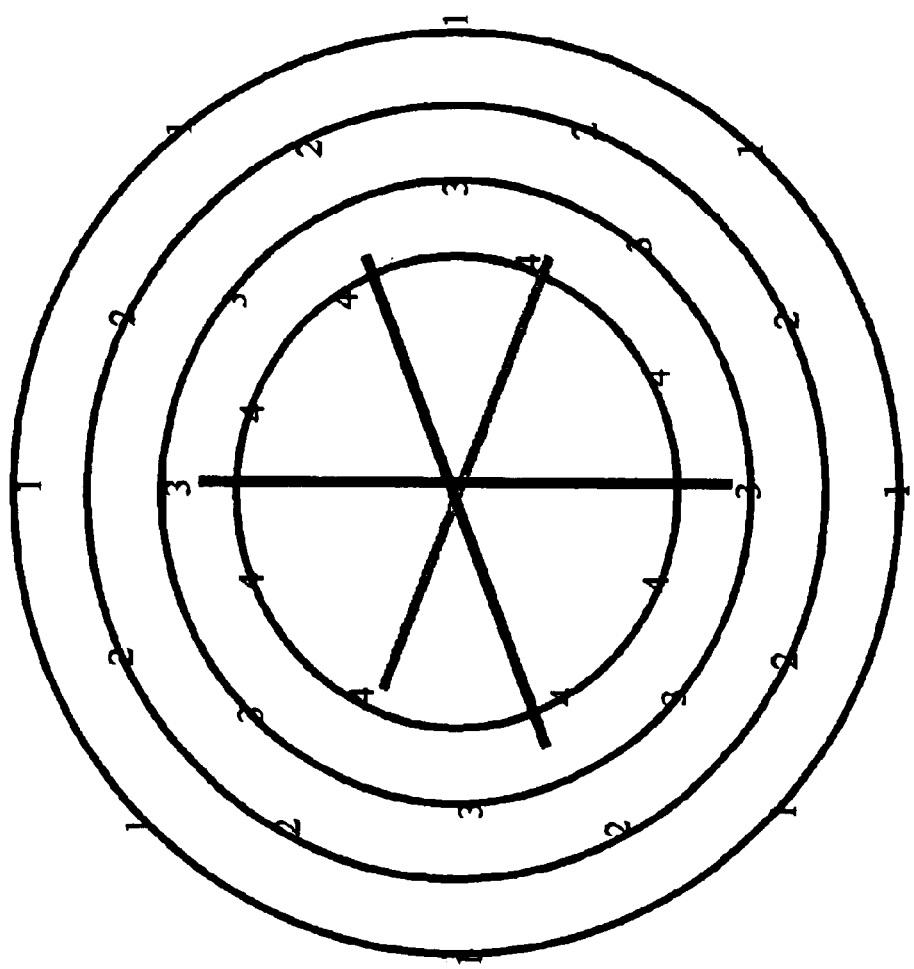
FIG. 4D is a schematic diagram illustrating the digital symbols generated by polarization concentric spherical amplitude shift keying.

Bandwidth efficient space-time modulator 12 performs mapping of space-time data symbols to a multi-dimensional of space-time signal space. The temporal signal constellation follows the two dimensional inphase and quadrature plane representation of amplitude and phase. The spatial modulation is represented by one of the constellation of distinct polarization states in the Poincare sphere as shown in FIG. 4A through FIG. 4D. FIG. 4A constellation corresponds to polarization phase shift keying in the plane of Stokes parameters $S_2$ and $S_3$. FIG. 4B shows a constellation of polarization frequency shift keying in multiple planes defined by $S_1$. FIG. 4C illustrates the constellation scheme of spherical amplitude shift keying where all three Stokes parameters $S_1$, $S_2$ and $S_3$ are required to specify each polarization state. By expanding FIG. 4C constellation to include inner spheres, FIG. 4D shows the layout of concentric spherical amplitude shift keying.

Figure 7A:
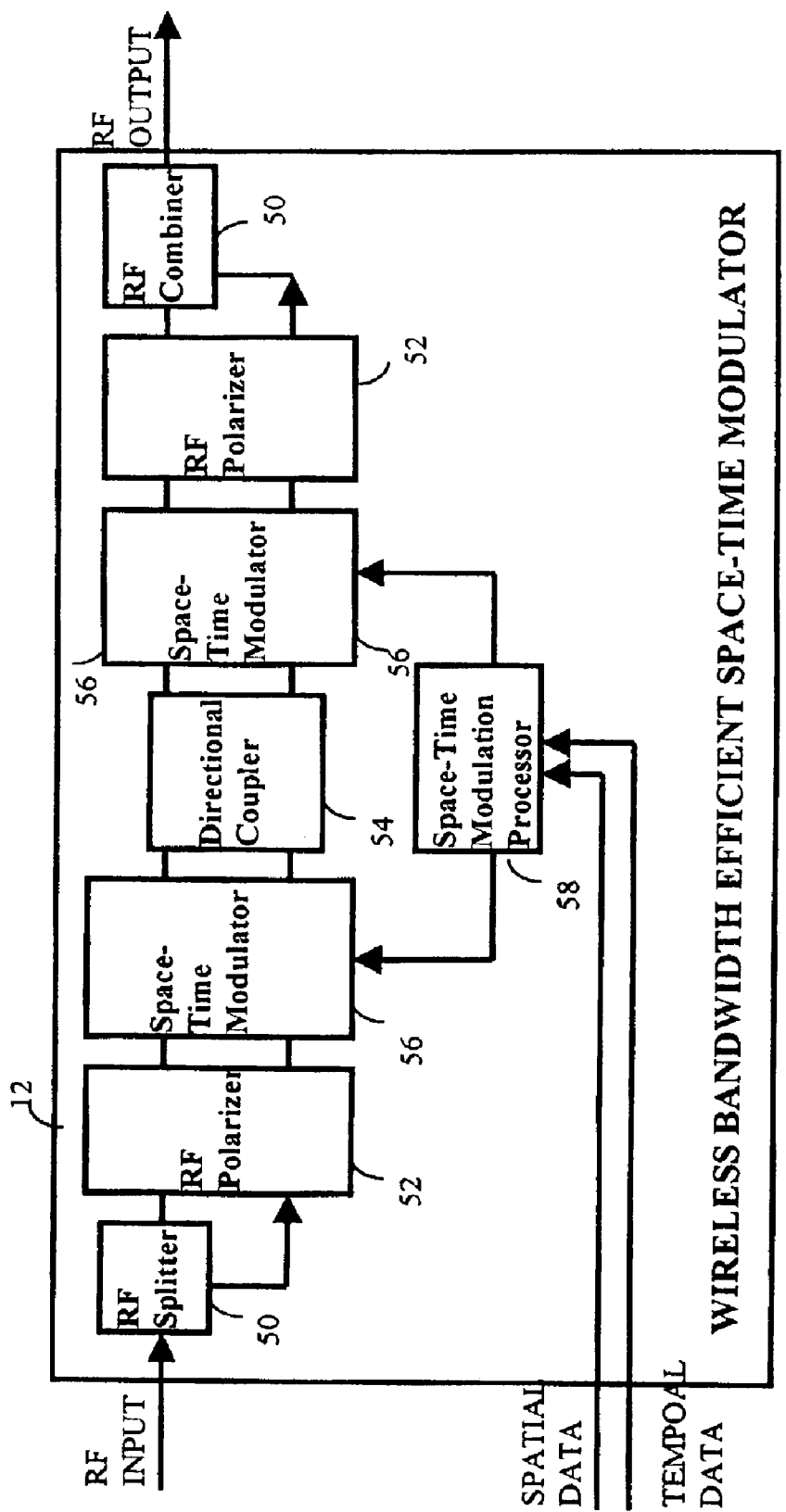
FIG. 7A is a schematic block diagram illustrating the detail processing of bandwidth efficient space-time wireless modulator.

The implementation of bandwidth efficient space-time modulator 12 is shown in block diagram FIG. 7A. Bandwidth efficient space-time modulator 12 is comprised of an RF input port connected to radio frequency splitter 50 that produces two outputs. These outputs are polarized by radio frequency polarizer 52 to form orthogonal polarization states. Space-time modulators 56 and directional coupler 54 provide a symmetric mapping operation in shifting phase, amplitude and frequency in the inphase and quadrature temporal signal space and in the Stokes space of the RF signal under the control of space-time modulation processor 58 based on the input spatial and temporal data stream. The two orthogonal polarization outputs of space-time modulator 56 are recombined by RF combiner 50 after reversing polarization rotation by RF polarizer 52.

Figure 8A:
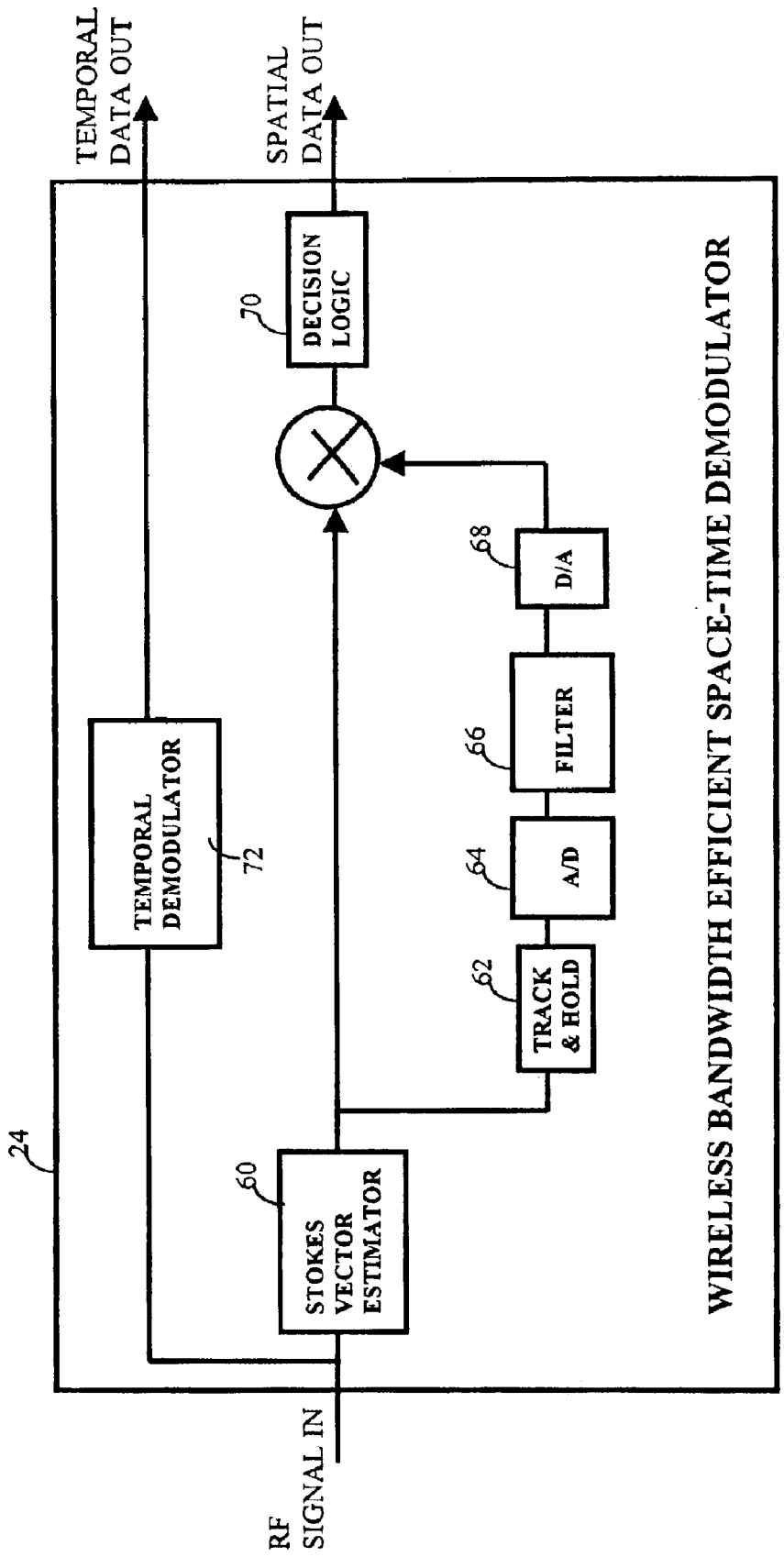
FIG. 8A is a schematic block diagram illustrating the detail processing of bandwidth efficient space-time wireless demodulator.

Bandwidth efficient space-time demodulator 24 is illustrated in FIG. 8A. It performs functions of spatial and temporal demodulation. Temporal demodulator 72 performs inphase and quadrature demodulation of the temporal signal. Spatial demodulation consists of Stokes vector estimator 60, followed by a control loop comprised of track and hold circuit 62, analog to digital converter 64, filter 66, digital to analog converter 68 and decision logic block 70. Stokes vector estimator 60 derives the polarization states of the received radio frequency signal while the tracking loop maintains symbol synchronization throughout the demodulation operation.

Figure 1C:
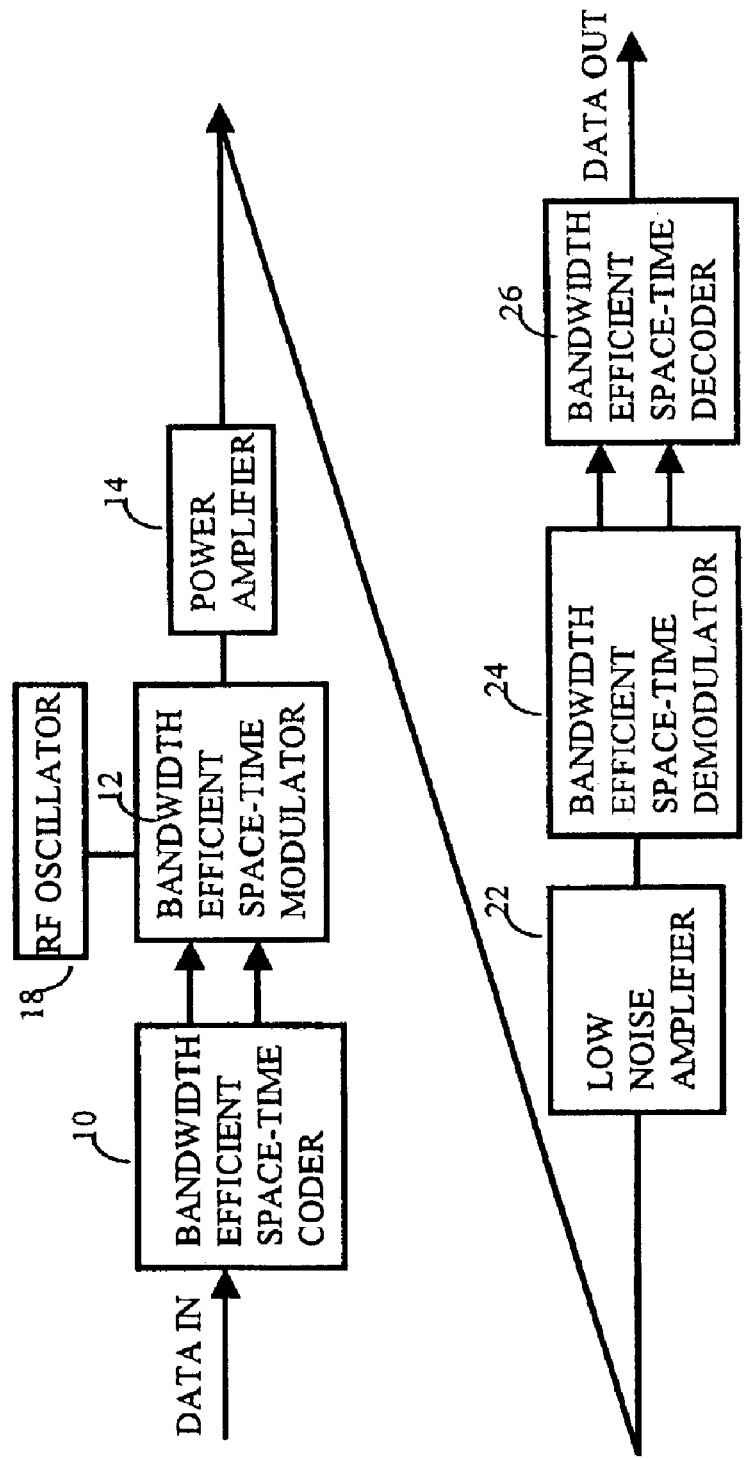
FIG. 1C is a schematic block diagram of another embodiment of a wired system at radio frequency for increasing channel capacity and throughput of a wired radio frequency communication networks according to the invention.

Another embodiment of the invention for a single-cabled space-time communications link is illustrated in FIG. 1C. It consists of a RF carrier from source 18, space-time modulated by a spatial and temporal data stream from a space-time bandwidth efficient coder 10 at bandwidth efficient space-time modulator 12. The signal is power amplified 14 before transmission through the cable. At the receiving end of the cable, the RF signal is amplified by low noise amplifier 22 followed by space-time demodulation by demodulator 24. Finally, the demodulated spatial and temporal data streams are decoded by the space-time decoder 26.

Figure 1D:
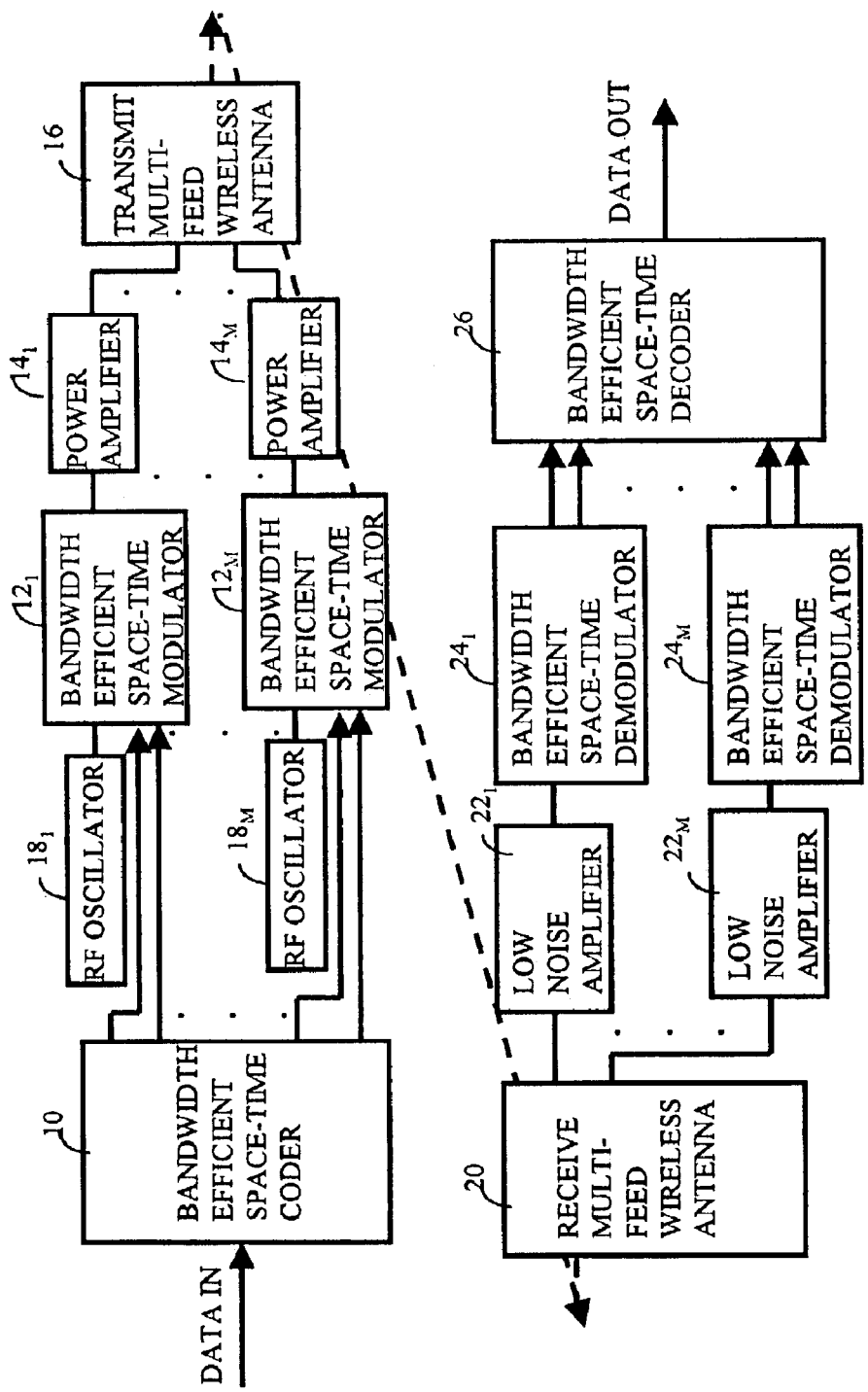
FIG. 1D is a schematic block diagram illustrating a multi-feed wireless communication link as an extension of the single-feed design with each feed connected to separate modulators with multiplexed data input from the space-time coder.

Another embodiment of the invention for a wireless communications link using a multi-feed antenna is illustrated in FIG. 1D. It consists of a plurality of RF carriers from RF oscillator sources $18_1$ through $18_M$, space-time modulation by a plurality of spatial and temporal data streams from space-time bandwidth efficient coder 10 at a plurality of bandwidth efficient space-time modulators $12_1$ through $12_M$. The plurality of signals are amplified by power amplifiers $14_1$ to $14_M$, before emission from antenna 16. At the receiver, the RF signal is collected at antenna 20 and then divided into a plurality of multi-feed signals. These signals are amplified by low noise amplifiers $22_1$ through $22_M$ to boost the level, followed by bandwidth efficient space-time demodulation by demodulators $24_1$ to $24_M$. Finally, a plurality of the demodulated spatial and temporal data streams are decoded by the space-time decoder 26.

Figure 5B:
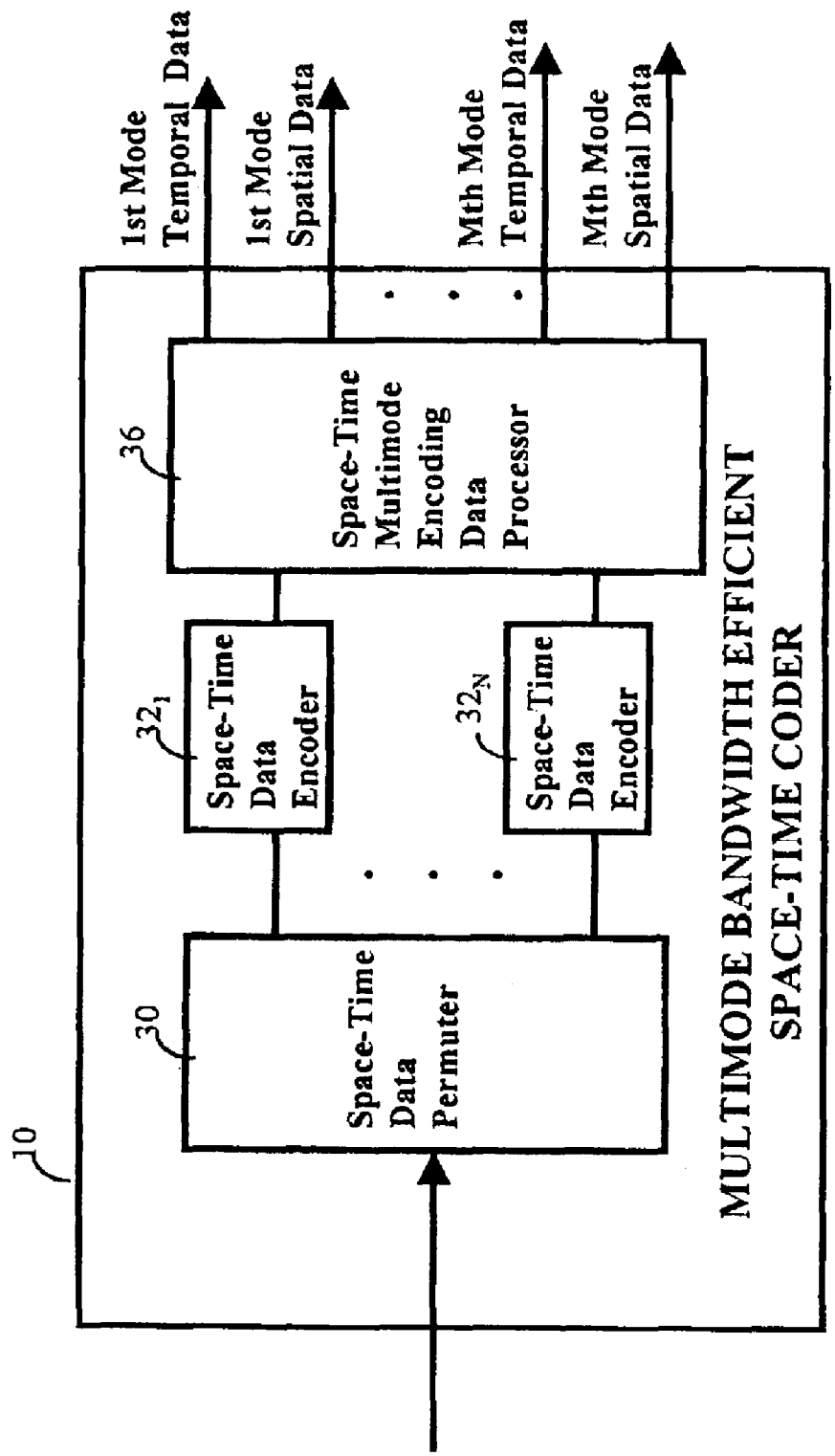
FIG. 5B is a schematic block diagram illustrating the detail processing of multimode bandwidth efficient space-time encoder.

While the implementation of the bandwidth efficient space-time modulator and demodulator remains the same as in earlier embodiments. The multi-feed antenna requires multiple space-time data streams provided by the multimode bandwidth efficient space-time coder shown in FIG. 5B. For multimode operation, the space-time encoding data processor can support M channels of space-time data streams.

Figure 6B:
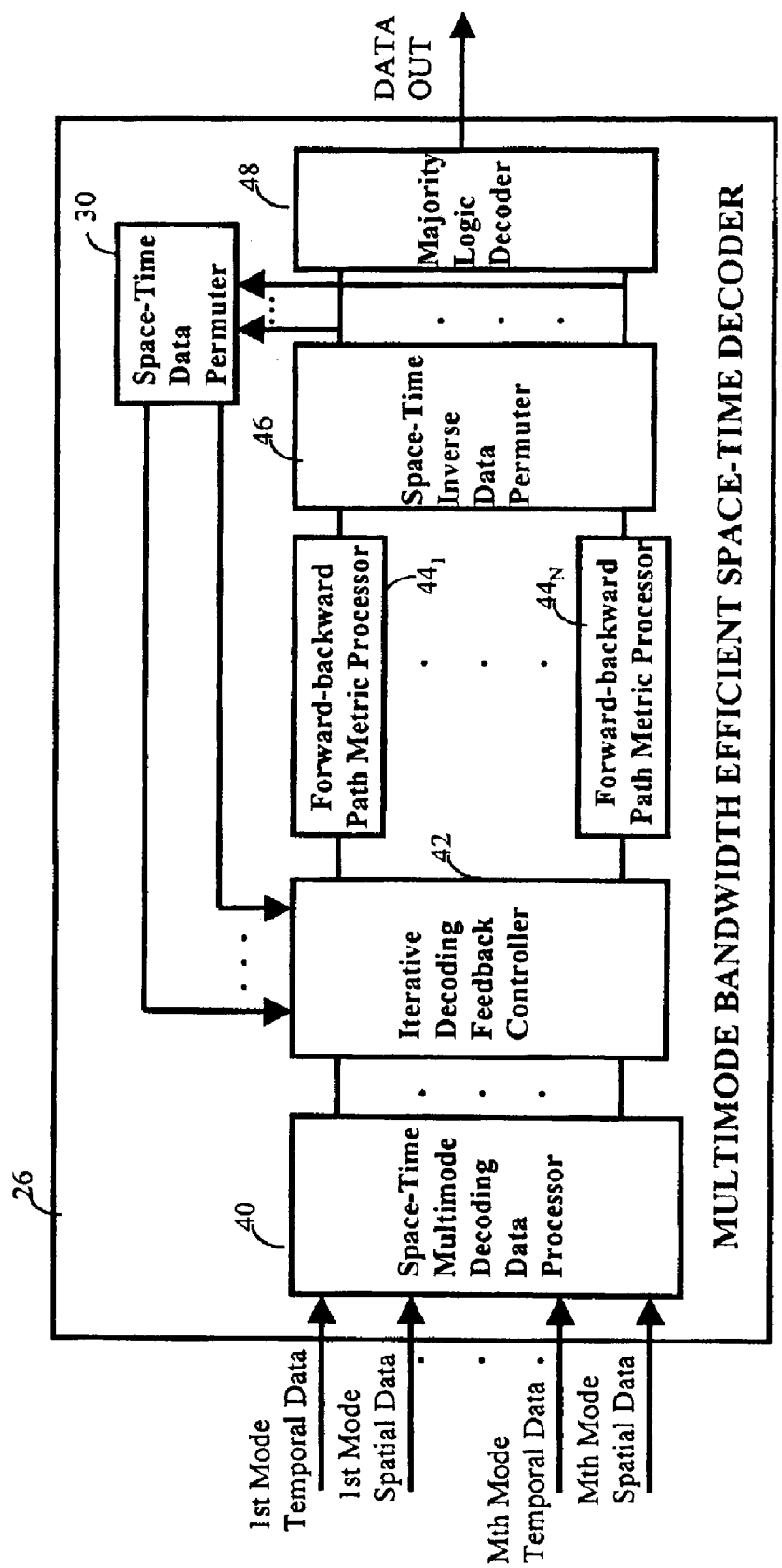
FIG. 6B is a schematic block diagram illustrating the detail processing of multimode bandwidth efficient space-time decoder.

At the receiver, bandwidth efficient space-time decoder 26 decodes the demodulated space-time symbols to recover the original transmitted data. The multimode decoding operation is shown in FIG. 6B. Space-time decoding data processor 40 de-multiplexes M channels of the space-time symbols from the demodulator into various coded components. Under the iterative decoding feedback controller 42, various coded components are then individually trellis decoded by a plurality of forward-backward path metric processors $44_1$ to $44_N$ according to the maximum a posteriori probability (MAP) rule. An inverse mapping of data position is then carried out at the space-time inverse data permuter 46 and majority logic decoder 48 to recover the raw data.

Figure 1E:
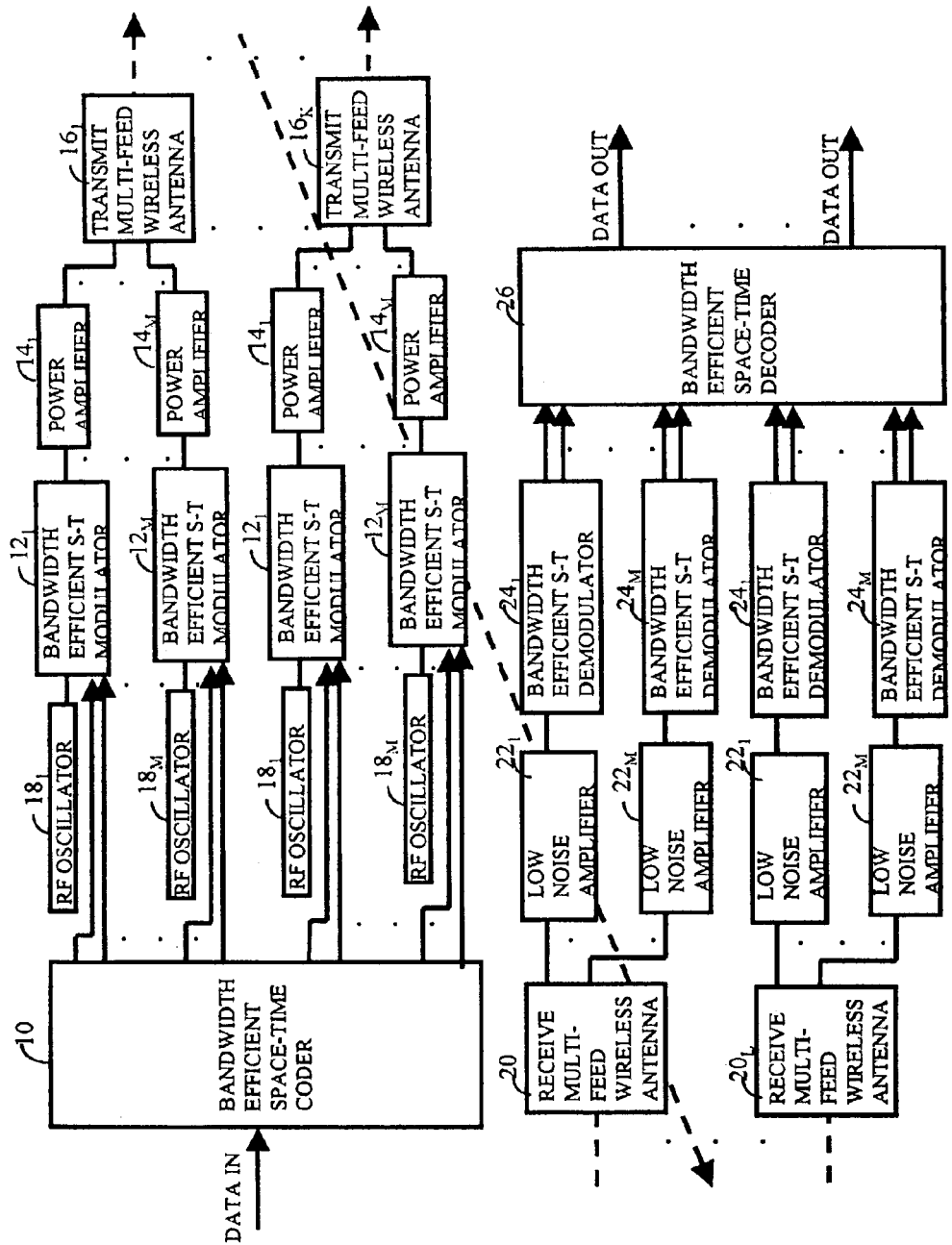
FIG. 1E is a schematic block diagram of a variation of the embodiment of FIG. 1D that expands the data capacity and throughputs by using antenna array with each antenna carrying multiple feeds.

Another embodiment of the invention for a wireless communications link using a multi-feed multi-antenna is illustrated in FIG. 1E. It consists of a plurality of RF carrier signal sources from RF oscillators $18_1$ through $18_M$, space-time modulation by a plurality of spatial and temporal data streams from space-time bandwidth efficient coder 10 at a plurality of bandwidth efficient space-time modulators $12_1$ through $12_M$. A plurality of the signals are amplified by power amplifiers $14_1$ to $14_M$, before emission from a plurality of multifeed wireless antennas $16_1$ through $16_K$ At the receiver, the RF signal is collected at a plurality of multifeed wireless antennas $20_1$ through $20_L$ Each antenna output is divided into a plurality of multi-feed signals. These signals are amplified by law noise amplifiers $22_1$ through $22_M$ to boost the level to compensate for path loss, followed by space-time demodulation by demodulators $24_1$ to $24_M$. Finally, a plurality of the demodulated spatial and temporal data streams are decoded by the space-time decoder 26.

Figure 5C:
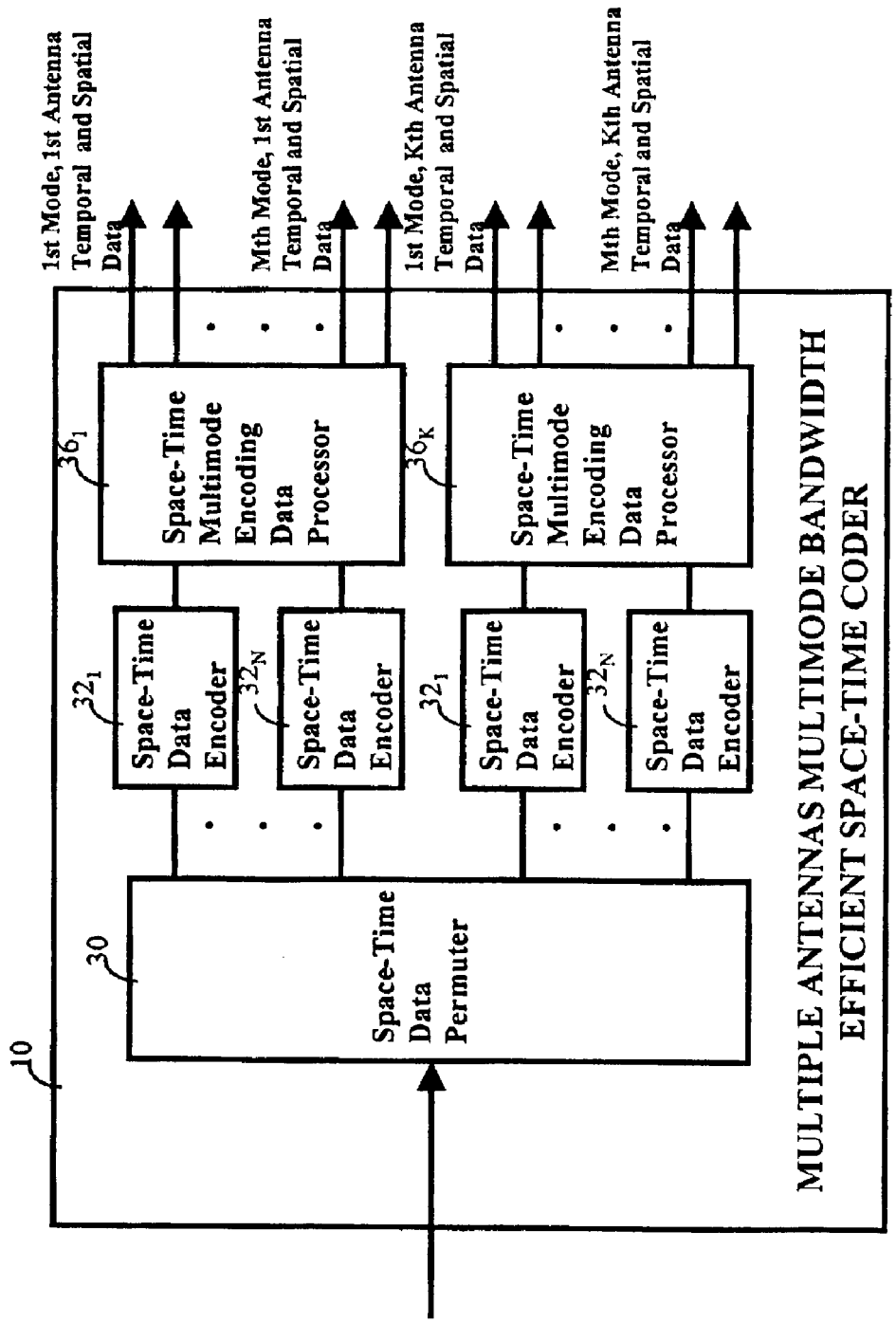
FIG. 5C is a schematic block diagram illustrating the detail processing of multiple antennas multimode bandwidth efficient encoder.

The multi-feed multi-antenna system requires multiple sets of M channel space-time data streams provided by the multimode multi-antenna bandwidth efficient space-time coder shown in FIG. 5C. For multi-antenna operation, the space-time encoding data processor can support multiple M channels of space-time data streams.

Figure 6C:
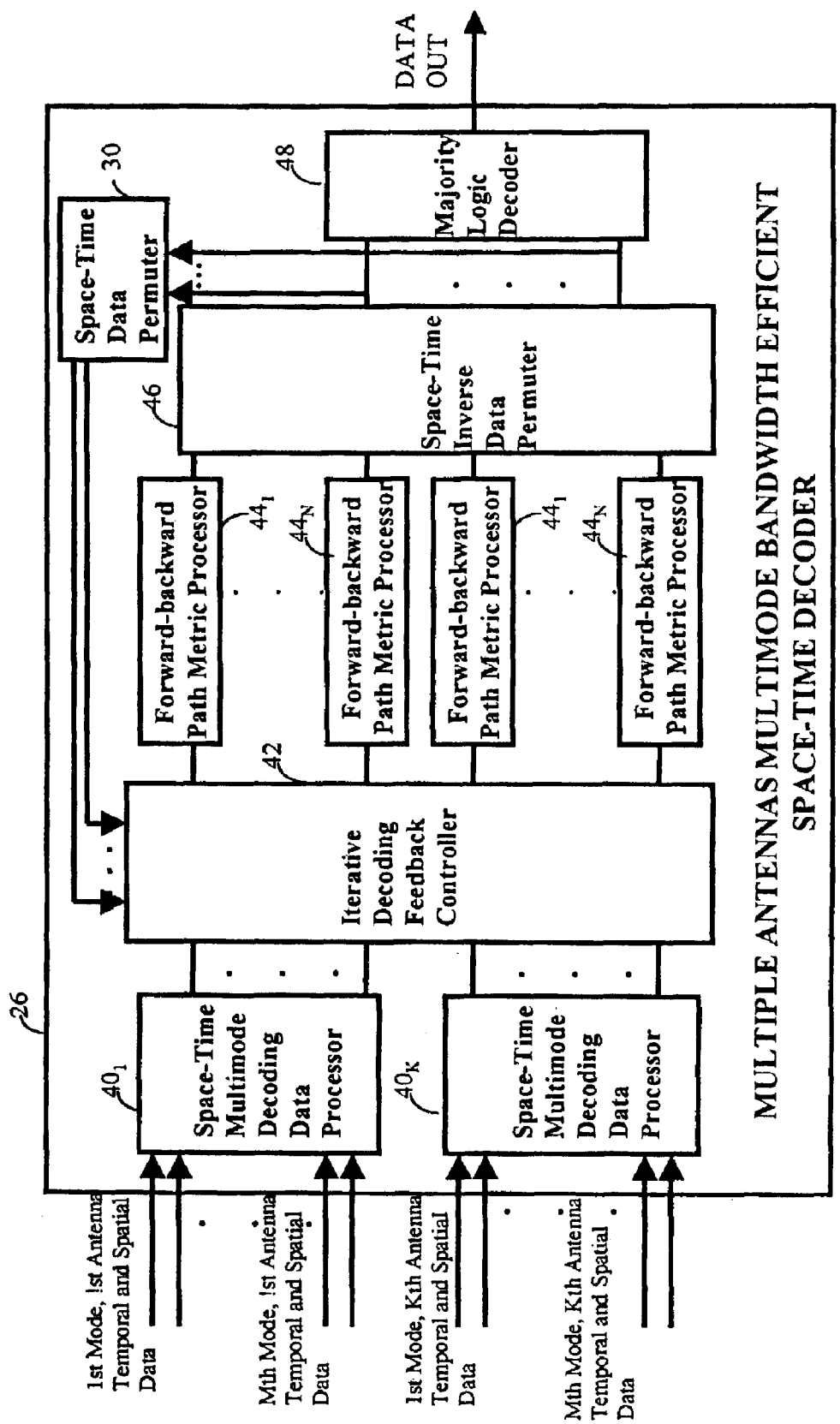
FIG. 6C is a schematic block diagram illustrating the detail processing of multiple antennas multimode bandwidth efficient decoder.

At the receiver, bandwidth efficient space-time decoder 26 decodes the demodulated space-time symbols to recover the original transmitted data. The multi-antenna multimode decoding operation is shown in FIG. 6C. Space-time decoding data processor 40 de-multiplexes K sets of M channels space-time symbols from the demodulator into various coded components. Under the iterative decoding feedback controller 42, various coded components are then individually trellis decoded by a plurality of forward-backward path metric processors $44_1$ to $44_N$ according to the maximum a posteriori probability (MAP) rule. An inverse mapping of data position is then carried out at the space-time inverse data permuter 46 and majority logic decoder 48 to recover the raw data.

Figure 2A:
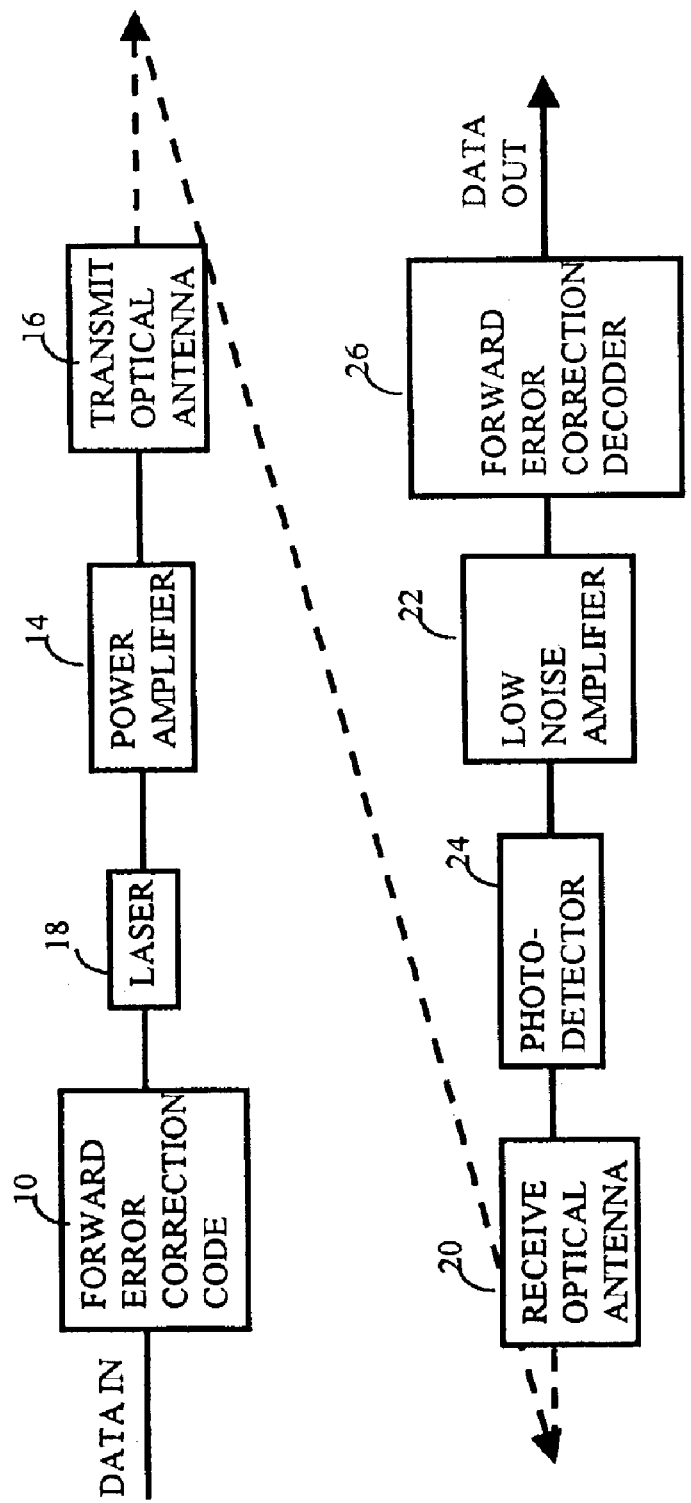
FIG. 2A is a schematic block diagram of prior art implementation of an unguided optical link with intensity modulation of a data stream usually coded with convolutional or Reed-Solomon parity bits where the receiver performs photo-detection and decoding of the received data stream.

The prior art implementation of a wireless optical communication system is illustrated in FIG. 2A. It consists of optical carrier generated from laser source 18, modulated by a forward error correction (FEC) coder 10 to produce encoded data. The signal is amplified and transmitted through optical antenna 16. At low noise receiving antenna 20, the transmitted signal is amplified by amplifier 22 and detected by photodetector 24 before decoding by FEC decoder 26.

Figure 2B:
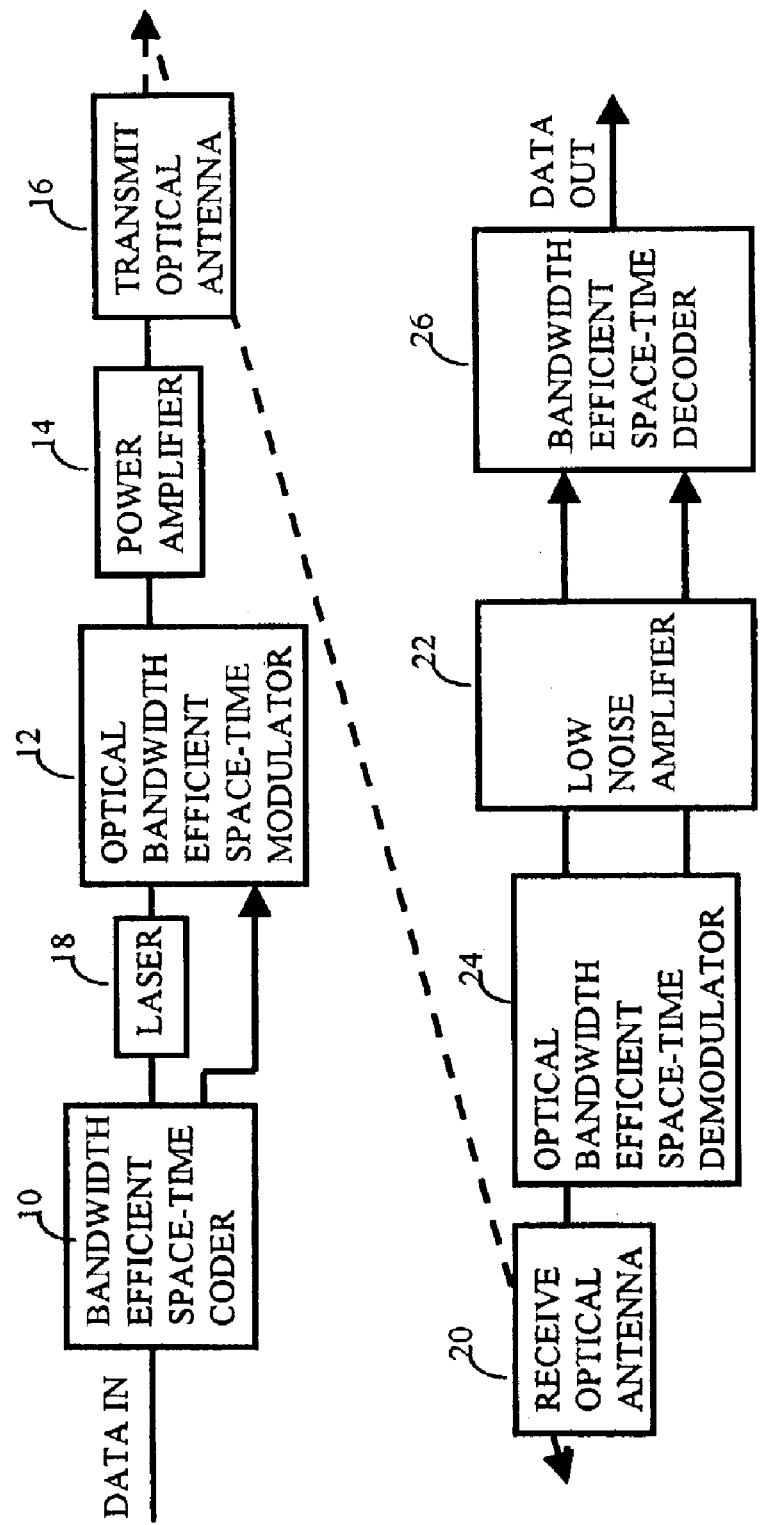
FIG. 2B is a schematic block diagram of an embodiment comprised of a free space optical link with direct modulation and detection for increasing channel capacity and throughput of a free space or an underwater optical communication networks.

An embodiment of the invention for a direct modulated wireless optical communications link with a single feed antenna is illustrated in FIG. 2B. It consists of optical carrier signal from laser source 18, space-time modulated by a spatial and temporal data stream from space-time bandwidth efficient coder 10 at bandwidth efficient space-time modulator 12. The signal is amplified by power amplifier 14 before emission from optical antenna 16. At the receiver, the optical signal is collected at antenna 20, space-time demodulated by demodulator 24 and amplified by low noise amplifier 22 to compensate for losses. Finally, the demodulated spatial and temporal data streams are decoded by space-time decoder 26.

Bandwidth efficient space-time coder 10 performs the encoding function of the raw data into a coded sequence as illustrated in FIG. 5A and described previously.

At the receiver, space-time decoder 26 decodes the demodulated space-time symbols to recover the original transmitted data. The decoding operation is shown in FIG. 6A. Space-time decoding data processor 40 de-multiplexes the space-time symbols from the demodulator into various coded components. Under the iterative decoding feedback controller, various coded components are then individually trellis decoded by a plurality of forward-backward path metric processors $44_1$ to $44_N$ according to the maximum a posteriori probability (MAP) rule. An inverse mapping of data position is then carried out at the space-time inverse data permuter 46 and the majority logic decoder 48 to recover the raw data. For achieving superb coding gain, a feedback type of iterative decoding process via space-time data permuter 30 is used.

Bandwidth efficient space-time modulator 12 performs mapping of space-time data symbols to a multi-dimensional of space-time signal space. The temporal signal constellation follows the two dimensional inphase and quadrature plane representation of amplitude and phase. Spatial modulation is represented by one of the constellation of distinct polarization states in Poincare sphere as shown and described previously with reference to FIGS. 4A through FIG. 4D.

Figure 7B:
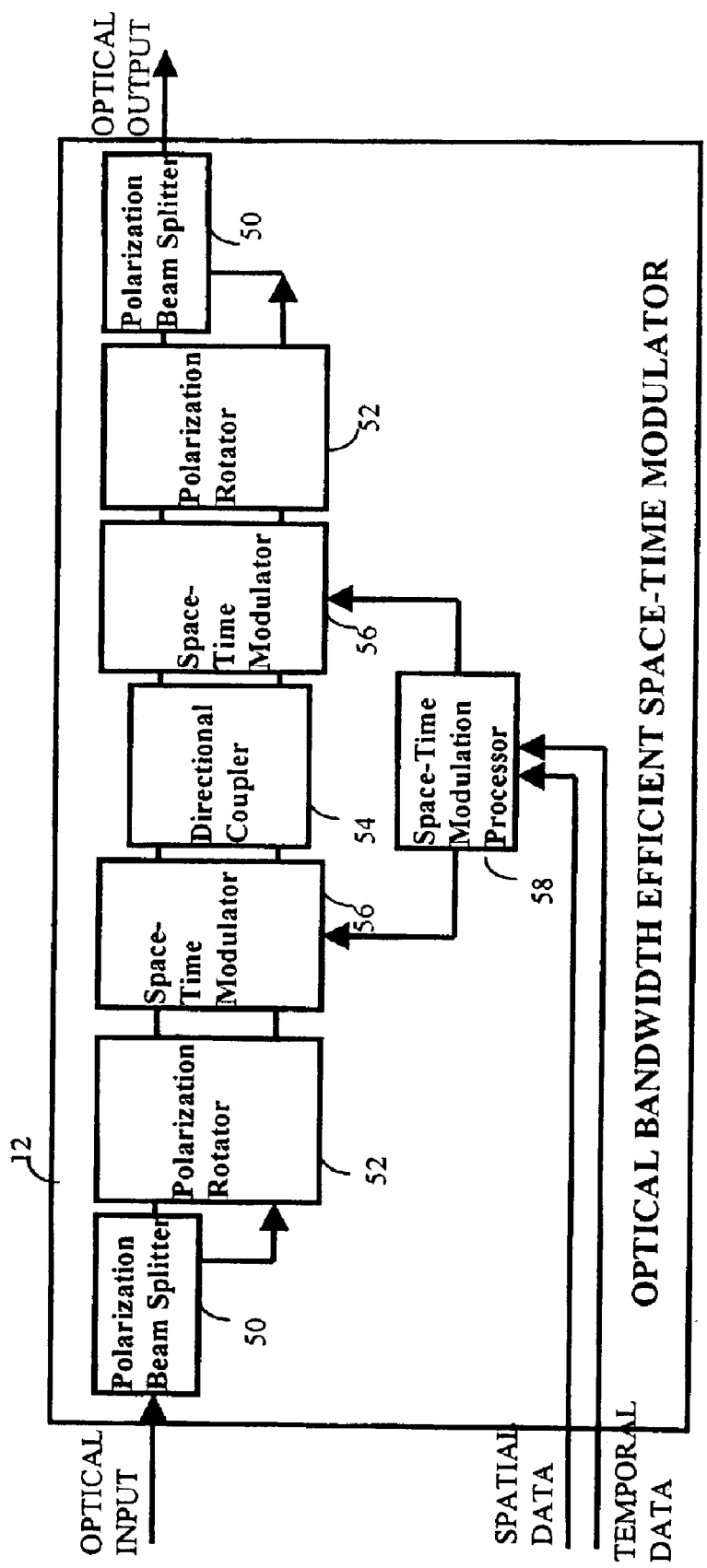
FIG. 7B is a schematic block diagram illustrating the detail processing of the bandwidth efficient space-time optical modulator.

The implementation of bandwidth efficient space-time modulator 12 is shown in block diagram of FIG. 7B. Bandwidth efficient space-time modulator 12 is comprised of an optical input port connected to a polarization beam splitter 50 that produces two outputs with orthogonal polarization states. The outputs are rotated by polarization rotator 52. Space-time modulators 56 and directional coupler 54 provide a symmetric mapping operation in shifting phase, amplitude and frequency in the inphase and quadrature temporal signal space and in the Stokes space of the optical signal under the control of space-time modulation processor 58 based on input spatial and temporal data stream. The two orthogonal polarization outputs of space-time modulator 56 are recombined by polarization beam splitter 50 after reversing rotation back by polarization rotator 52.

Figure 8B:
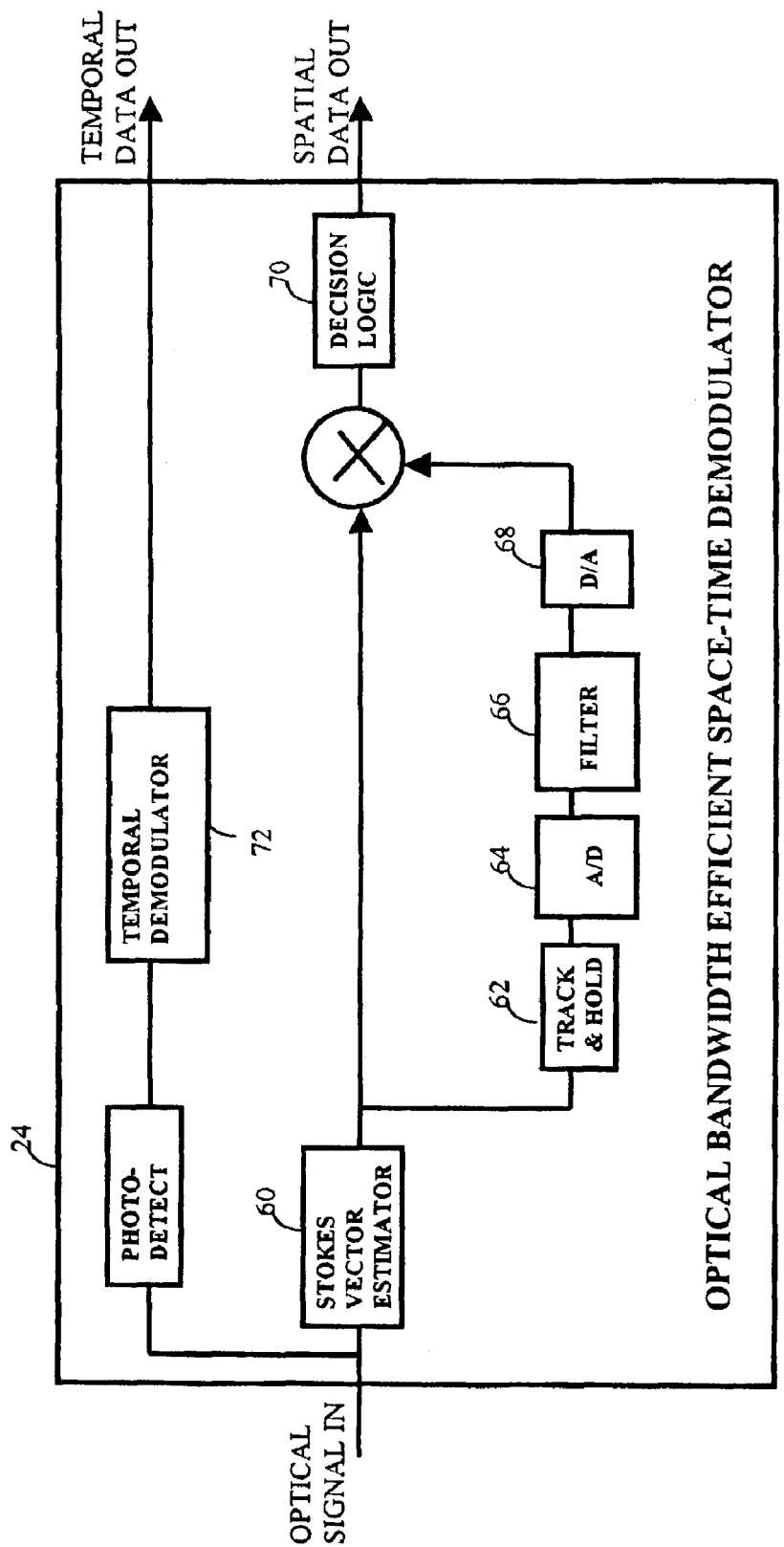
FIG. 8B is a schematic block diagram illustrating the detail processing of the bandwidth efficient space-time optical demodulator.

Bandwidth efficient space-time demodulator 24 is illustrated and its operation described previously with reference to FIG. 8B. It performs functions of spatial and temporal demodulation. Temporal demodulator 72 performs inphase and quadrature demodulation of the temporal signal. Spatial demodulation consists of Stokes vector estimator 60, followed by a control loop comprised of track and hold circuit 62, analog to digital converter 64, filter 66, digital to analog converter 68 and decision logic block 70. Stokes vector estimator 60 derives the polarization states of received optical signal while the tracking loop maintains symbol synchronization throughout the demodulation operation.

Figure 2C:
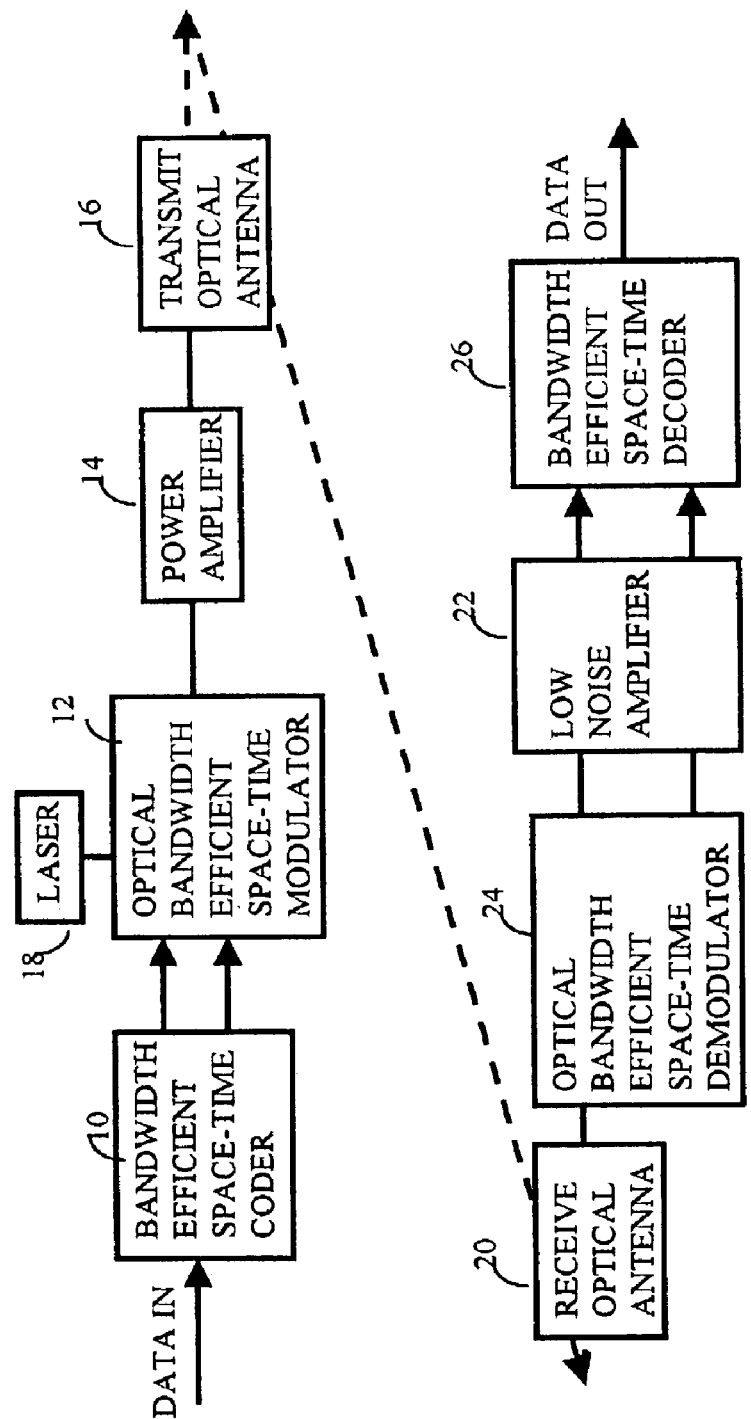
FIG. 2C is a schematic block diagram of a variation of the embodiment illustrated in FIG. 2B of a free space optical system utilizing indirect modulation and detection.

Another embodiment of the invention for an indirect modulated wireless optical communications link with a single feed antenna is illustrated in FIG. 2C. It consists of optical carrier from laser source 18, space-time modulated by a spatial and temporal data stream from space-time bandwidth efficient coder 10 at the bandwidth efficient space-time modulator 12. The signal is amplified by power amplifier 14 before emission from optical antenna 16. At the receiver, the optical signal is collected at antenna 20, demodulated by space-time demodulator 24 and amplified by amplifier 22. Finally, the demodulated spatial and temporal data streams are decoded by space-time decoder 26.

Figure 2D:
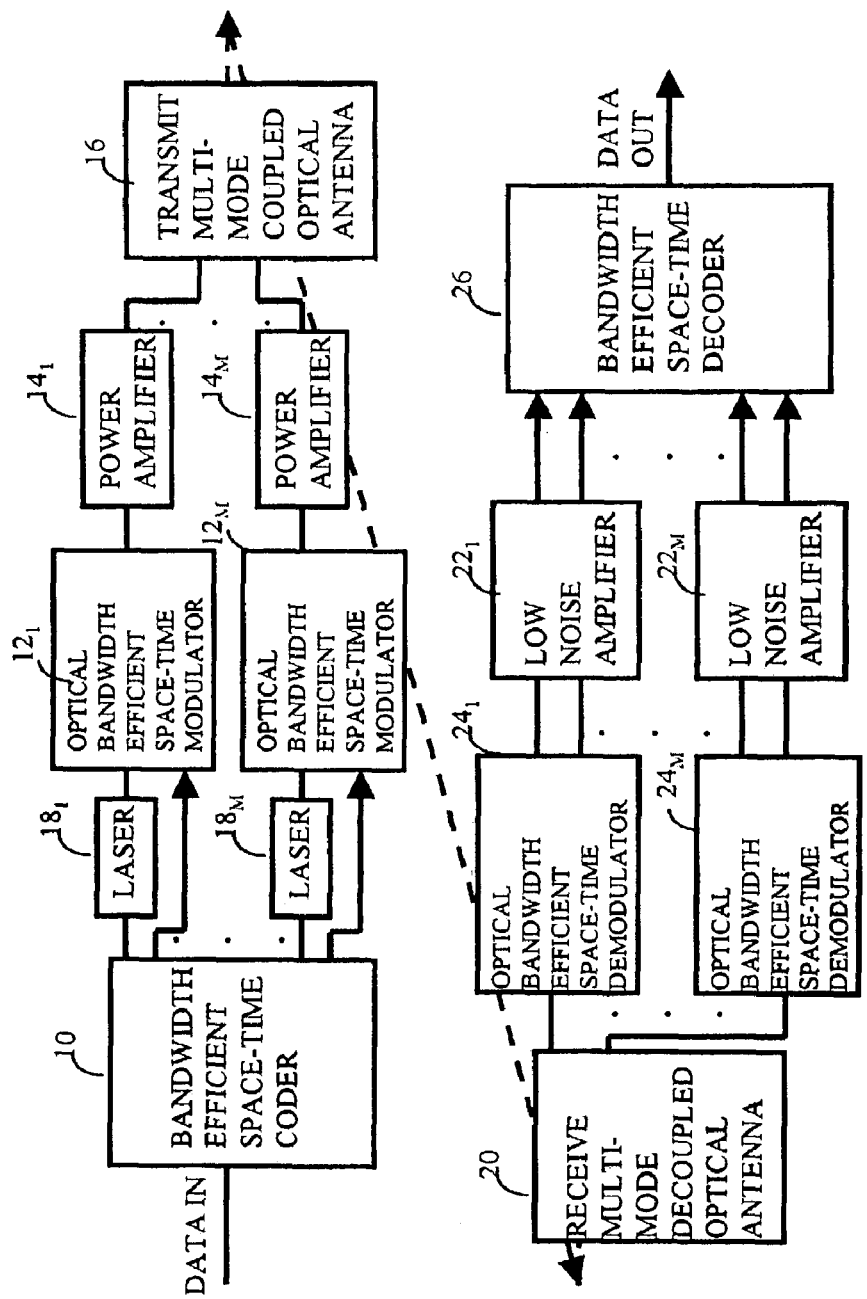
FIG. 2D is a schematic block diagram of another embodiment comprised of a free space optical link with multimode direct modulation and detection for increasing channel capacity and throughput of a free space or an underwater optical communication networks.

Another embodiment of the invention for a direct modulated wireless optical communications link using a multi-mode coupled antenna is illustrated in FIG. 2D. It consists of a plurality of optical carriers from laser sources $18_1$ through $18_M$, space-time modulated by a plurality of spatial and temporal data streams from space-time bandwidth efficient coder 10 at a plurality of bandwidth efficient space-time modulators $12_1$ through $12_M$. A plurality of the optical signals are power amplified by power amplifiers $14_1$ to $14_M$, before emission from optical antenna 16. At the receiver, the optical signal is collected by antenna 20 and then divided into a plurality of multi-mode signals. These signals are amplified by amplifiers $22_1$ through $22_M$ to boost the level after space-time demodulation by demodulators $24_1$ to $24_M$. Finally, a plurality of the demodulated spatial and temporal data streams are decoded by the space-time decoder 26.

While the implementation of the optical bandwidth efficient space-time modulator and demodulator remains the same as in earlier embodiments. The multi-mode coupled optical antenna requires multiple space-time data streams provided by the multimode bandwidth efficient space-time coder shown in FIG. 5B. For multimode operation, space-time encoding data processor can support M channels of space-time data streams.

At the receiver, bandwidth efficient space-time decoder 26 decodes the demodulated space-time symbols to recover the original transmitted data. Multimode decoding operation is shown in FIG. 6B. Space-time decoding data processor 40 de-multiplexes M channels of space-time symbols from demodulator into various coded components. Under the iterative decoding feedback controller, various coded components are then individually trellis decoded by a plurality of forward-backward path metric processors $44_1$ to $44_N$ according to the maximum a posteriori probability (MAP) rule. An inverse mapping of data position is then carried out at the space-time inverse data permuter 46 and majority logic decoder 48 to recover the raw data.

Figure 2E:
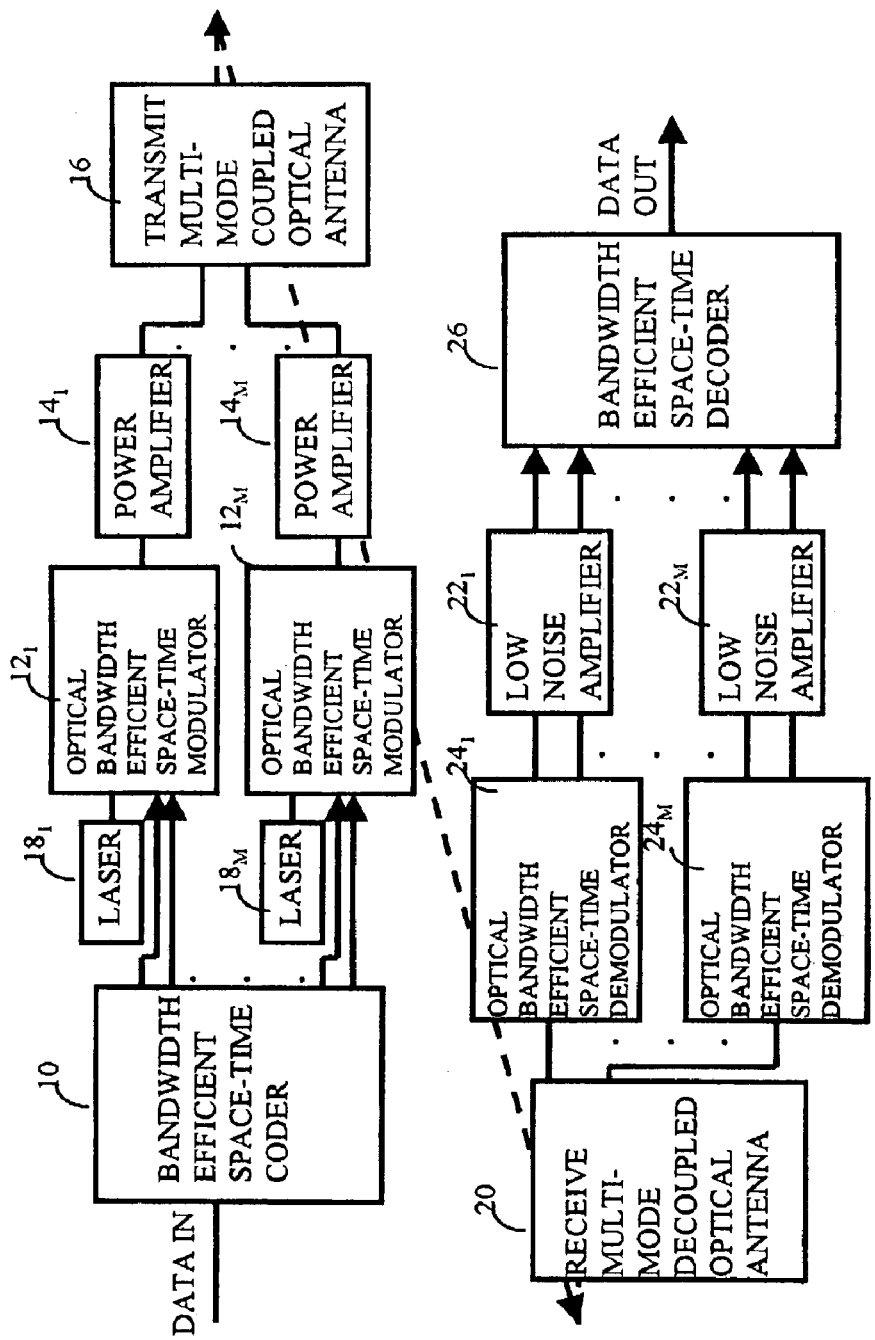
FIG. 2E is a schematic block diagram of a variation of the embodiment illustrated in FIG. 2D comprised of a free space optical system utilizing multimode indirect modulation and detection.

Another embodiment of the invention for an indirect modulated wireless optical communications link using a multi-mode coupled antenna is illustrated in FIG. 2E. It consists of a plurality of optical signal carriers from laser sources $18_1$ through $18_M$, space-time modulated by a plurality of spatial and temporal data streams from space-time bandwidth efficient coder 10 at a plurality of bandwidth efficient space-time modulators $12_1$ through $12_M$. A plurality of the optical signals are amplified by power amplifiers $14_1$ to $14_M$, before emission from optical antenna 16. At the receiver, the optical signal is collected by antenna 20 and then divided into a plurality of multi-mode signals. These signals are amplified by low noise amplifiers $22_1$ through $22_M$ to boost the level after space-time demodulation by demodulators $24_1$ to $24_M$. Finally, a plurality of the demodulated spatial and temporal data streams are decoded by space-time decoder 26.

Figure 2F:
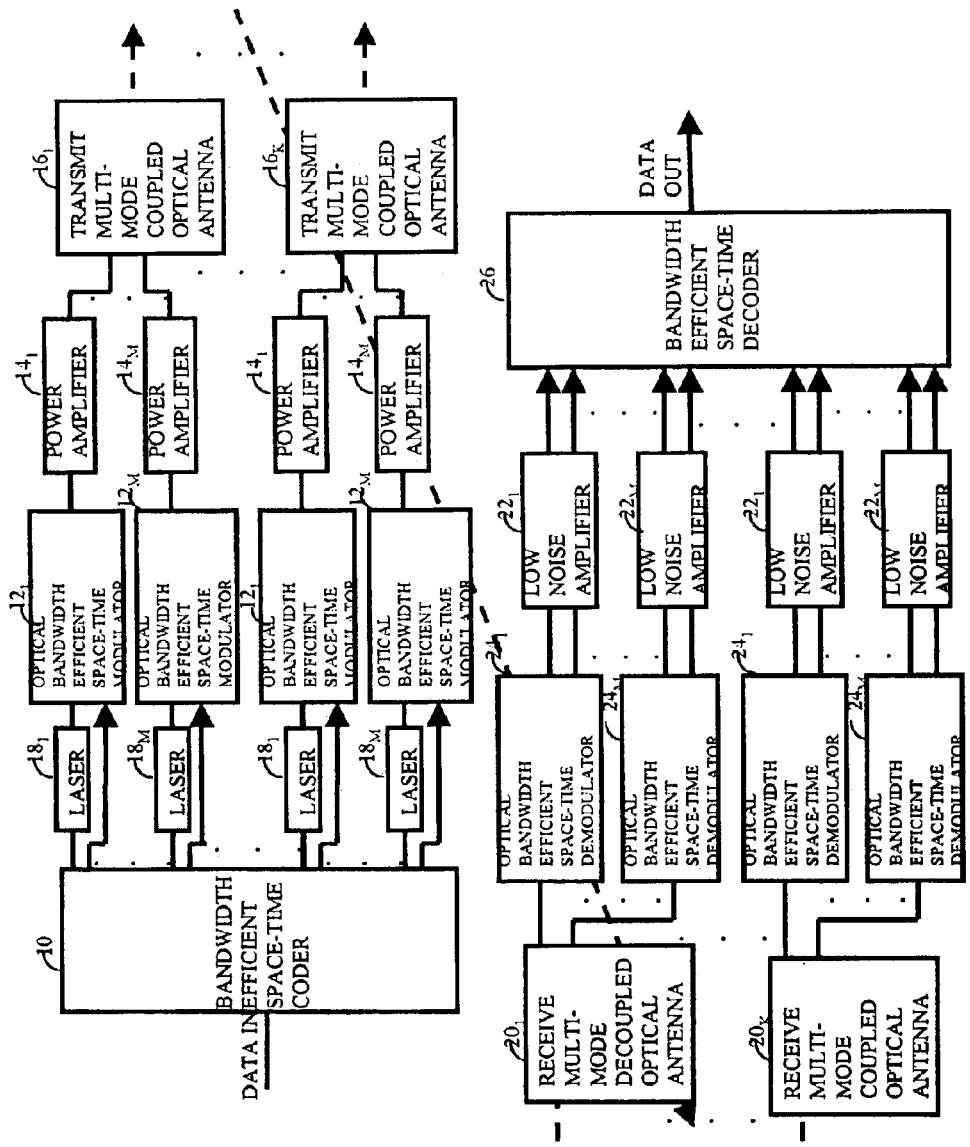
FIG. 2F is a schematic block diagram of another embodiment of a free space optical link with multiple antennas, multimode direct modulation and detection for increasing channel capacity and throughput of a free space or an underwater optical communication networks.

Another embodiment of the invention for a direct modulated wireless optical communications link using a multi-mode coupled multi-antenna is illustrated in FIG. 2F. It consists of a plurality of optical signal carriers from laser sources $18_1$ through $18_M$, space-time modulated by a plurality of spatial and temporal data streams from space-time bandwidth efficient coder 10 at a plurality of bandwidth efficient space-time modulators $12_1$ through $12_M$. A plurality of signals are amplified by power amplifiers $14_1$ to $14_M$, before emission from a plurality of antennas $16_1$ through $16_K$. At the receiver, the optical signal is collected by a plurality of antennas $20_1$ through $20_L$. Each antenna output is divided into a plurality of multimode signals. These signals are amplified by low noise amplifiers $22_1$ through $22_M$ to boost the level after space-time demodulation by demodulators $24_1$ to $24_M$. Finally, a plurality of the demodulated spatial and temporal data streams are decoded by the space-time decoder 26.

The multi-mode coupled multi-antenna system requires multiple sets of M channel space-time data streams provided by the multimode multi-antenna bandwidth efficient space-time coder shown in FIG. 5C and described previously.

At the receiver, bandwidth efficient space-time decoder 26 decodes the demodulated space-time symbols to recover the original transmitted data. The multi-antenna multimode decoding operation is shown in FIG. 6C. Space-time decoding data processor 40 de-multiplexes K sets of M channels space-time symbols from the demodulator into various coded components. Under the iterative decoding feedback controller 42, various coded components are then individually trellis decoded by a plurality of forward-backward path metric processors $44_1$ to $44_N$ according to the maximum a posteriori probability (MAP) rule. An inverse mapping of data position is then carried out at space-time inverse data permuter 46 and majority logic decoder 48 to recover the raw data.

Figure 2G:
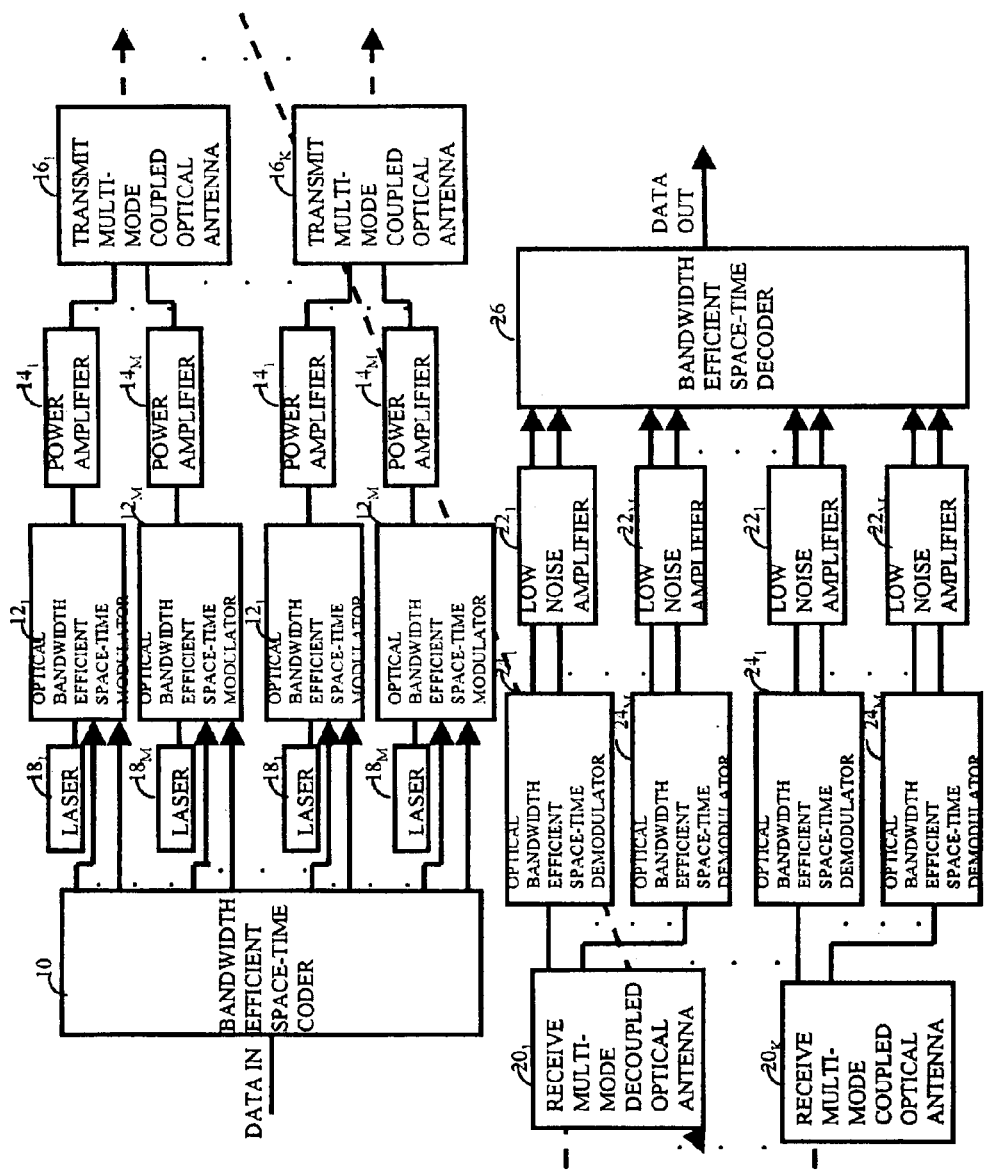
FIG. 2G is a schematic block diagram with a variation of the embodiment illustrated in FIG. 2F of a free space optical system utilizing multiple antennas, multimode indirect modulation and detection.

Another embodiment of the invention for an indirect modulated wireless optical communications link using a multimode-coupled multi-antenna is illustrated in FIG. 2G.

It consists of a plurality of optical signal carriers from laser sources $18_1$ through $18_M$, space-time modulated by a plurality of spatial and temporal data streams from space-time bandwidth efficient coder 10 at a plurality of bandwidth efficient space-time modulators $12_1$ through $12_M$. A plurality of the signals are amplified by power amplifiers $14_1$ to $14_M$, before emission from a plurality of antennas $16_1$ through $16_K$. At the receiver, the optical signal is collected at a plurality of antennas $20_1$ through $20_K$. Each antenna output is divided into a plurality of multimode signals. These signals are amplified by low noise amplifiers $22_1$ through $22_M$ to boost the level after space-time demodulation by demodulators $24_1$ to $24_M$. Finally, a plurality of the demodulated spatial and temporal data streams are decoded by the space-time decoder 26.

Figure 2H:
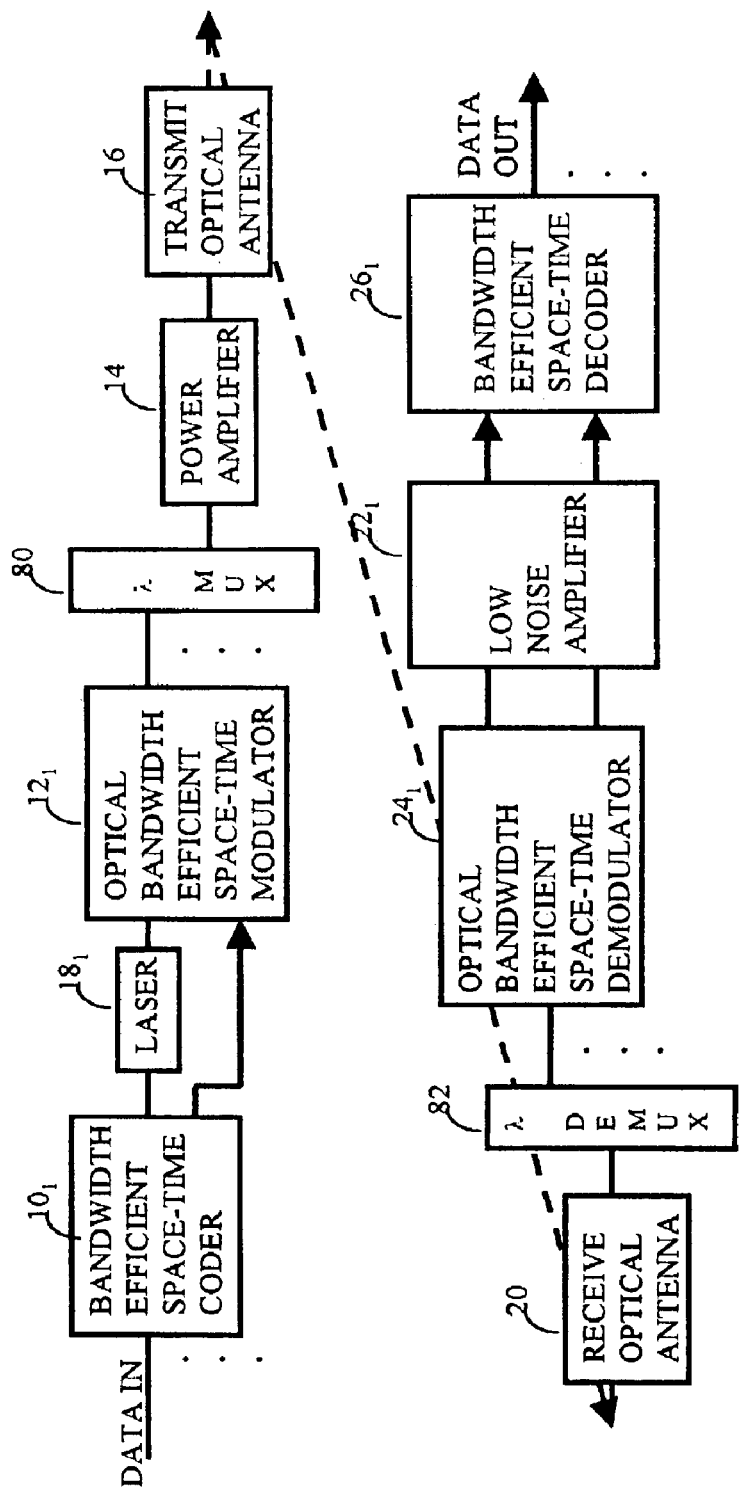
FIG. 2H is a schematic block diagram of an embodiment of a free space optical link with direct modulation and detection for increasing channel capacity and throughput of a free space or an underwater optical WDM communication networks.

One embodiment of the invention for direct modulated wireless optical WDM communications link with a single feed antenna is illustrated in FIG. 2H. It consists of a plurality of optical signal carriers from laser sources $18_1$ through $18_N$, space-time modulated by a spatial and temporal data stream from space-time bandwidth efficient coders $10_1$ to $10_N$ at the bandwidth efficient space-time modulator $12_1$ through $12_N$ The signal is multiplexed by wavelength multiplexer 80 followed by wideband power amplification by power amplifier 14 before emission from optical antenna 16. At the receiver, the optical signal is collected at antenna 20, demultiplexed by wavelength demultiplexer 82 before space-time demodulation by demodulators $24_1$ through $24_N$ and amplified by low noise amplifiers $22_1$ through $22_N$. Finally, the demodulated spatial and temporal data streams are decoded by the space-time decoders $26_1$ to $26_N$.

Figure 2I:
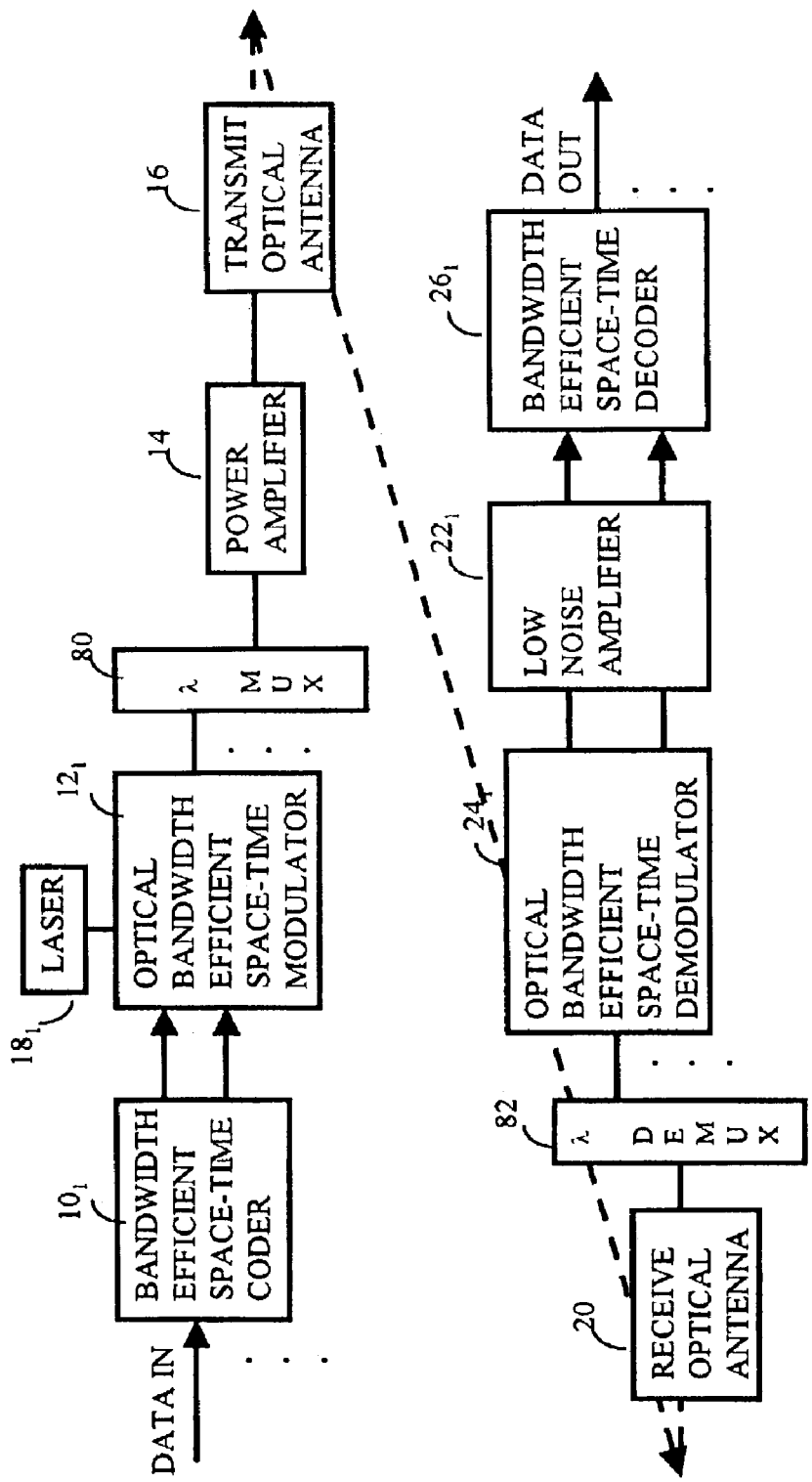
FIG. 2I is a schematic block diagram with a variation of the embodiment illustrated in FIG. 2H of a free space optical WDM system utilizing indirect modulation and detection.

Another embodiment of the invention for indirect modulated wireless optical WDM communications link with a single feed antenna is illustrated in FIG. 2I. It consists of optical signal carrier from laser source $18_1$ through $18_N$, space-time modulated by a spatial and temporal data stream from space-time bandwidth efficient coders $10_1$ to $10_N$ at bandwidth efficient space-time modulators $12_1$ through $12_N$ The signal is wideband amplified by power amplifier 14 before emission from optical antenna 16. At the receiver, the optical signal is collected at the antenna 20, demultiplexed by wavelength demultiplexer 82 before demodulation by space-time demodulators $24_1$ through $24_N$ and amplified by $22_1$ through $22_N$. Finally, the demodulated spatial and temporal data streams are decoded by space-time decoders $26_1$ to $26_N$.

Figure 2J:
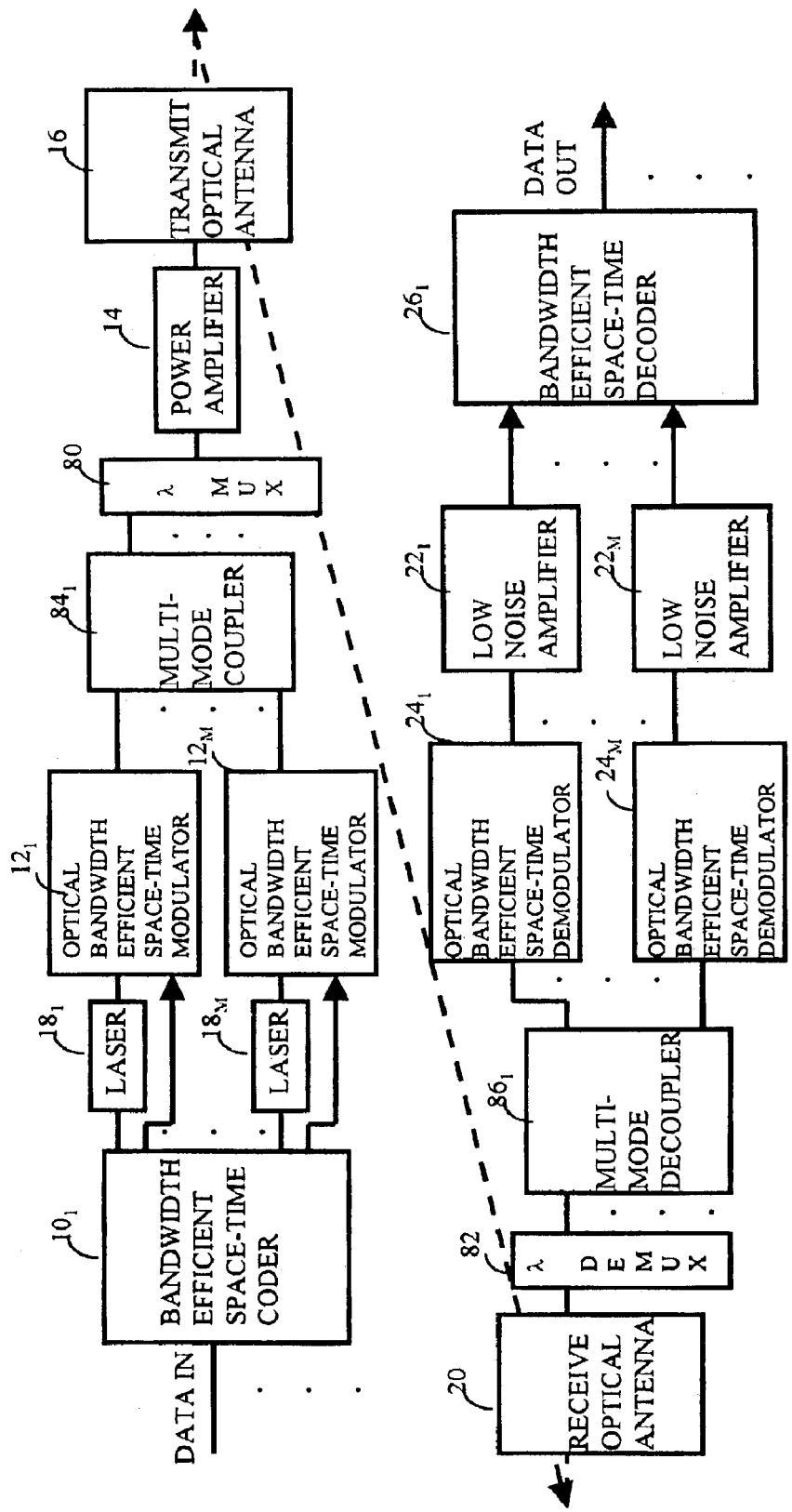
FIG. 2J is a schematic block diagram of another embodiment of a free space optical link with multimode direct modulation and detection for increasing channel capacity and throughput of a free space or an underwater optical WDM communication networks.

Another embodiment of the invention for a direct modulated wireless optical WDM communications link using a multi-mode coupled antenna is illustrated in FIG. 2J. It consists of a plurality of optical carriers from laser sources $18_1$ through $18_M$ for M modes, space-time modulated by a plurality of spatial and temporal data streams from space-time bandwidth efficient coders $10_1$ to $10_N$ for N wavelengths at a plurality of bandwidth efficient space-time modulators $12_1$ through $12_M$. The multimode multi-wavelengths optical signals are coupled by multimode coupler $84_1$ to $84_N$, wavelength division multiplexed by multiplexer 80 and wideband amplified by power amplifier 14, before emission from optical antenna 16. At the receiver, the optical signals are collected at antenna 20, wavelength division demultiplexed by demultiplexer 82 and then divided into a plurality of multi-mode signals by multimode decouplers $86_1$ to $86_N$. These signals are amplified by low noise amplifiers $22_1$ through $22_M$ to boost the level after space-time demodulation by demodulators $24_1$ to $24_M$. Finally, a plurality of the demodulated spatial and temporal data streams are decoded by a plurality of space-time decoders $26_1$ to $26_N$.

Figure 2K:
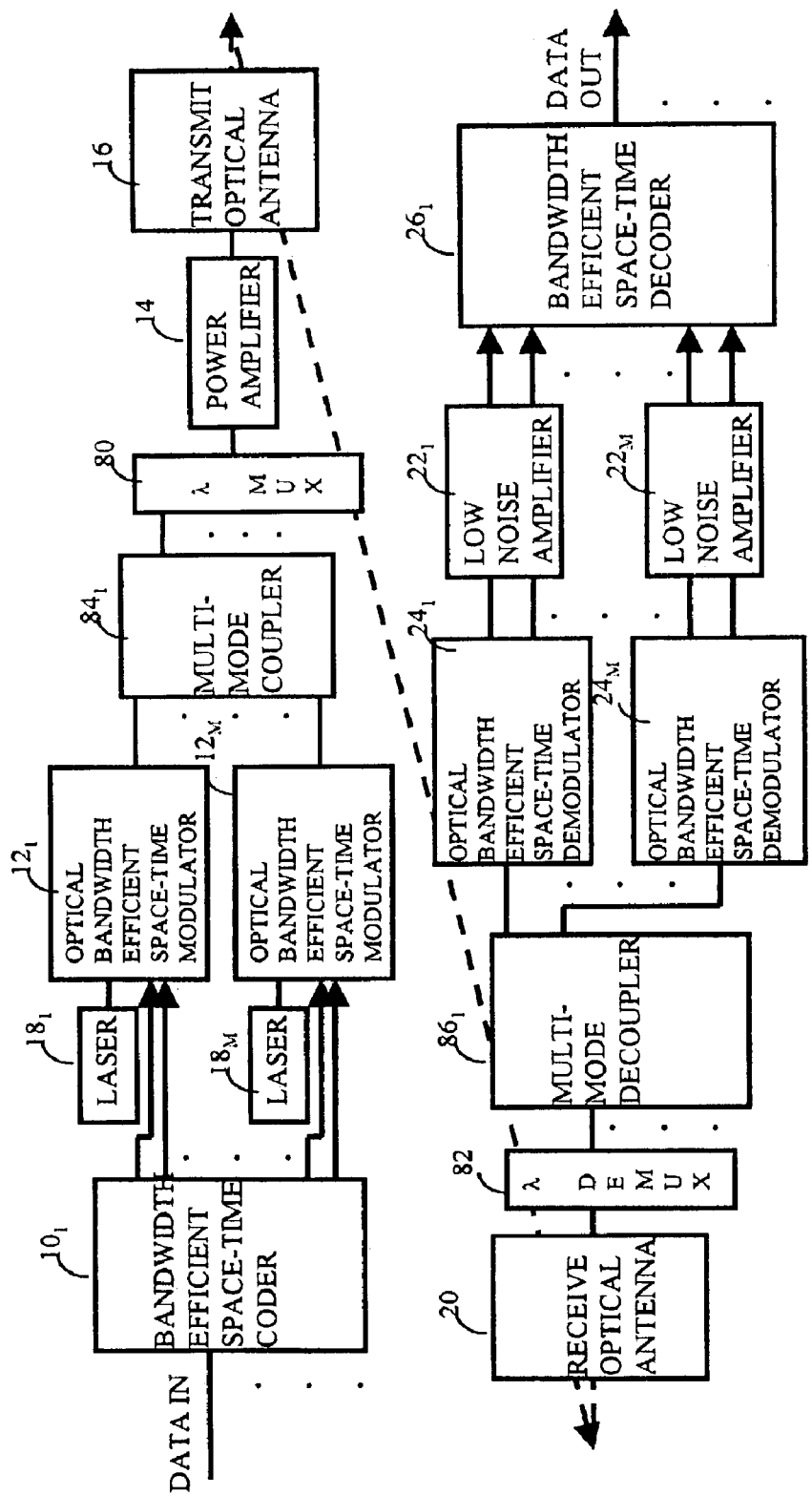
FIG. 2K is a schematic block diagram of a variation of the embodiment illustrated in FIG. 2J of a free space optical WDM system utilizing multimode indirect modulation and detection.

Another embodiment of the invention for an indirect modulated wireless optical WDM communications link using a multi-mode coupled antenna is illustrated in FIG. 2K. It consists of a plurality of optical signal carriers from laser sources $18_1$ through $18_M$ for M modes, space-time modulated by a plurality of spatial and temporal data streams from space-time bandwidth efficient coders $10_1$ to $10_N$ for N wavelengths at a plurality of bandwidth efficient space-time modulators $12_1$ through $12_M$. The multimode multi-wavelengths optical signals are coupled by multimode couplers $84_1$ to $84_N$, wavelength division multiplexed by multiplexer 80 and wideband power amplified by amplifier 14, before emission from optical antenna 16. At the receiver, the optical signal is collected at antenna 20, wavelength division demultiplexed by demultiplexer 82 and then divided into a plurality of multi-mode signals by multimode decouplers $86_1$ to $86_N$. These signals are amplified by low noise amplifiers $22_1$ through $22_M$ to boost the level after space-time demodulation by demodulators $24_1$ to $24_M$. Finally, a plurality of the demodulated spatial and temporal data streams are decoded by a plurality of space-time decoders $26_1$ to $26_N$.

Figure 2L:
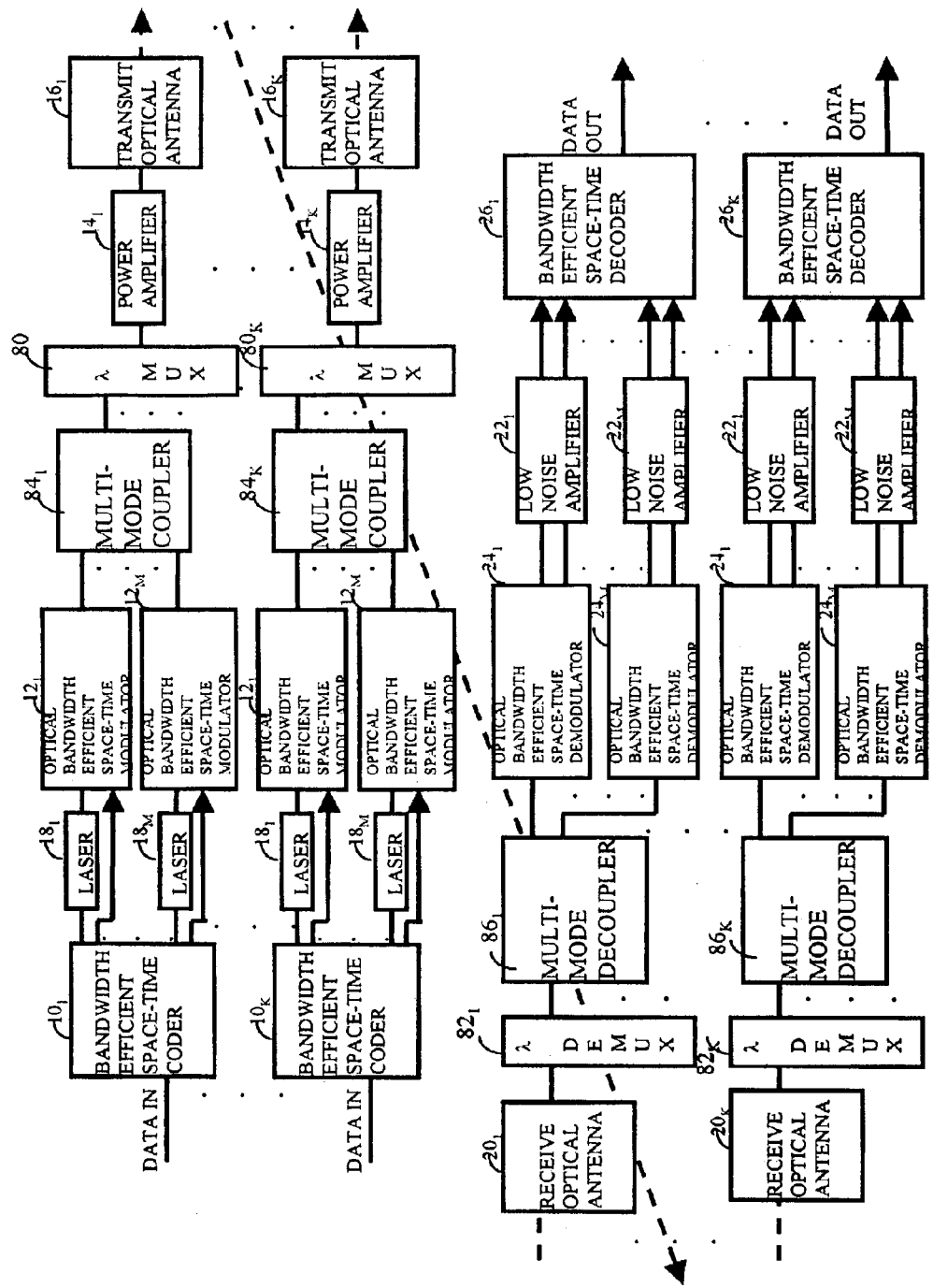
FIG. 2L is a schematic block diagram of another embodiment of a free space optical link with multiple antennas, multimode direct modulation and detection for increasing channel capacity and throughput of a free space or an underwater optical WDM communication networks.

Another embodiment of the invention for a direct modulated wireless optical WDM communications link using multimode coupled multi-antenna is illustrated in FIG. 2L. It consists of a plurality of optical signal carriers from laser sources $18_1$ through $18_M$ for M modes, space-time modulated by a plurality of spatial and temporal data streams from space-time bandwidth efficient coders $10_1$ to $10_N$ for N wavelengths at a plurality of bandwidth efficient space-time modulators 121 through 12M. The multimode multi-wavelengths optical signals are coupled by multimode couplers $84_1$ to $84_N$, multiplexed by wavelength division multiplexers $80_1$ to $80_K$ for K antennas and wideband power amplified by amplifiers $14_1$ to $14_K$, before emission from a plurality of antennas $16_1$ through $16_K$. At the receiver, the optical signal is collected at a plurality of antennas $20_1$ through $20_K$, wavelength division demultiplexed by demultiplexers $82_1$ to $82_K$ and then divided into a plurality of multimode signals by multimode decouplers $86_1$ to $86_N$ per each antenna respectively. These signals are amplified by low noise amplifiers $22_1$ through $22_M$ to boost the level after space-time demodulation by demodulators $24_1$ to $24_M$. Finally, a plurality of the demodulated spatial and temporal data streams are decoded by a plurality of space-time decoders $26_1$ to $26_N$ per antenna.

Figure 2M:
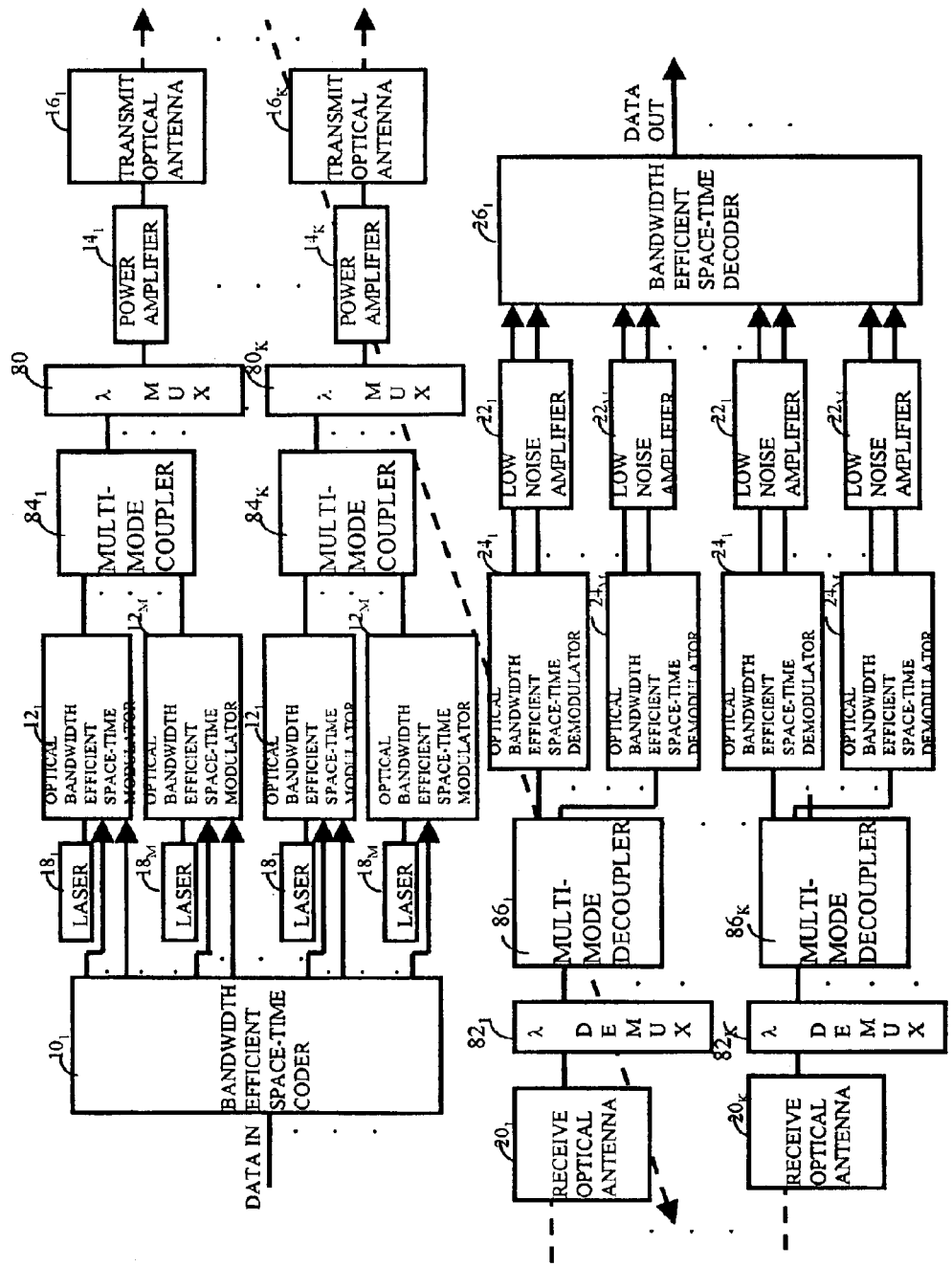
FIG. 2M is a schematic block diagram with a variation of the embodiment illustrated in FIG. 2L of a free space optical WDM system utilizing multiple antennas, multimode indirect modulation and detection.

Another embodiment of the invention for an indirect modulated wireless optical WDM communications link using multimode-coupled multi-antenna is illustrated in FIG. 2M. It consists of a plurality of optical signal carriers from laser sources $18_1$ through $18_M$, space-time modulated by a plurality of spatial and temporal data streams from space-time bandwidth efficient coders $10_1$ to $10_N$ for N wavelengths at a plurality of bandwidth efficient space-time modulators $12_1$ through $12_M$. The multimode multi-wavelengths optical signals are coupled by multimode couplers $84_1$ to $84_K$, multiplexed by wavelength division multiplexers $80_1$ to $80_K$ for K antennas and wideband power amplified by amplifiers $14_1$ to $14_K$, before emission from a plurality of antennas $16_1$ through $16_K$. At the receiver, the optical signal is collected at a plurality of antennas $20_1$ through $20_K$ wavelength division demultiplexed demultiplexers $82_1$ to $82_K$ and then divided into a plurality of multimode signals by multimode decouplers $86_1$ to $86_K$ per each antenna respectively. These signals are amplified by low noise amplifiers $22_1$ through $22_M$ to boost the level after space-time demodulation by demodulators $24_1$ to $24_M$.

Finally, a plurality of the demodulated spatial and temporal data streams are decoded by the space-time decoders $26S_1$ to $26_N$ per antenna.

Figure 3A:
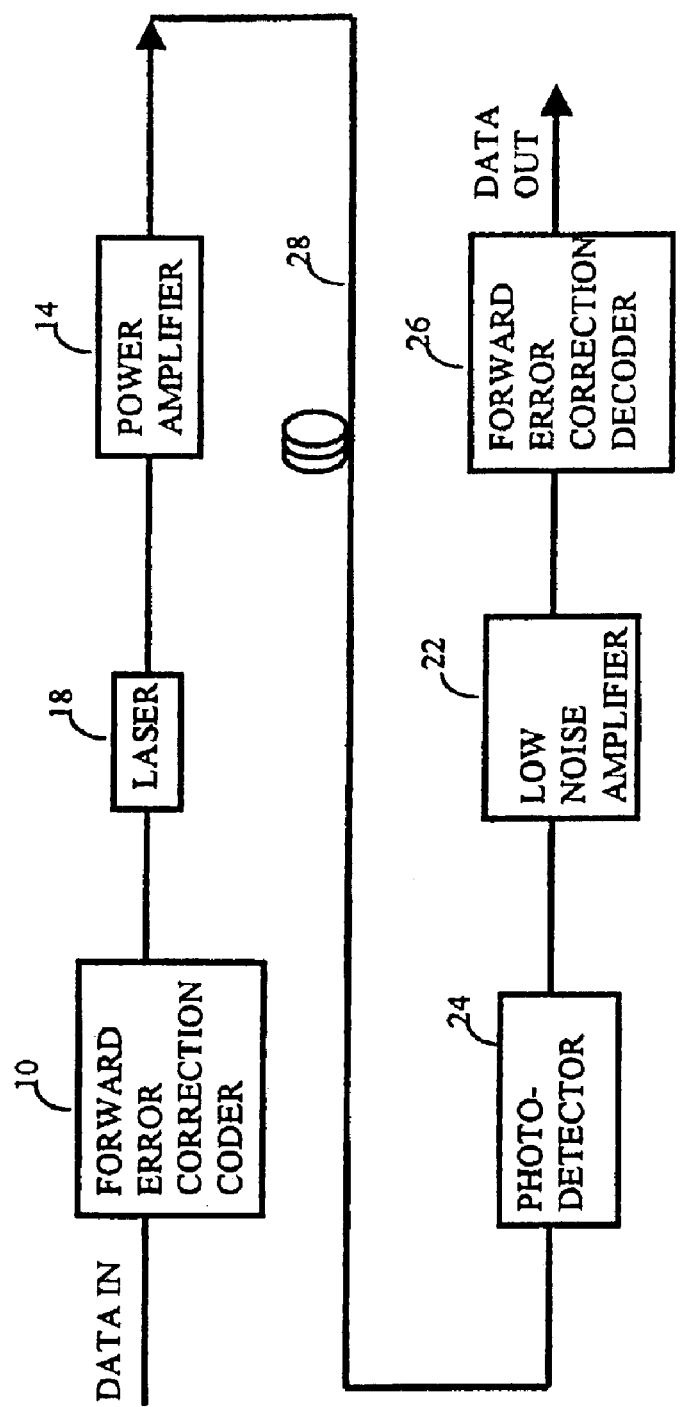
FIG. 3A is a schematic block diagram of the prior art guided optical system using intensity modulation and photo-detection.

The prior art implementation of a fiber optical communication system is illustrated in FIG. 3A. It consists of optical signal carrier generated from laser source 18, modulated by a forward error correction (FEC) coder 10 producing encoded data. The signal is amplified by low noise amplifier 18 and transmitted through optical fiber 28. At the receiving end of the fiber, the transmitted signal is detected by photodetector 24 and amplified by low noise amplifier 22 before decoding by FEC decoder 26.

Figure 3B:
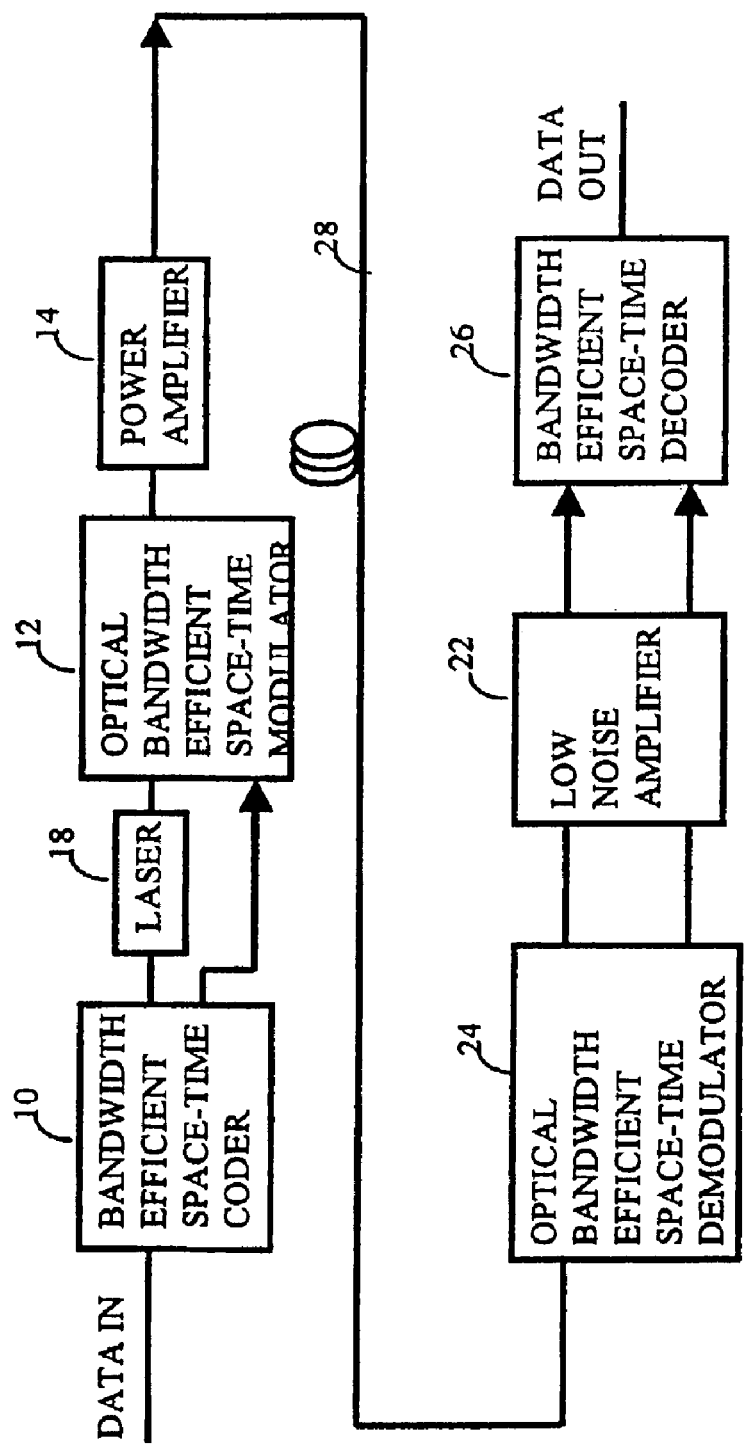
FIG. 3B is a schematic block diagram of yet another embodiment of this invention in which a guided optical system is shown using optical fiber transmission cable with direct modulation and detection.

One embodiment of the invention for a direct modulated fiber optical communications link is illustrated in FIG. 3B. It consists of optical carrier from laser source 18, space-time modulated by a spatial and temporal data stream from space-time bandwidth efficient coder 10 at the bandwidth efficient space-time modulator 12. The signal is amplified by power amplifier 14 before transmission by optical fiber 28. At the receiving end of the fiber, the optical signal is amplified by low noise amplifier 22 and space-time demodulated by demodulator 24. Finally, the demodulated spatial and temporal data streams are decoded by the space-time decoder 26.

Bandwidth efficient space-time coder 10 performs the encoding function of raw data into a coded sequence. The encoding tasks illustrated were described previously with reference to FIG. 5A.

At the receiver, space-time decoder 26 decodes the demodulated space-time symbols to recover the original transmitted data. The decoding operation is shown in FIG. 6A and was described previously.

Bandwidth efficient space-time modulator 12 performs mapping of space-time data symbols to a multi-dimensional of space-time signal space. Temporal signal constellation follows the two dimensional inphase and quadrature plane representation of amplitude and phase. The spatial modulation is represented one of the constellation of distinct polarization states in Poincare sphere as shown and described previously with reference to FIGS. 4A through FIG. 4D.

Implementation of bandwidth efficient space-time modulator 12 is shown and described previously with reference to the block diagram of FIG. 7B.

Bandwidth efficient space-time demodulator 24 is illustrated and its operation described previously with reference to FIG. 8B.

Figure 3C:
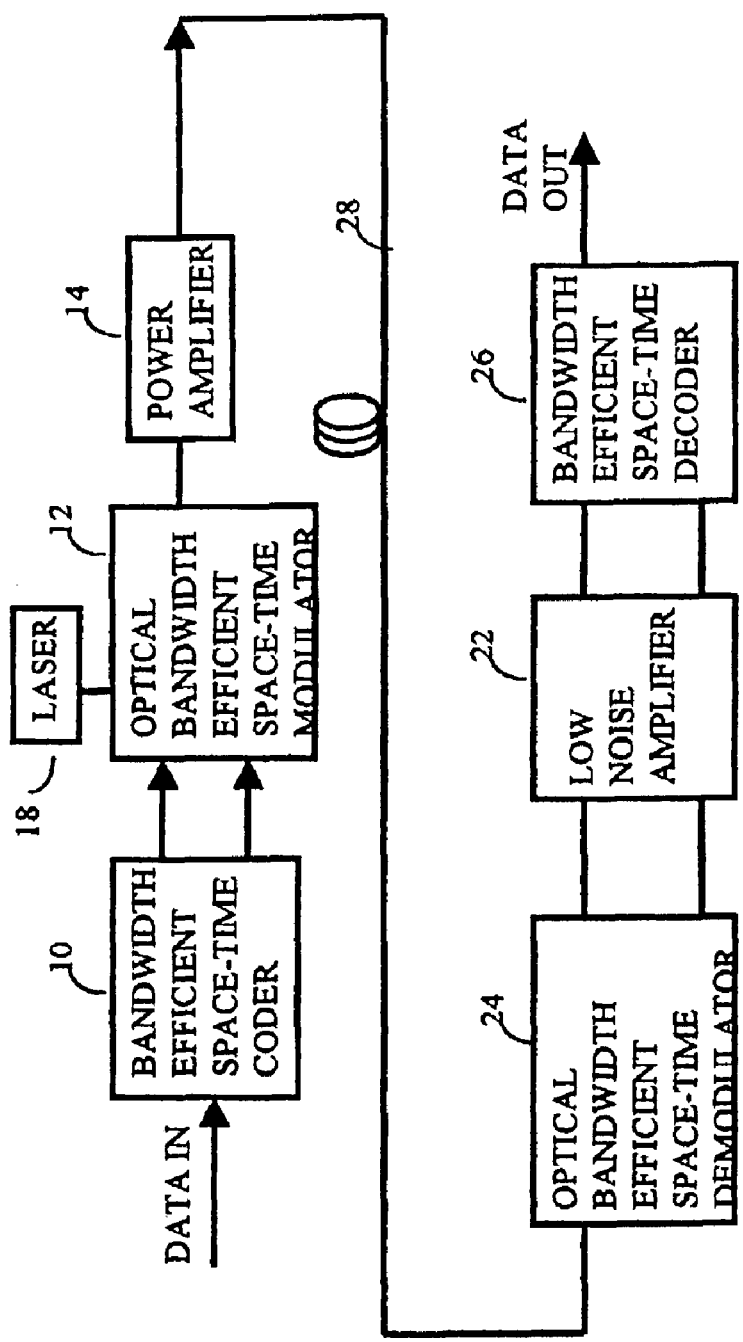
FIG. 3C is a schematic block diagram of a variation of the embodiment illustrated in FIG. 3B of a fiber-optical system utilizing indirect modulation and detection.

Another embodiment of the invention for an indirect modulated fiber optical communications link is illustrated in FIG. 3C. It consists of optical signal carrier from laser source 18, space-time modulated by a spatial and temporal data stream from space-time bandwidth efficient coder 10 at the bandwidth efficient space-time modulator 12. The signal is amplified by power amplifier 14 before transmission by optical fiber 28. At the receiver, the optical signal is collected from optical fiber 28, space-time demodulated by demodulator 24 and amplified by low noise amplifier 22. Finally, the demodulated spatial and temporal data streams are decoded by the space-time decoder 26.

Figure 3D:
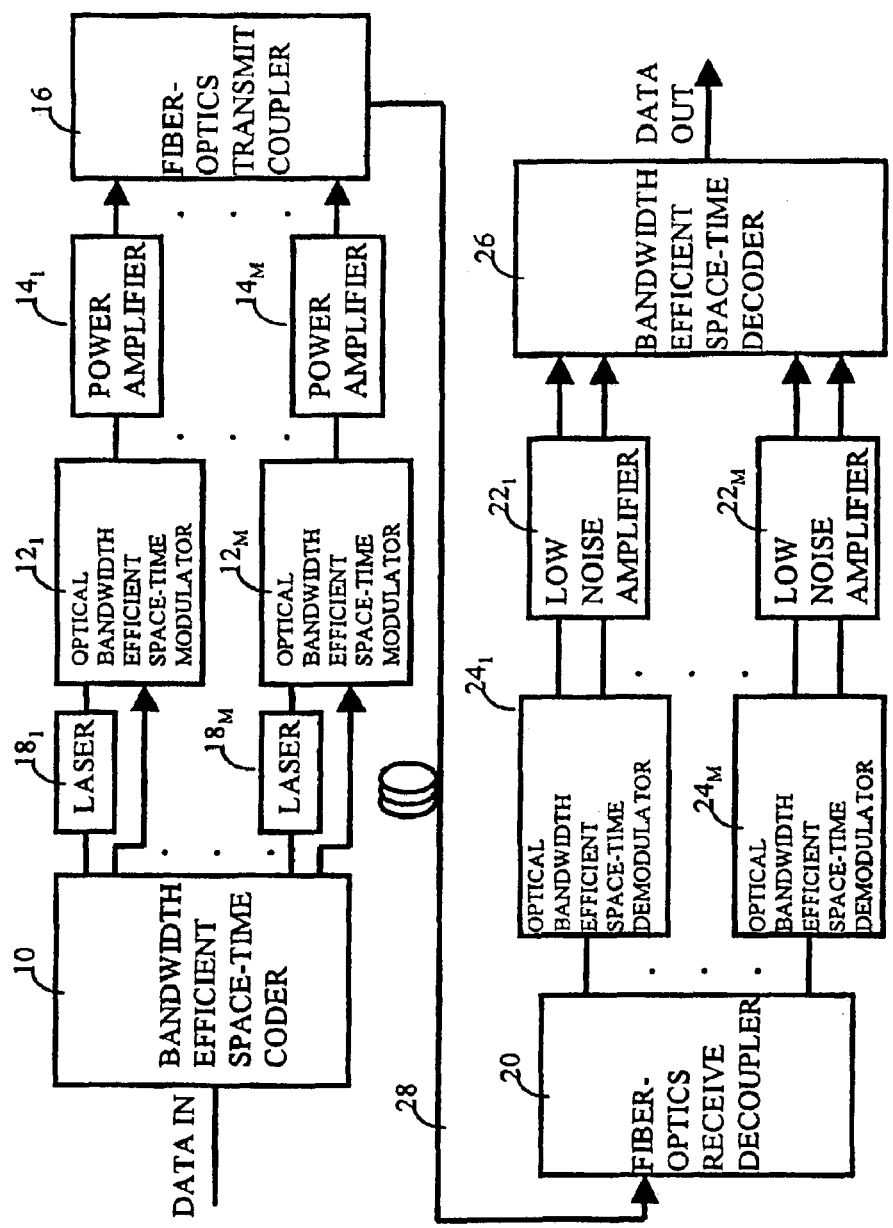
FIG. 3D is a schematic block diagram of another embodiment of this invention in which a guided optical system is shown using optical fiber transmission cable with multimode direct modulation and detection.

Another embodiment of the invention for a direct modulated multimode fiber optical communications link is illustrated in FIG. 3D. It consists of a plurality of optical signal carriers from laser sources $18_1$ through $18_M$, space-time modulated by a plurality of spatial and temporal data streams from space-time bandwidth efficient coder 10 at a plurality of bandwidth efficient space-time modulators $12_1$ through $12_M$. A plurality of the optical signals are amplified by power amplifiers $14_1$ to $14_M$, before coupling into the optical fiber 28 by fiber optics transmit coupler 16. At the receiving end, the optical signal is divided into a plurality of multi-mode signals by fiber optics receive decoupler 20. These signals are amplified by low noise amplifiers $22_1$ through $22_M$ to boost the level after space-time demodulation by demodulators $24_1$ to $24_M$. Finally, a plurality of the demodulated spatial and temporal data streams are decoded by the space-time decoder 26.

While the implementation of the optical bandwidth efficient space-time modulator and demodulator remains the same as in earlier embodiments. Multi-mode coupled optical fiber requires multiple space-time data streams provided by multimode bandwidth efficient space-time coder are as shown and described previously with reference to FIG. 5B.

At the receiver, bandwidth efficient space-time decoder 26 decodes the demodulated space-time symbols to recover the original transmitted data. Multimode decoding operation is shown FIG. 6B and was described previously.

Figure 3E:
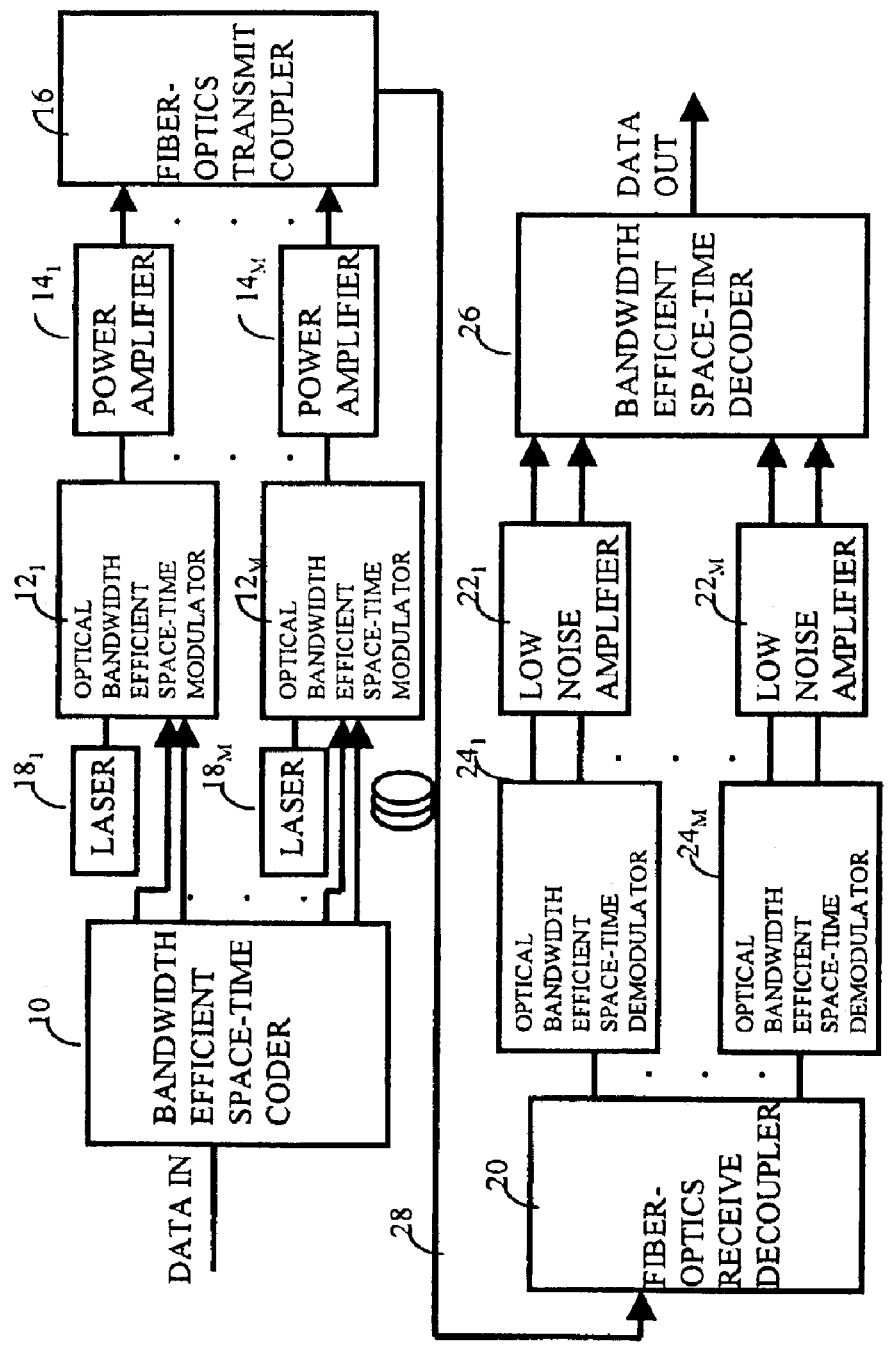
FIG. 3E is a schematic block diagram of a variation of the embodiment illustrated in FIG. 3D of a fiber-optical system utilizing multimode indirect modulation and detection.

Another embodiment of the invention for an indirect modulated multimode fiber optical communications link is illustrated in FIG. 3E. It consists of a plurality of optical carriers from laser sources $18_1$ through $18_M$, space-time modulated by a plurality of spatial and temporal data streams from space-time bandwidth efficient coder 10 at a plurality of bandwidth efficient space-time modulators $12_1$ through $12_M$. A plurality of optical signals are amplified by power amplifiers $14_1$ to $14_M$, before coupling into the optical fiber 28 by fiber optics transmit coupler 16. At the receiving end, the optical signal is divided into a plurality of multi-mode signals by fiber optics receive decoupler 20. These signals are amplified by low noise amplifiers $22_1$ through $22_M$ to boost the level after space-time demodulation by demodulators $24_1$ to $24_M$. Finally, a plurality of the demodulated spatial and temporal data streams are decoded by the space-time decoder 26.

Figure 3F:
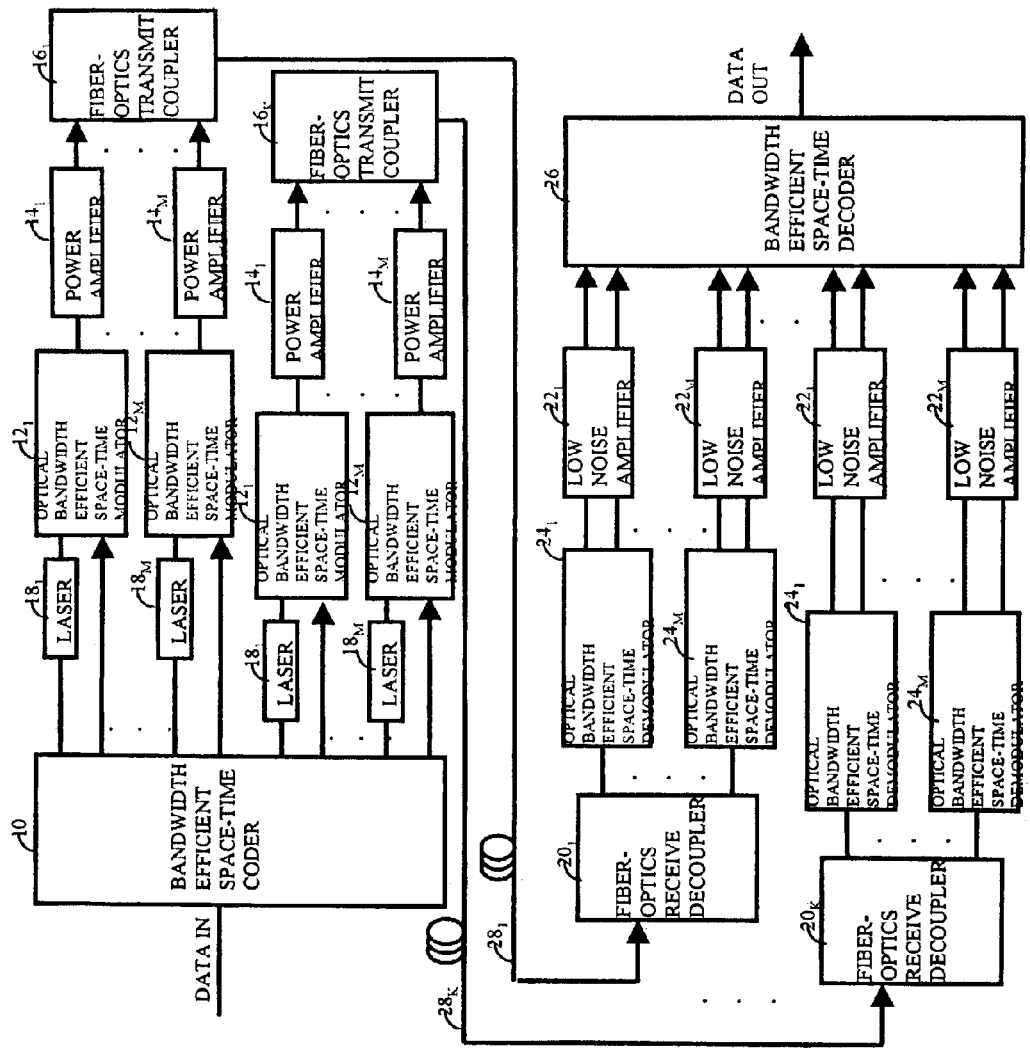
FIG. 3F is a schematic block diagram of another embodiment of this invention in which a guided optical system is shown using optical fiber transmission cable with multiple fibers, multimode direct modulation and detection.

Another embodiment of the invention for a direct modulated multimode fiber optical communications link is illustrated in FIG. 3F. It consists of a plurality of optical carriers from laser sources $18_1$ through $18_M$, space-time modulated by a plurality of spatial and temporal data streams from space-time bandwidth efficient coder 10 at a plurality of bandwidth efficient space-time modulators $12_1$ through $12_M$. A plurality of signals are amplified by power amplifiers $14_1$ to $14_M$, before coupling into a plurality of optical fibers $28_1$ through $28_K$ by fiber optics transmit couplers $16_1$ through $16_K$. At the receiving end of the fiber, the optical signal is divided into a plurality of multimode signals by fiber optics receive decouplers $20_1$ through $20_K$. These signals are amplified by low noise amplifiers $22_1$ through $22_M$ to boost the level after space-time demodulation by demodulators $24_1$ to $24_M$. Finally, a plurality of the demodulated spatial and temporal data streams are decoded by the space-time decoder 26.

The multi-mode coupled multi-fiber system requires multiple sets of M channel space-time data streams provided by multimode multi-antenna bandwidth efficient space-time coder shown in FIG. 5C and described previously.

At the receiver, bandwidth efficient space-time decoder 26 decodes the demodulated space-time symbols to recover the original transmitted data. Multi-antenna multimode decoding operation is shown in FIG. 6C and was previously described.

Figure 3G:
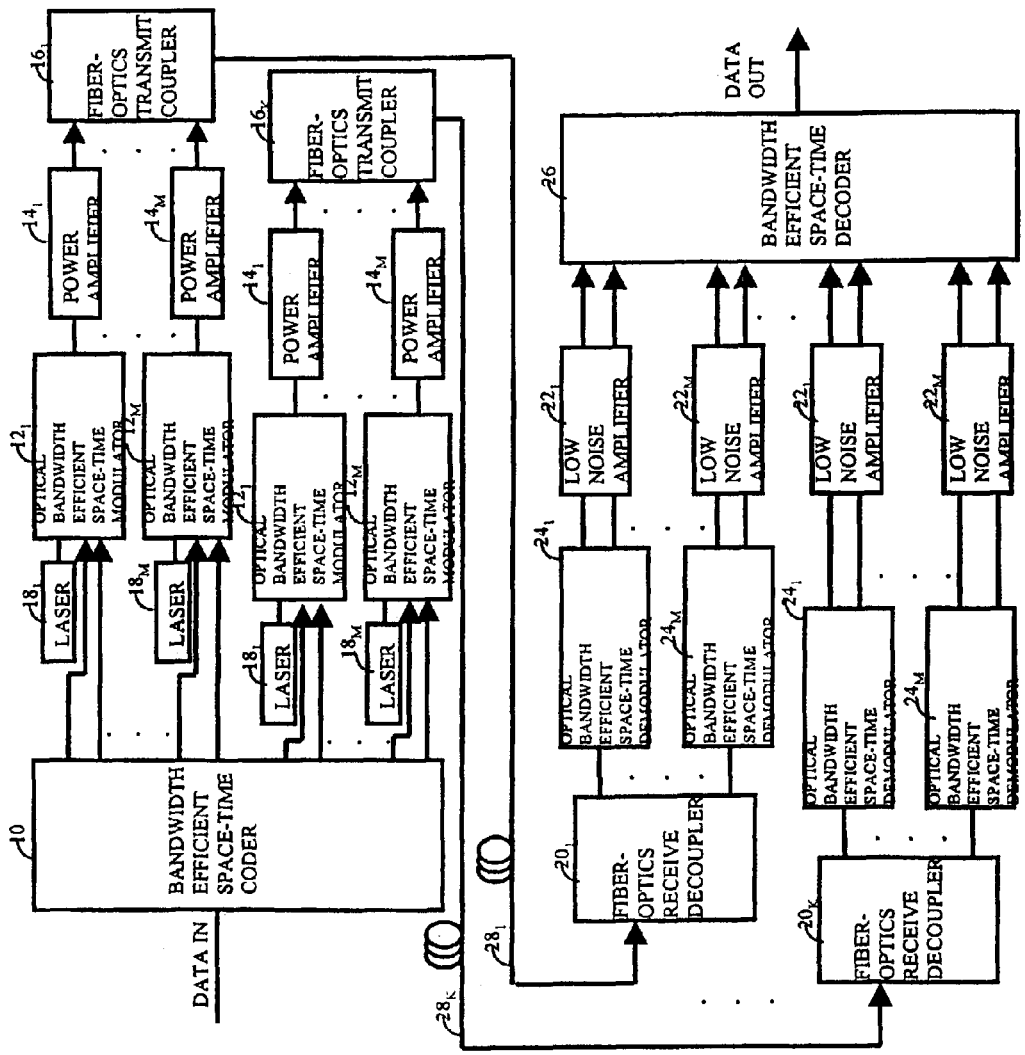
FIG. 3G is a schematic block diagram showing a variation of the embodiment illustrated in FIG. 3F of a fiber-optical system utilizing multiple fibers, multimode indirect modulation and detection.

Another embodiment of the invention for an indirect modulated multimode fiber optical communications link is illustrated in FIG. 3G. It consists of a plurality of optical carriers from laser sources $18_1$ through $18_M$, space-time modulated by a plurality of spatial and temporal data streams from space-time bandwidth efficient coder 10 at a plurality of bandwidth efficient space-time modulators $12_1$ through $12_M$. A plurality of signals are amplified by power amplifiers $14_1$ to $14_M$, before coupling into a plurality of optical fibers $28_1$ through $28_K$ by fiber optics transmit couplers $16_1$ through $16_K$. At the receiving end of the fiber, the optical signal is divided into a plurality of multimode signals by fiber optics receive decouplers $20_1$ through $20_K$. These signals are amplified by low noise amplifiers $22_1$ through $22_M$ to boost the level after space-time demodulation by demodulators $24_1$ to $24_M$. Finally, a plurality of the demodulated spatial and temporal data streams are decoded by the space-time decoder 26.

Figure 3H:
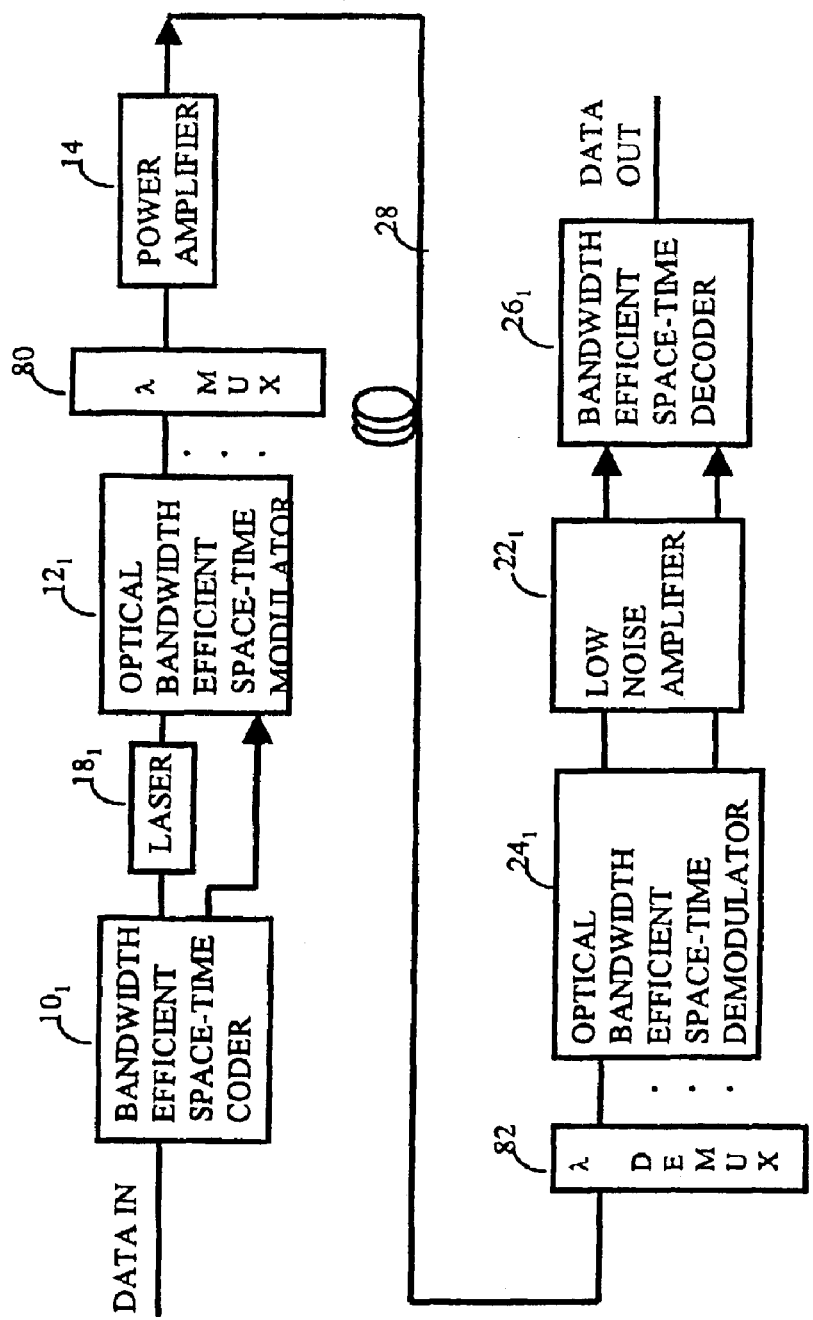
FIG. 3H is a schematic block diagram of yet another embodiment of this invention in which a guided optical WDM system is shown using optical fiber transmission cable with direct modulation and detection.

One embodiment of the invention for a direct modulated fiber optical WDM communications link is illustrated in FIG. 3H. It consists of optical carrier from a plurality of laser sources $18_1$ to $18_N$ for N wavelengths, space-time modulated by a spatial and temporal data stream from a plurality of space-time bandwidth efficient coders $10_1$ to $10_N$ at the plurality of bandwidth efficient space-time modulators $12_1$ to $12_N$. The signal is wavelength multiplexed by multiplexer 80, wideband amplified by power amplifier 14 before transmission from optical fiber 28. At the receiving end of the fiber, the optical signal is wavelength demultiplexed by demultiplexer 82, amplified by low noise amplifiers $22_1$ to $22_N$ and space-time demodulated by demodulators $24_1$ to $26_N$. Finally, the demodulated spatial and temporal data streams are decoded by the space-time decoders $26_1$ to $26_N$.

Figure 3I:
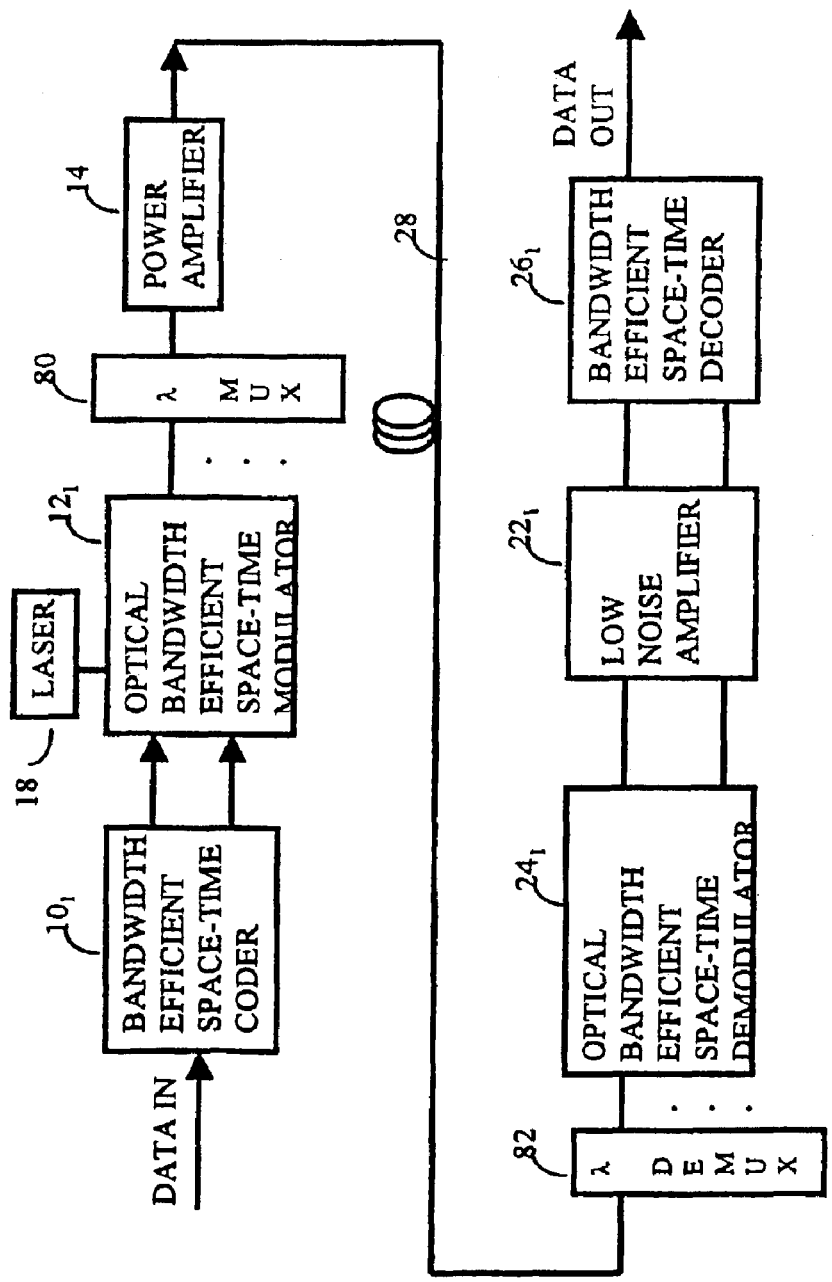
FIG. 3I is a schematic block diagram showing a variation of the embodiment illustrated in FIG. 3H of a fiber-optical WDM system utilizing indirect modulation and detection.

Another embodiment of the invention for an indirect modulated fiber optical WDM communications link is illustrated in FIG. 3I. It consists of optical signal carrier from a plurality of laser sources $18_1$ to $18_N$ for N wavelengths, space-time modulated by a spatial and temporal data stream from space-time bandwidth efficient coders $10_1$ to $10_N$ at the plurality of bandwidth efficient space-time modulators $12_1$ to $12_N$. The signal is wavelength multiplexed by multiplexer 80, wideband amplified by power amplifier 14 before transmission from optical fiber 28. At the receiving end of the fiber, the optical signal is wavelength demultiplexed by demultiplexer 82, amplified by low noise amplifiers $22_1$ to $22_N$ and space-time demodulated by demodulators $24_1$ to $26_N$. Finally, the demodulated spatial and temporal data streams are decoded by the space-time decoders $26_1$ to $26_N$.

Figure 3J:
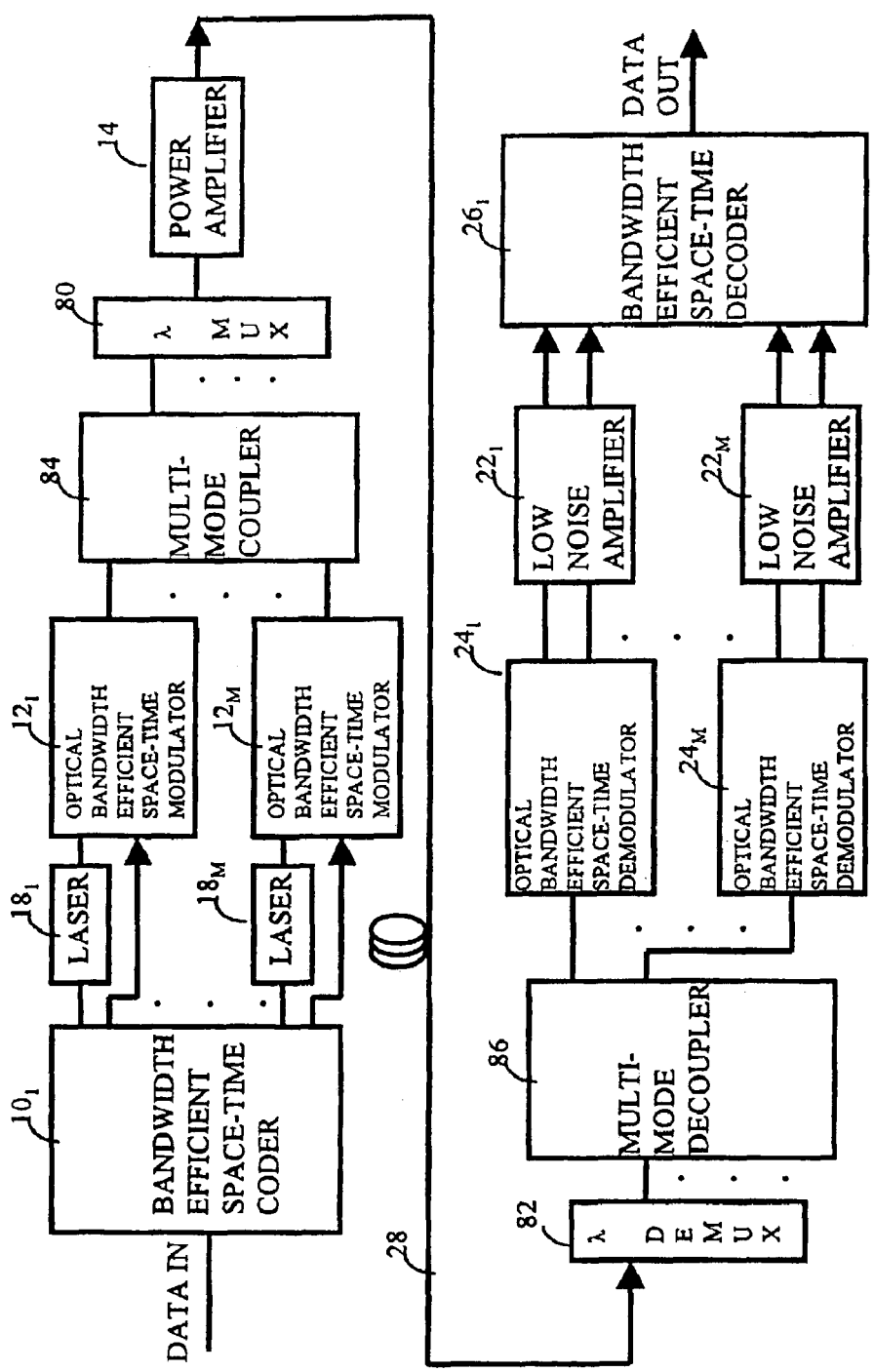
FIG. 3J is a schematic block diagram of another embodiment of this invention in which a guided optical WDM system is shown using optical fiber transmission cable with multimode direct modulation and detection.

Another embodiment of the invention for a direct modulated multimode fiber optical WDM communications link is illustrated in FIG. 3J. It consists of a plurality of optical carriers from laser sources $18_1$ through $18_M$ for M modes, space-time modulated by a plurality of spatial and temporal data streams from space-time bandwidth efficient coders $10_1$ to $10_N$ for N wavelengths at a plurality of bandwidth efficient space-time modulators $12_1$ through $12_M$. A plurality of optical signals are coupled by multimode coupler 84, wavelength multiplexed by multiplexer 80, wideband amplified by power amplifier 14 before entering into optical fiber 28 by fiber optics transmit coupler 16. At the receiving end, the optical signal is wavelength demultiplexed by demultiplexer 82 and divided into a plurality of multi-mode decoupled signals by multi-mode decoupler 86. These signals are amplified by low noise amplifiers $22_1$ through $22_M$ per wavelength to boost the level after space-time demodulation by demodulators $24_1$ to $24_M$. Finally, a plurality of the demodulated spatial and temporal data streams are decoded by the space-time decoders $26_1$ to $26_N$.

Figure 3K:
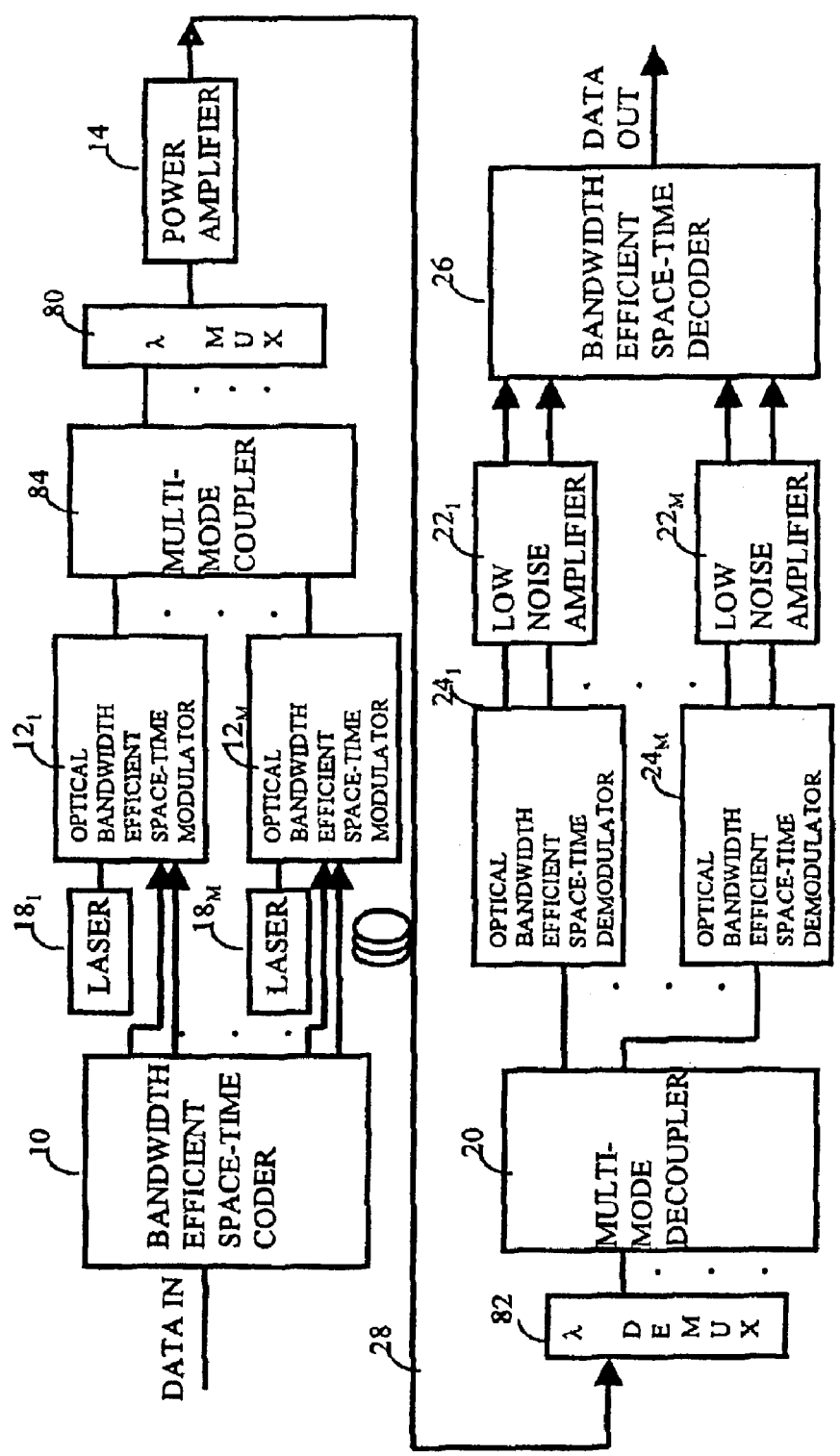
FIG. 3K is a schematic block diagram showing a variation of the embodiment illustrated in FIG. 3J of a fiber-optical WDM system utilizing multimode indirect modulation and detection.

Another embodiment of the invention for an indirect modulated multimode fiber optical WDM communications link is illustrated in FIG. 3K. It consists of a plurality of optical signal carriers from laser sources $18_1$ through $18_M$ for M modes, space-time modulated by a plurality of spatial and temporal data streams from space-time bandwidth efficient coders $10_1$ to $10_N$ for N wavelengths at a plurality of bandwidth efficient space-time modulators $12_1$ through $12_M$. A plurality of optical signals are coupled by multimode coupler 84, wavelength multiplexed by multiplexer 80, wideband amplified by power amplifier 14 before coupling into optical fiber 28. At the receiving end, the optical signal is wavelength demultiplexed by demultiplexer 82, divided into a plurality of multi-mode decoupled signals 86 by multimode decoupler 82. These signals are amplified by low noise amplifiers $22_1$ through $22_M$ per wavelength to boost the level after space-time demodulation by demodulators $24_1$ to $24_M$. Finally, a plurality of the demodulated spatial and temporal data streams are decoded by the space-time decoders $26_1$ to $26_N$.

Figure 3L:
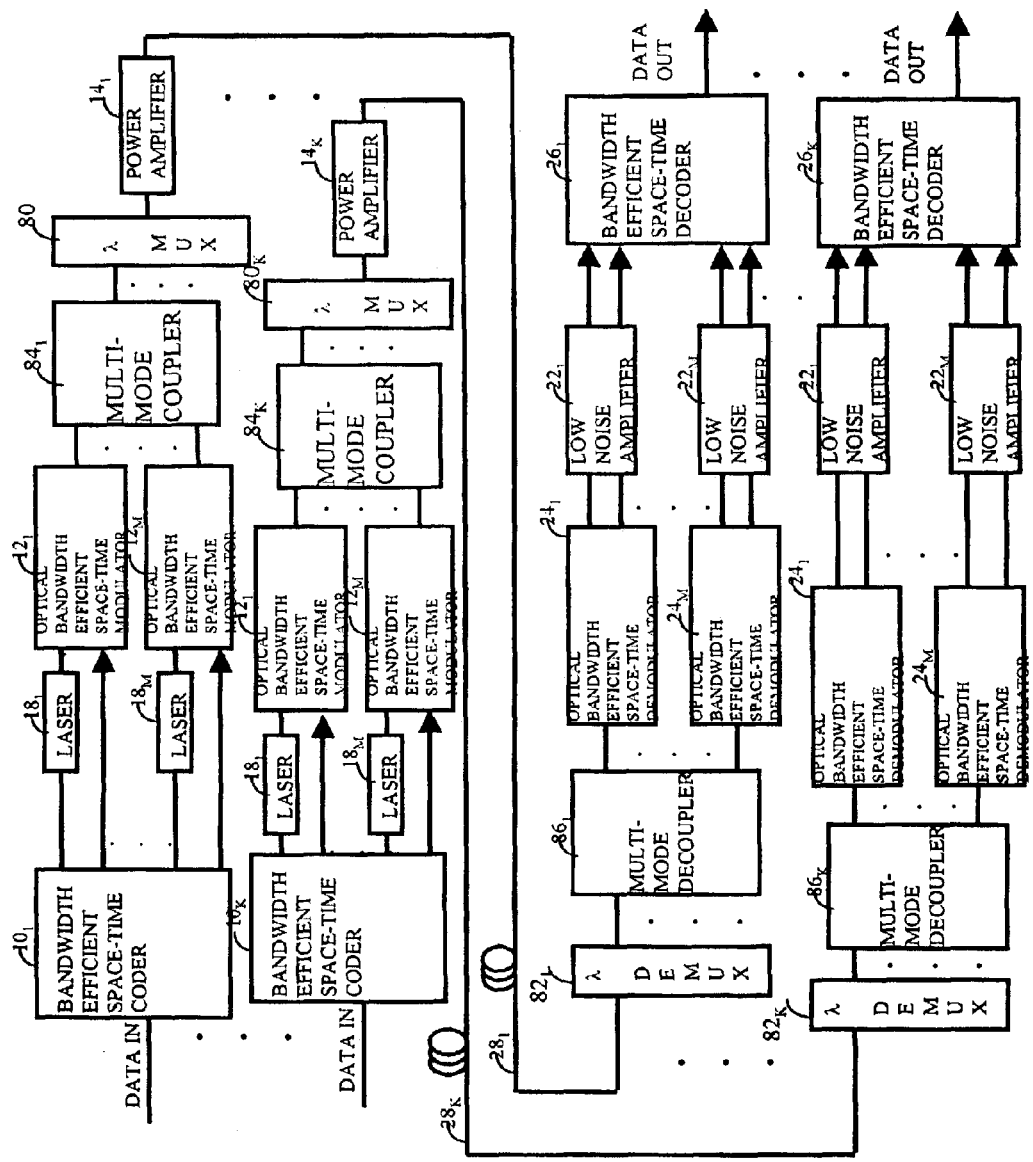
FIG. 3L is a schematic block diagram of another embodiment of this invention in which a guided optical WDM system is shown using optical fiber transmission cable with multiple fibers, multimode direct modulation and detection.

Another embodiment of the invention for a direct modulated multimode fiber optical WDM communications link is illustrated in FIG. 3L. It consists of a plurality of optical signal carriers from laser sources $18_1$ through $18_M$ for M modes, space-time modulated by a plurality of spatial and temporal data streams from space-time bandwidth efficient coders $10_1$ to $10_N$ for N wavelengths at a plurality of bandwidth efficient space-time modulators $12_1$ through $12_M$. A plurality of signals are coupled by multimode couplers $84_1$ to $84_K$, wavelength multiplexed by multiplexers $80_1$ to $80_K$, wideband amplified by power amplifiers $14_1$ to $14_K$, before coupling into a plurality of optical fibers $28_1$ through $28_K$. At the receiving end of the fibers, the optical signal is wavelength demultiplexed by demultiplexers $82_1$ to $82_K$, divided into a plurality of multimode decoupled signals by multimode decouplers $86_1$ to $86_K$. These signals are amplified by low noise amplifiers $22_1$ through $22_M$ per wavelength to boost the level after space-time demodulation by demodulators $24_1$ to $24_M$. Finally, a plurality of the demodulated spatial and temporal data streams are decoded by the space-time decoders $26_1$ to $26_N$.

Figure 3M:
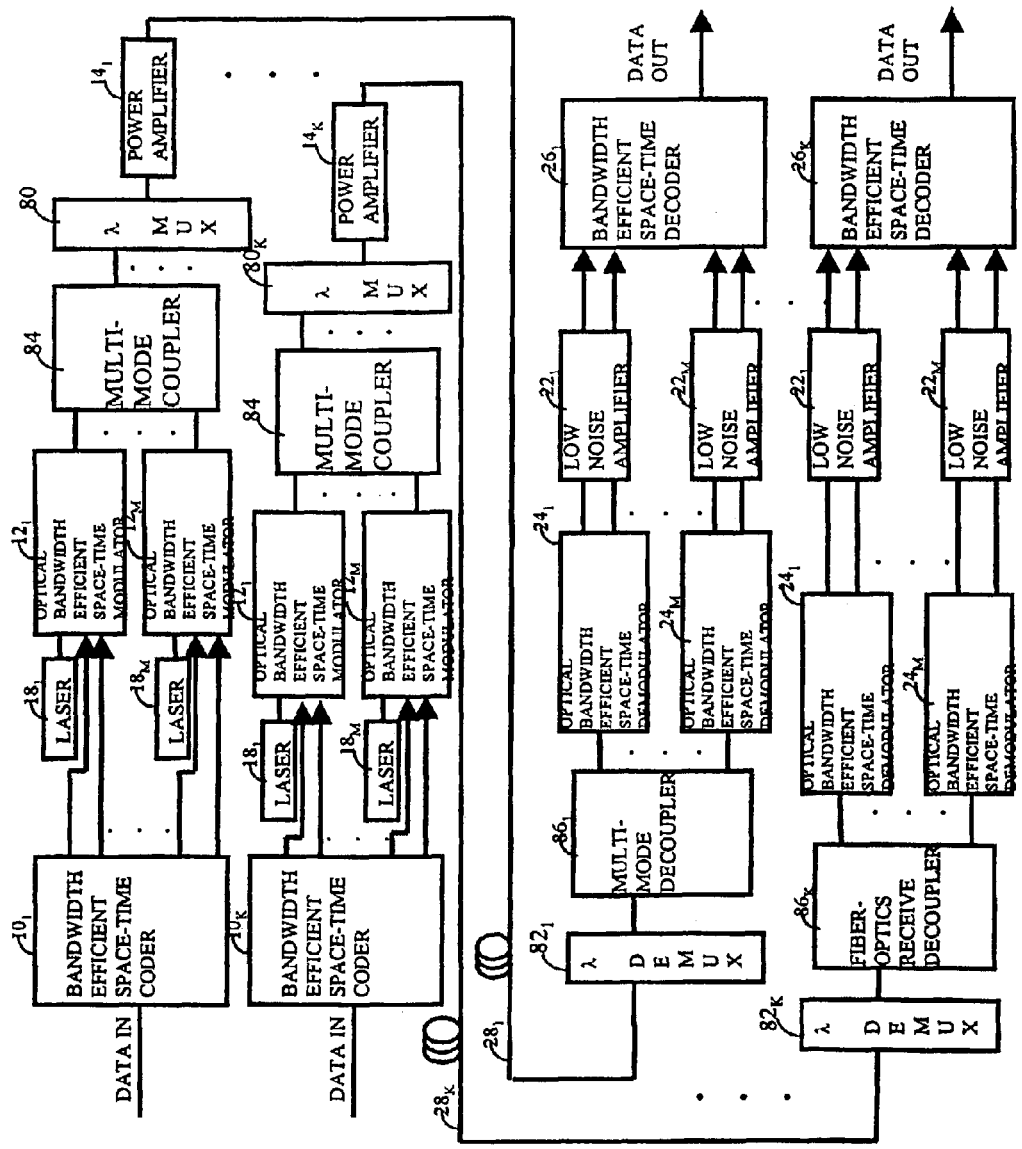
FIG. 3M is a schematic block diagram showing a variation of the embodiment illustrated in FIG. 3L of a fiber-optical WDM system utilizing multiple fibers, multimode indirect modulation and detection.

Another embodiment of the invention for an indirect modulated multimode fiber optical WDM communications link is illustrated in FIG. 3M. It consists of a plurality of optical signal carriers from laser sources $18_1$ through $18_M$ for M modes, space-time modulated by a plurality of spatial and temporal data streams from space-time bandwidth efficient coders $10_1$ to $10_N$ for N wavelengths at a plurality of bandwidth efficient space-time modulators $12_1$ through $12_M$. A plurality of signals are coupled by multimode couplers $84_1$ to $84_K$, wavelength multiplexed by multiplexers $80_1$ to $80_K$, wideband amplified by power amplifiers $14_1$ to $14_K$, before coupling into a plurality of optical fibers $28_1$ through $28_K$. At the receiving end of the fibers, the optical signal is wavelength demultiplexed by demultiplexers $82_1$ to $82_K$, divided into a plurality of multimode decoupled signals by multimode decouplers $86_1$ to $86_K$. These signals are amplified by low noise amplifiers $22_1$ through $22_M$ per wavelength to boost the level after space-time demodulation by demodulators $24_1$ to $24_M$. Finally, a plurality of the demodulated spatial and temporal data streams are decoded by the space-time decoders $26_1$ to $26_N$.

This invention is not to be limited by the embodiment shown in the drawings and described in the description which is given by way of example and not of limitation, but only in accordance with the scope of the appended claims.

What is claimed is:

1. A system for increasing bandwidth efficiency of digital data communication links comprising;

a space-time coder for error correction coding of input digital data into direct temporal and spatial data streams, said space-time coder applying trellis coding to reduce signal bandwidth while increasing data redundancy to compensate for errors through spatial and temporal channels;

at least one signal source;

at least one space-time modulator receiving and modulating the polarization states said at least one signal source with said spatial data from said direct temporal and spatial data streams received from said space-time coder;

at least one amplifier for amplifying the output of said space-time modulator;

one or more transmitters for transmitting the output signal from said at least one amplifier;

one or more receivers for receiving and collecting the signal from said one or more transmitter;

at least one space-time demodulator for direct temporal demodulation of amplitude, phase, and frequency and spatial demodulation of signal polarization of said signal from said one or more receivers;

at least one low noise amplifier for amplifying a signal received from said at least one space-time demodulator to compensate for path loss;

at least one space-time decoder for iterative decoding of direct temporal and spatial data streams received from said low noise amplifier;

whereby bandwidth efficiency and throughput are increased.

2. The system according to claim 1 in which said at least one signal source is an RF oscillator signal source.

3. The system according to claim 1 including a plurality of: RF signal sources, space-time modulators, and power amplifiers combined for transmission of a signal from a multi-feed wireless antenna; and, a plurality of: space-time demodulators, low noise amplifiers, and space-time decoders splitting a signal received by a multi-feed wireless antenna.

4. The system according to claim 1 in which said at least one signal source is an optical signal source.

5. The system according to claim 1 in which said signal optical source is a laser signal source.

6. The system according to claim 1 in which said one or more transmitters and one or more receivers comprise a direct cable connection.

7. The system according to claim 1 including a plurality of: optical signal sources, optical space-time modulators, and power amplifiers combined for transmitting a signal from a transmitting multimode coupled optical antenna; and a plurality of: optical space-time demodulators, low noise amplifiers, and space-time decoders after splitting a signal received by a receiving multimode coupled optical antenna.

8. The system according to claim 7 in which said plurality of modulators indirectly modulates said plurality of optical signal sources.

9. The system according to claim 7 including a multimode coupler combining said plurality of optical signals from said plurality of optical space-time modulators; and wavelength division multiplexer for multiplexing a plurality of modulated signals from said optical coupler; a power amplifier to boost signal level from said wavelength division multiplexer for transmitting from a transmitting optical antenna; a receiving optical antenna and a wavelength division demultiplexer for demultiplexing said plurality of modulated signals received; and a multimode decoupler splitting said received signal into a plurality of said space-time signals; whereby said optical transmission system is a wavelength division system (WDM) that increases the number of independent data channels of an optical link.

10. The system according to claim 9 in which said plurality of modulators indirectly modulates said plurality of optical signal sources.

11. The system according to claim 9 in which said one or more transmitters and one or more receivers comprise an optical cable replacing the transmitting optical antenna and receiving optical antenna.

12. The system according to claim 9 in which said one or more transmitters and one or more receivers comprise at least one set of optical antennas for transmitting and for receiving.

13. The system according to claim 12 in which said at least one optical antenna comprises a plurality of optical antennas for transmitting and for receiving.

14. A method of increasing the bandwidth efficiency of a digital data link comprising;

space-time error correcting encoding of digital data input into temporal and spatial data streams;

providing at least one signal source;

space-time modulating said temporal and spatial data streams and said at least one signal source in amplitude, phase and frequency;

amplifying said space-time modulated output signal;

transmitting said space-time modulated output signal;

receiving said space-time modulated signal;

space-time demodulating said received space-time modulated signal combining temporal demodulation of amplitude, phase and frequency and spatial demodulation of polarization of a received space-time signal;

amplifying said received signal to compensate for path loss;

space-time iterative decoding of said demodulated signal to correct transmission errors via a feedback loop by permuting temporal and spatial data streams.

15. The method according to claim 14 in which providing at least one signal source comprises providing at least one RF oscillator signal source.

16. The method according to claim 14 in which providing at least one signal source comprises providing at least one laser signal source.

17. The method according to claim 14 in which said space-time modulation of said temporal and spatial data streams and said at least one signal source comprises modulation with a plurality of space-time modulators.

18. The method according to claim 17 in which said modulation comprises indirect modulation of said at least one signal source.

19. The method according to claim 18 in which providing at least one signal source comprises providing at least one RF oscillator signal source.

20. The method according to claim 18 in which providing at least one signal source comprises providing at least one laser signal source.

21. The method according to claim 19 in which said transmitting and receiving comprise transmitting and receiving from a plurality of multi-feed wireless antennas.

22. The method according to claim 20 in which said transmitting and receiving comprise transmitting and receiving by optical antennas.

23. The method according to claim 22 in which said transmitting and receiving comprise transmitting and receiving by one or more multimode coupled optical antennas.

24. The method according to claim 22 in which said transmitting and receiving comprise transmitting and receiving by a plurality of multimode coupled optical antennas.

25. The method according to claim 18 including multimode coupling of outputs from said plurality of demodulators; multiplexing said multimode coupling output; demultiplexing an output transmitted from said multiplexer; decoupling and delivering an output from said demultiplexing to said plurality of demodulators.

26. The method according to claim 25 including indirectly modulating said at least one optical source.

27. The method according to claim 17 in which said transmitting and receiving comprise transmitting and receiving through at least one fiber-optic cable.

28. The method according to claim 17 in which said transmitting and receiving comprise transmitting and receiving through a plurality of fiber-optic cables.

* * * * *